US010591599B2

(12) United States Patent
O'Keeffe

(10) Patent No.: US 10,591,599 B2
(45) Date of Patent: Mar. 17, 2020

(54) LASER RANGE FINDER WITH ENHANCED UTILIZATION OF A REMOTE LOCATED MIRROR

(71) Applicant: James Thomas O'Keeffe, Newark, CA (US)

(72) Inventor: James Thomas O'Keeffe, Newark, CA (US)

(*) Notice: Subject to any disclaimer, the term of this patent is extended or adjusted under 35 U.S.C. 154(b) by 0 days.

(21) Appl. No.: 15/815,695

(22) Filed: Nov. 16, 2017

(65) Prior Publication Data

US 2019/0025427 A1    Jan. 24, 2019

Related U.S. Application Data

(63) Continuation-in-part of application No. PCT/US2017/046385, filed on Aug. 10, 2017.

(60) Provisional application No. 62/372,934, filed on Aug. 10, 2016.

(51) Int. Cl.
| | | |
|---|---|---|
| *G01S 7/48* | (2006.01) | |
| *G01S 17/10* | (2006.01) | |
| *G01S 17/89* | (2006.01) | |
| *G01S 17/93* | (2020.01) | |
| *G01C 3/08* | (2006.01) | |
| *G01S 17/42* | (2006.01) | |
| *G01S 17/66* | (2006.01) | |
| *G02B 5/08* | (2006.01) | |

(52) U.S. Cl.
CPC .............. *G01S 17/10* (2013.01); *G01C 3/08* (2013.01); *G01S 7/4802* (2013.01); *G01S 7/4808* (2013.01); *G01S 17/42* (2013.01); *G01S 17/66* (2013.01); *G01S 17/89* (2013.01); *G01S 17/936* (2013.01); *G02B 5/08* (2013.01)

(58) Field of Classification Search
CPC ...... G01S 17/66; G01S 7/4802; G01S 17/936; G01S 17/89; G01S 17/10; G01S 17/42; G01S 17/4808; G01C 3/08; G02B 5/08
USPC ........................................................ 356/5.01
See application file for complete search history.

(56) References Cited

U.S. PATENT DOCUMENTS

| | | | |
|---|---|---|---|
| 3,927,402 | A | 12/1975 | Thompson |
| 4,464,115 | A | 8/1984 | Simpson et al. |
| 4,627,734 | A | 12/1986 | Rioux |
| 4,688,937 | A | 8/1987 | Konig et al. |

(Continued)

FOREIGN PATENT DOCUMENTS

WO    WO2016/011557 A1    1/2016

OTHER PUBLICATIONS

International Search Report and Written Opinion for PCT Patent Application No. PCT/US17/46385, dated Nov. 2, 2017, 18 pages.

(Continued)

*Primary Examiner* — Daniel L Murphy

(57) ABSTRACT

A LIDAR can encounter a remotely located mirror as it moves through a local environment (e.g. a convex roadside mirror). The remote mirror can occupy a small portion of the LIDAR field of view but offer a wealth of reflection data regarding a larger indirect field of view (e.g. around a corner). In one embodiment a LIDAR can learn the location of the remote mirror and then can dynamically increase the density of laser ranging measurements in an associated mirror region of the field of view. The LIDAR can track the mirror region as it moves in the local environment with an increased density of outgoing laser pulses and thereby interrogate the remote mirror for reflection data from a wide indirect field of view.

30 Claims, 28 Drawing Sheets

(56) References Cited

U.S. PATENT DOCUMENTS

| | | | |
|---|---|---|---|
| 4,943,157 | A | 7/1990 | Reding |
| 5,231,401 | A | 7/1993 | Kaman et al. |
| 5,638,164 | A | 6/1997 | Landau |
| 5,914,826 | A | 6/1999 | Smallwood |
| 6,055,490 | A | 4/2000 | Dunne |
| 6,091,037 | A | 7/2000 | Bachschmid |
| 7,064,817 | B1 | 6/2006 | Schmitt et al. |
| 7,089,114 | B1 | 8/2006 | Huang |
| 7,299,892 | B2 | 11/2007 | Radu |
| 7,446,733 | B1 | 11/2008 | Hirimai |
| 7,608,948 | B2 | 10/2009 | Nearhoof |
| 8,666,104 | B2 | 3/2014 | Ivey |
| 8,675,887 | B2 | 3/2014 | Yuan |
| 8,752,969 | B1 | 6/2014 | Kane et al. |
| 8,786,835 | B1 | 7/2014 | Reardon et al. |
| 8,878,901 | B2 | 11/2014 | Meinherz |
| 8,948,591 | B2 | 2/2015 | Scherbarth |
| 9,002,511 | B1 | 4/2015 | Hickerson et al. |
| 9,069,059 | B2 | 6/2015 | Vogt et al. |
| 9,097,800 | B1 | 8/2015 | Zhu |
| 9,121,703 | B1 | 9/2015 | Droz et al. |
| 9,128,190 | B1 | 9/2015 | Ulrich et al. |
| 9,199,643 | B1 | 12/2015 | Zeng |
| 9,279,796 | B1 | 3/2016 | Weisberg |
| 9,285,477 | B1 | 3/2016 | Smith et al. |
| 9,383,753 | B1 | 7/2016 | Templeton et al. |
| 9,625,582 | B2 | 4/2017 | Gruver et al. |
| 9,804,264 | B2 | 10/2017 | Villeneuve et al. |
| 10,151,836 | B2 | 12/2018 | O'Keeffe |
| 10,185,027 | B2 | 1/2019 | O'Keeffe |
| 10,302,746 | B2 | 5/2019 | O'Keeffe |
| 10,408,940 | B2 | 9/2019 | O'Keeffe |
| 2005/0057741 | A1 | 3/2005 | Anderson et al. |
| 2005/0237218 | A1 | 10/2005 | Tang |
| 2006/0104585 | A1 | 5/2006 | Cho |
| 2006/0161270 | A1 | 7/2006 | Luskin |
| 2007/0024841 | A1 | 2/2007 | Kloza |
| 2007/0289860 | A1 | 12/2007 | Newman |
| 2008/0068584 | A1 | 3/2008 | Mori |
| 2009/0147239 | A1 | 6/2009 | Zhu et al. |
| 2009/0219962 | A1 | 9/2009 | Meyers et al. |
| 2009/0262760 | A1 | 10/2009 | Krupkin et al. |
| 2009/0273770 | A1 | 11/2009 | Bauhahn et al. |
| 2010/0026982 | A1 | 2/2010 | Kludas et al. |
| 2011/0181201 | A1 | 7/2011 | Hollis |
| 2013/0127854 | A1 | 5/2013 | Shpunt et al. |
| 2013/0222791 | A1 | 8/2013 | Steffey et al. |
| 2014/0240721 | A1 | 8/2014 | Herschbach |
| 2014/0270237 | A1 | 9/2014 | Wang |
| 2014/0270264 | A1 | 9/2014 | Wang |
| 2014/0350836 | A1 | 11/2014 | Stettner et al. |
| 2015/0185246 | A1 | 7/2015 | Dakin et al. |
| 2015/0192677 | A1 | 7/2015 | Yu et al. |
| 2015/0247703 | A1 | 9/2015 | Teetzel et al. |
| 2015/0286340 | A1 | 10/2015 | Send et al. |
| 2015/0307020 | A1 | 10/2015 | Salter et al. |
| 2015/0378011 | A1 | 12/2015 | Owechko |
| 2016/0047896 | A1 | 2/2016 | Dussan |
| 2016/0245919 | A1 | 8/2016 | Kalscheur et al. |
| 2016/0282468 | A1 | 9/2016 | Gruver et al. |
| 2017/0024877 | A1 | 1/2017 | Versace et al. |
| 2017/0169703 | A1 | 6/2017 | Carrasco et al. |
| 2017/0176990 | A1 | 6/2017 | Keller et al. |
| 2018/0059248 | A1 | 3/2018 | O'Keeffe |
| 2018/0074175 | A1 | 3/2018 | O'Keeffe |
| 2018/0106890 | A1 | 4/2018 | O'Keeffe |
| 2018/0156896 | A1 | 6/2018 | O'Keeffe |
| 2019/0107711 | A1 | 4/2019 | Blanche et al. |
| 2019/0120939 | A1 | 4/2019 | O'Keeffe |
| 2019/0196579 | A1 | 6/2019 | Shpunt et al. |
| 2019/0317193 | A9 | 10/2019 | O'Keeffe |
| 2019/0324124 | A1 | 10/2019 | O'Keeffe |

OTHER PUBLICATIONS

Vojnovic; Notes on optical fibres and fibre bundles; Gray Institute, Department of Oncology, University of Oxford; 15 pages; retrieved from the internet (http://users.ox.ac.uk/-atdgroup/referencematerial/Notes%20on%20optical%fibres%20and%fibre%20bundels.pdf); (year of pub. sufficiently earlier than effective US filing date and any foreign priority date) 2012.

O'Keeffe; U.S. Appl. No. 15/857,960 entitled "Planning a lidar scan with smart test vectors," filed Dec. 29, 2017.

O'Keeffe; U.S. Appl. No. 15/851,686 entitled Distributed laser range finder with fiber optics and micromirrors,' filed Dec. 21, 2017.

Beger et al.; Data fusion of extremely high resolution aerial imagery and LiDAR data for automated railroad centre line reconstruction; ISPRS Journal of Photogrammetry and Remote Sensing; 66(6); pp. S40-S51; Dec. 1, 2011.

Teo et al.; Pole-Like Road Object Detection From Mobile Lidar System Using a Coarse-to-Fine Approach; IEEE Journal of Selected Topics in Applied Earth Observations and Remote Sensing; 8(10); pp. 4805-4818; Oct. 2015.

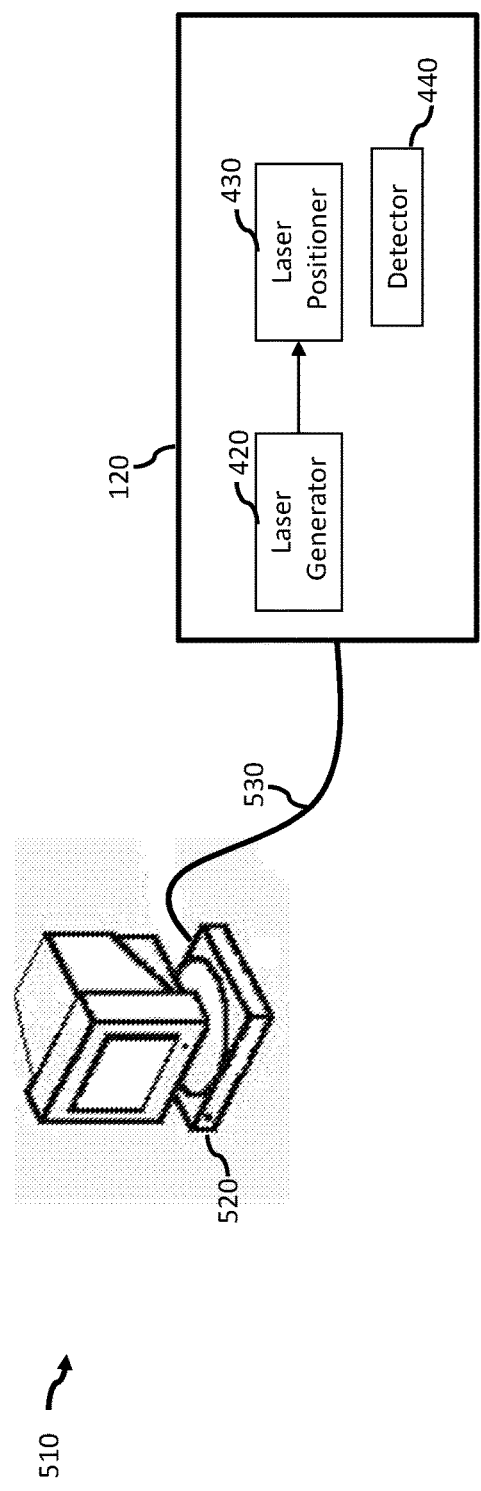
FIG.5A
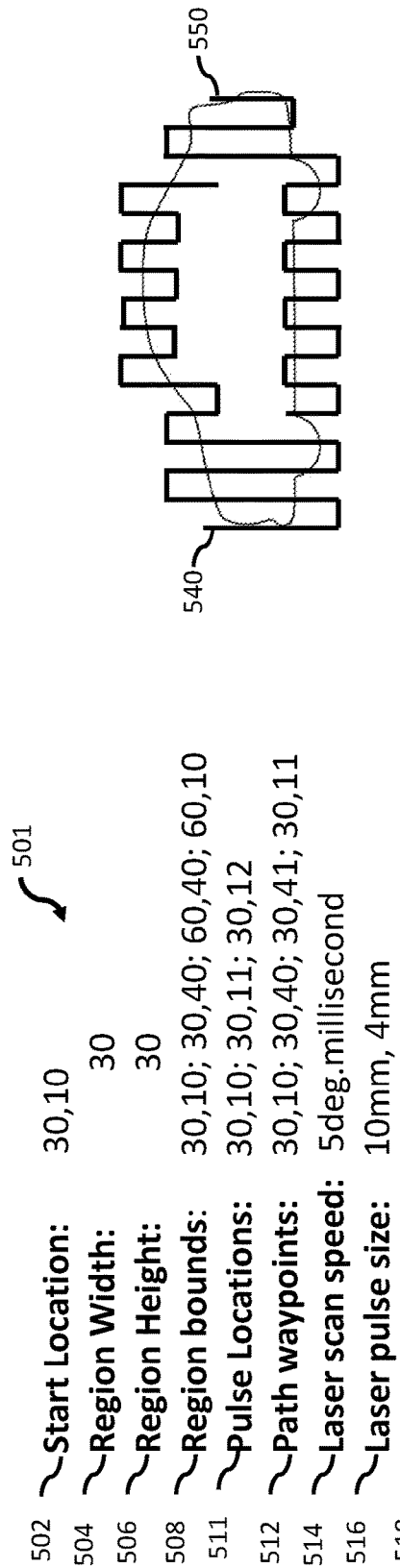
FIG. 5C
| | | |
|---|---|---|
| 502 — Start Location: | 30,10 | |
| 504 — Region Width: | 30 | |
| 506 — Region Height: | 30 | |
| 508 — Region bounds: | 30,10; 30,40; 60,40; 60,10 | |
| 511 — Pulse Locations: | 30,10; 30,11; 30,12 | |
| 512 — Path waypoints: | 30,10; 30,40; 30,41; 30,11 | |
| 514 — Laser scan speed: | 5deg.millisecond | |
| 516 — Laser pulse size: | 10mm, 4mm | |
| 518 — Number of Pulses: | 300 | |
FIG. 5B

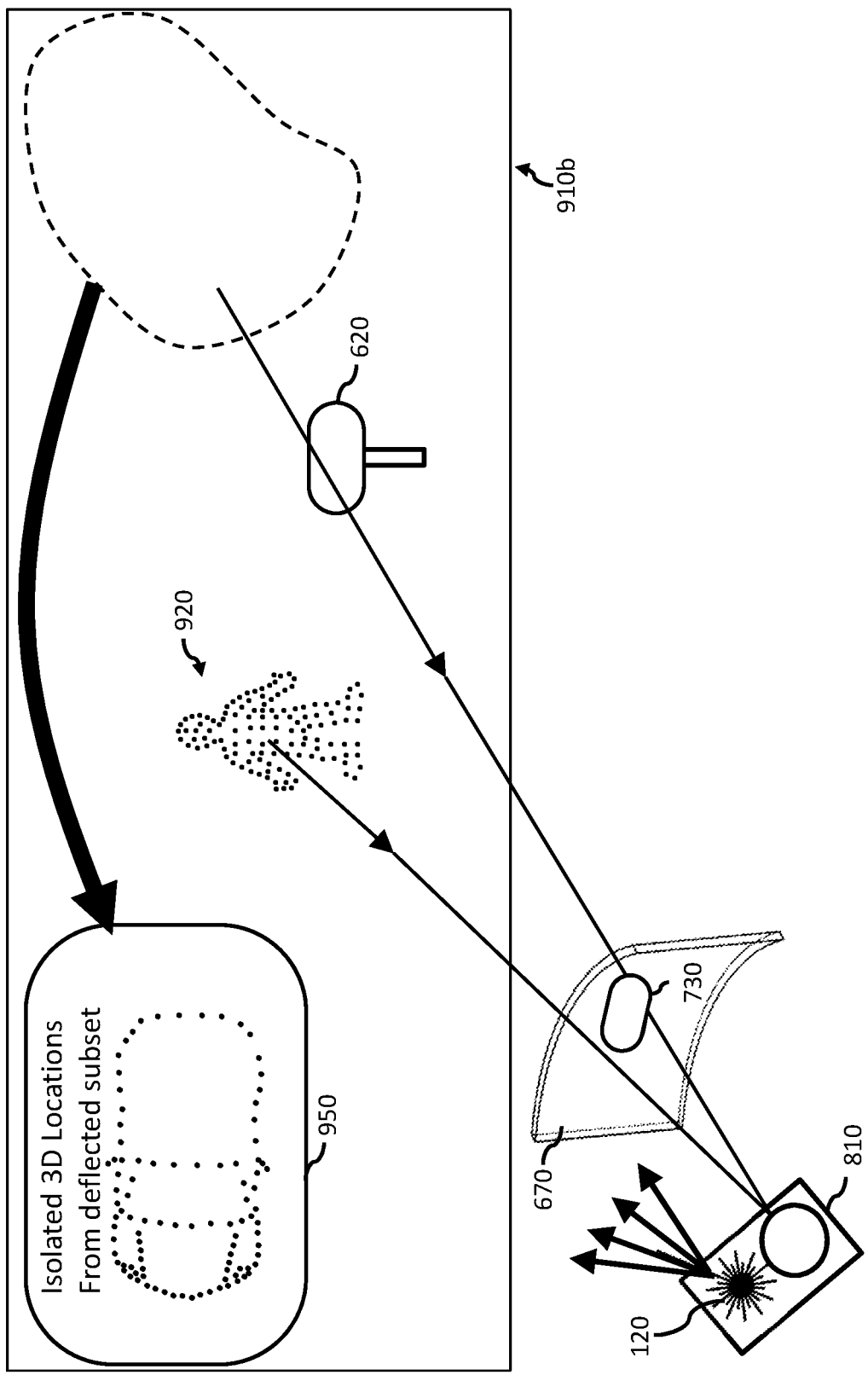

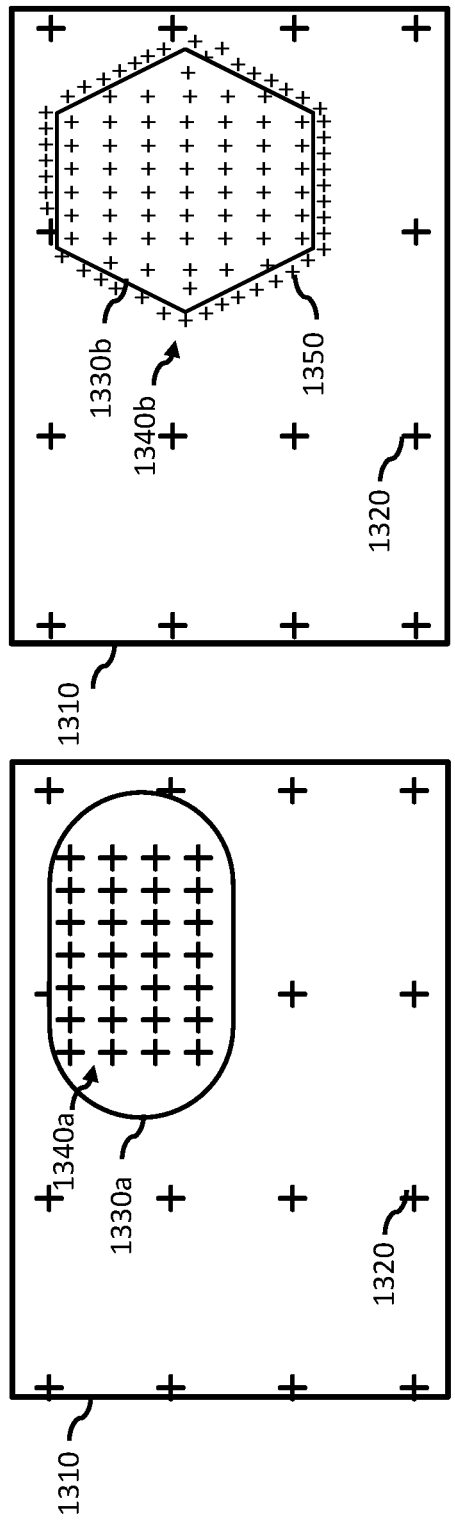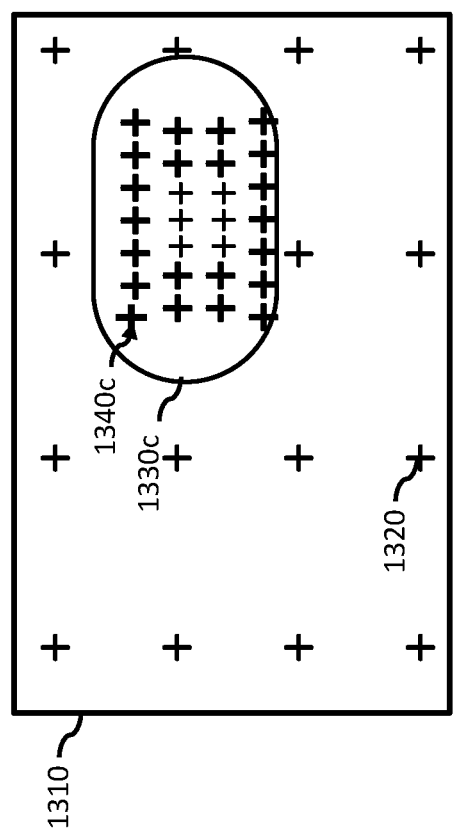

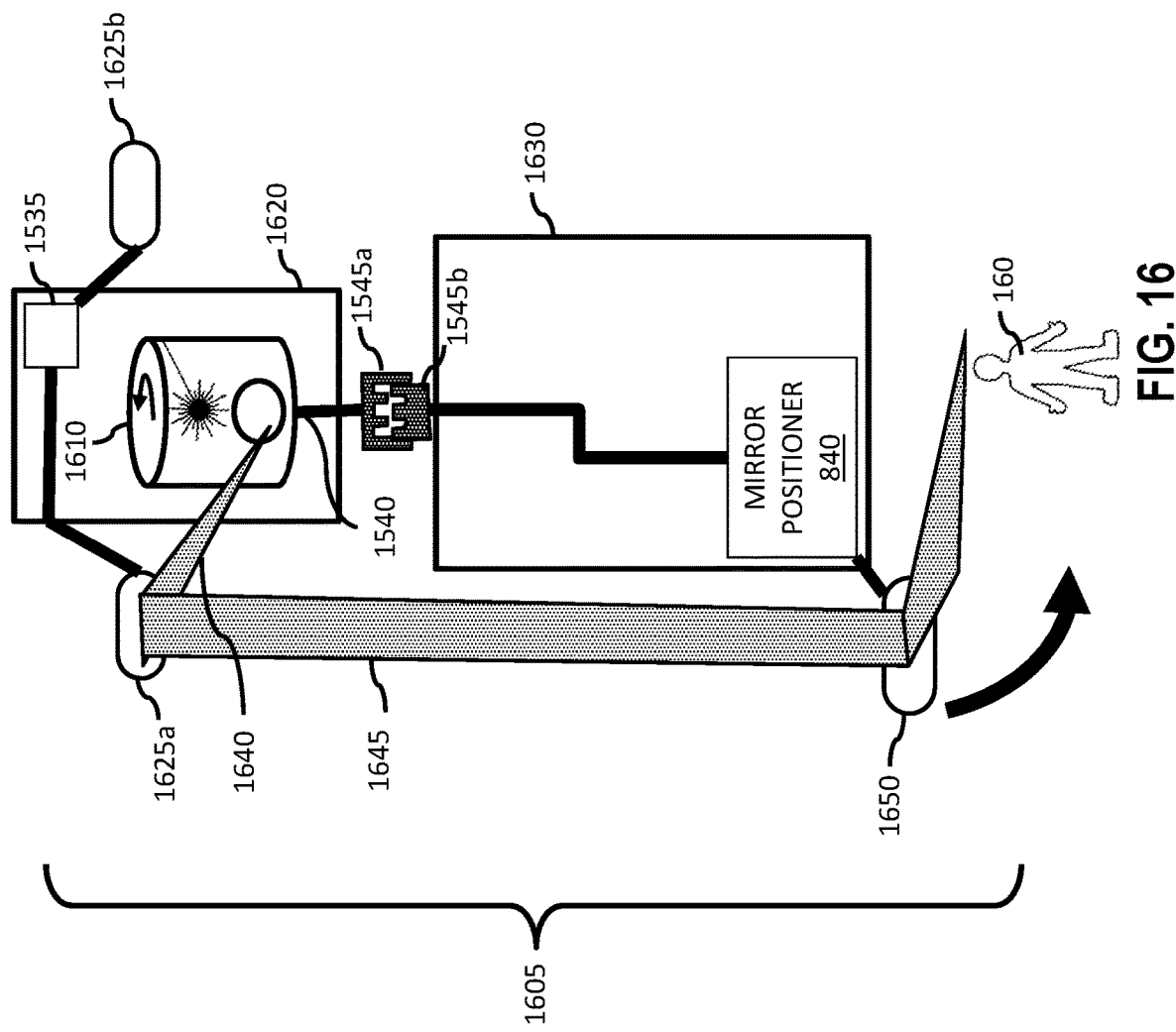

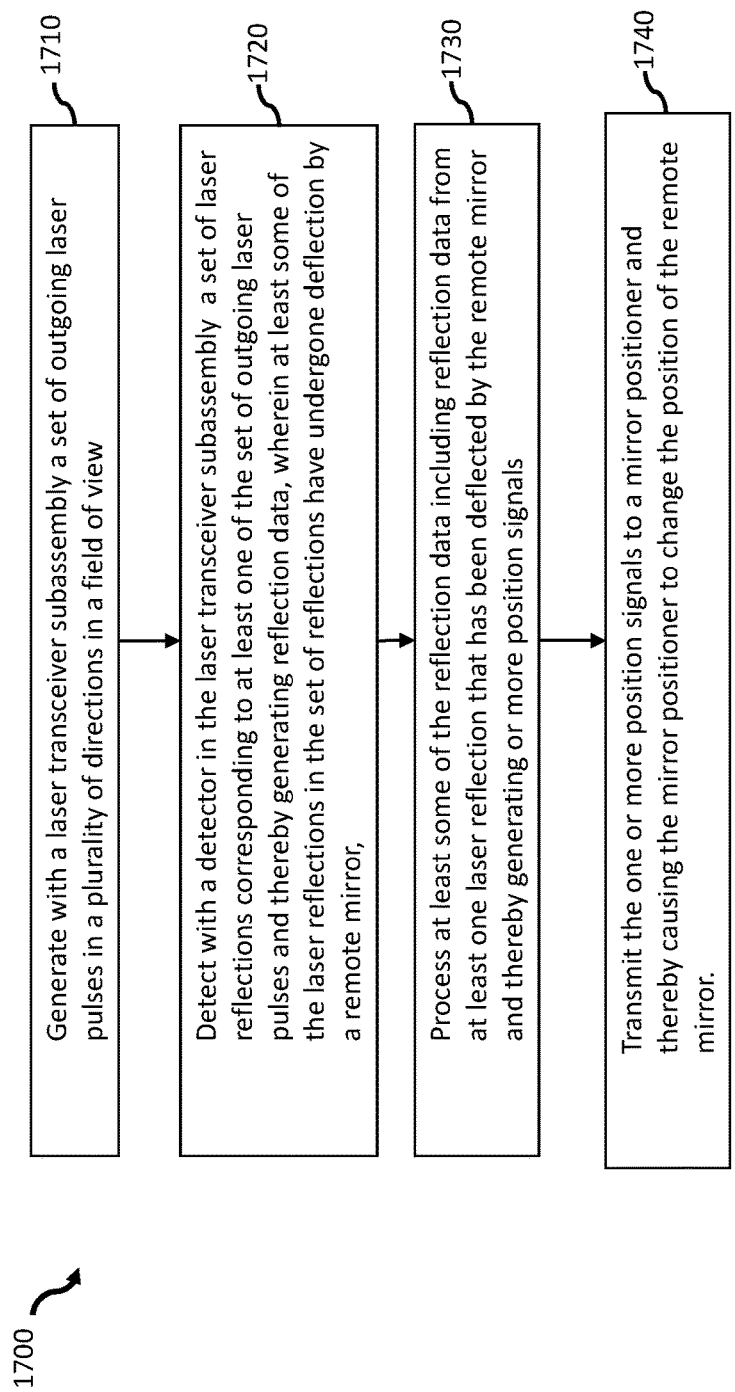

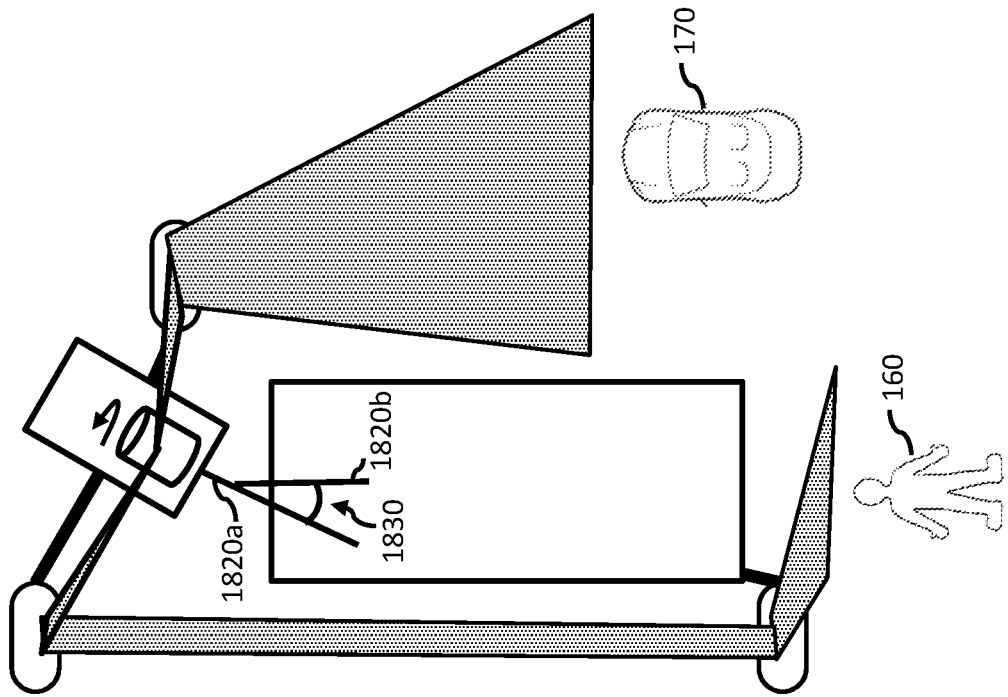
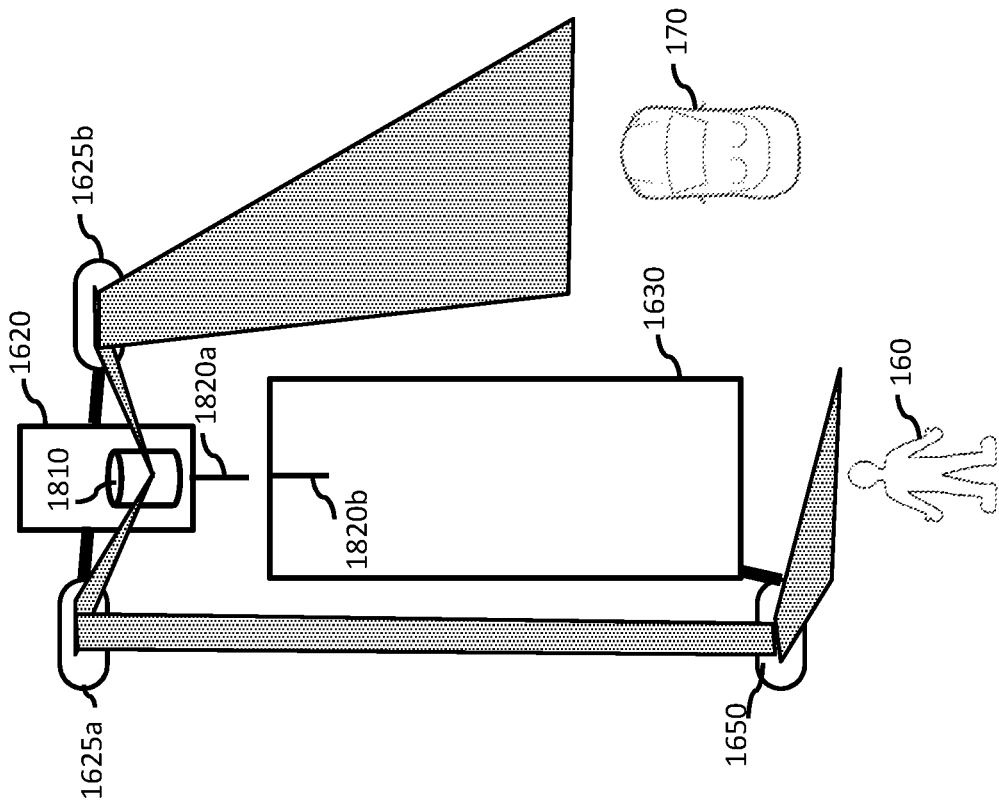

LASER RANGE FINDER WITH ENHANCED UTILIZATION OF A REMOTE LOCATED MIRROR

CROSS-REFERENCE TO RELATED APPLICATIONS

This application is a continuation-in-part of International Application No. PCT/US17/46385, filed Aug. 10, 2017, which claims the benefit of priority to of U.S. provisional patent application Ser. No. 62/372,934, filed on Aug. 10, 2016.

FIELD OF THE INVENTION

This disclosure relates generally to discovering a remotely located mirror in the field of view of a laser range finder, including characterizing the mirror and utilizing the discovered remote mirror to enhance the performance of the laser range finder.

BACKGROUND

There are applications in which a distance measurement is needed for a plurality of locations in the environment surrounding a distance measurement system. There are existing technologies that provide such distance information in the form of a 3-dimensional (3D) point cloud that represents the 3D coordinates of points on objects in the local environment. An ongoing challenge is to enhance these distance measurement systems, for example to provide improved coverage range, measurement density, measurement accuracy, measurement relevance. One challenge is that most cases real-world applications of distance measurement (e.g. ranging in autonomous vehicles) can encounter obstacles that dynamically obstruct portions of the field of view (FOV). For example, the trailer of a tractor-trailer truck can obstruct a dynamically varying portion of the FOV of a distance measurement system located in the tractor portion of the truck.

One exemplary distance measurement technology is computer stereo vision in which 3D information is extracted from 2-dimensional (2D) images obtained by a digital camera, by comparing captured information about the scene from two vantage points. Another exemplary distance measurement technology is light detection and ranging (LIDAR) in which a light emitter (e.g. a laser diode) illuminates one or more directions in a field of view and the time associated with the reflections from each of the one or more directions is used to measure distance to objects in the associated direction. Several varieties of LIDAR are presently used. For example, flash LIDAR illuminates many points at once with light in a FOV and uses an array of detectors to sense reflections and associated times. Scanned LIDAR can use a pulsed laser to scan the FOV and sequentially measure laser reflections.

Another challenge with LIDAR is that the FOV represents the limited set of directions in which the LIDAR can directly measure distance to surrounding locations. Conventional mechanical LIDAR can have a rotating sensor head that spins around an axis and provides a 360 degree FOV in the azimuthal plane and a limited (e.g. +/−20 degree) FOV in the elevation plane. Hence the directions in which a LIDAR can provide direct range measurements from the surrounding environment can be limited by the system design. In a related challenge the LIDAR is often mounted on a platform (e.g. a car, truck, or airplane) and this platform obstructs some of the FOV. Therefore insofar as I am aware, no previous LIDAR system effectively addresses the challenge of adapting the limited FOV to the often-obstructed and changing local environment in real-world applications (e.g. autonomous vehicles or smart buildings).

SUMMARY

A remote mirror whose location or existence may be initially unknown to a laser range finder poses challenges and opportunities. Specifically, a remote mirror at some distance from a laser range finder in the FOV of the range finder can provide indirect reflections from otherwise inaccessible locations (e.g. around corners). Various embodiments of the present disclosure relate to detecting and characterizing a remotely located mirror in the FOV of a laser range finder system. In several cases the remotely located mirror can initially have an unknown position, shape and size (e.g. a reflector attached to a shipping container that can be used by a LIDAR in an autonomous truck or a mirror located in a building that can be discovered by a robot with a LIDAR, or a mirror on a passenger vehicle such as on a door with unknown placement relative to a LIDAR). Various embodiments provide for discovering the presence of a remote mirror in the FOV of a laser range finder, tracking the remote mirror position and increasing the utilization of a remote mirror (e.g. density of laser pulses generated by a LIDAR in a portion of the FOV containing the remote mirror).

In one embodiment a LIDAR system includes a laser generator, a laser positioner to scan a FOV, a reflection receiver or detector and an electronic circuitry such as a processing subassembly. The processing subassembly processes aspects of reflections from the FOV and thereby identifies a remote mirror located in the FOV, associated with some of reflection data. The processing subassembly can identify the location of the remote mirror (e.g., an angular range within a FOV) and use a variety of techniques to determine the range of angles in the FOV associated with the remotely located mirror. The processing subassembly can further characterize a transfer function of the mirror (i.e. the relationship between the angle of the laser beam produced by a laser positioner attached to the remote mirror and the angle of the reflected beam from the remote located mirror). The LIDAR system can use the characterization of the mirror to estimate reflection locations in 3D space associated with laser beams or reflections deflected by the remote mirror and subsequently detected by the laser range finder.

One exemplary aspect of several embodiments of the present disclosure is directed to a method for a LIDAR to discover a remotely located mirror, located at an initially unknown location in the local environment, to perform a laser ranging scan of a field of view that utilizes the discovered mirror, and to identify a subset of laser reflections that have been deflected by the remote mirror and compensate the corresponding reflection data. In one aspect the laser range finder can comprise a laser reflection detector and a portion of the FOV of the detector can be associated with a discovered mirror in the local environment (e.g. a LIDAR on a truck with a large wing-mirror can have a large but variable portion of the detector FOV occupied by the wing mirror). A laser range finder can have a detector that generates a sequence of laser pulses, thereby illuminating the surrounding environment. The laser pulses can reflect from objects in the local surroundings and the laser range finder can receive a set of laser reflections. Reflections can arrive in a set of reflection directions. For example, the detector can be scanned in a raster pattern or a rotating pattern. The detector field of view can be considered the set of all possible reflection directions. In a simple case wherein a laser reflection travels directly from the reflecting object to the detector the 3D reflection location can be determined using the time of flight (TOF) of the laser reflection (i.e., time elapsed since outgoing laser pulse) and the reflection direction.

Several embodiments of this disclosure deal with the special case of reflections from a remote mirror. In some embodiments the initial location of the remote mirror can be unknown. A remote mirror can be very useful (e.g. a convex wing mirror provides an expanded FOV that is often beyond the range of directions forming the unaided detector FOV). However, reflections that arrive from reflection directions in the detector FOV associated with the mirror have been deflected. Therefore an aspect of several embodiments is to identify the subset laser reflections (the deflected subset) that have undergone deflection by the remote mirror. Subsequently, a 3D location can be computed for each laser reflection including performing a correction step performed when computing the 3D location corresponding to laser reflections in the deflected subset. In this way the laser range finder or a system with a laser range finder can account for the effect of the remote mirror when computing 3D locations representative of reflection locations (e.g. when computing a 3D point cloud). In some embodiments the curvature and placement of the remote mirror can be learned by the laser range finder and the correction step can improve the accuracy of the 3D location associated with reflections from the mirror (e.g. the correction can determine a correct 3D reflection location accounting for the deflection in the mirror). In other embodiments, the correction step separates out the deflected subset of laser reflections and provides them as a secondary point cloud (e.g. provides a smaller separate point cloud, distinct from the main point cloud, that shows relative placement of reflection locations for the deflected subset of laser reflections).

In a related second group of embodiments a laser range finder system has a dynamically steerable laser assembly capable of steering a sequence of outgoing laser pulses in a dynamically selectable, non-uniform and modifiable manner. The steerable laser assembly is controlled by a set of laser steering parameters, similar to how a 3-D printer is dynamically controlled by a set of parameters describing an object. In response to obtaining a location estimate for a remote mirror (e.g. a 2-D range of direction in a FOV or a 3D range of coordinates) the laser range finder system generates a set of laser steering parameters operable to improve the utilization of the remote mirror. For example, the remote mirror (e.g. wing mirrors in automotive applications) can be a convex mirror, which increases the angular range of reflections captured by the mirror but makes objects appear smaller. Hence several embodiments provide a method to discover a remote mirror in the FOV and generate laser steering parameters to interrogate the mirror with a customized non-uniform pattern of laser pulses (e.g. increased density, decreased angular spacing, smaller or larger laser spot sizes, or optimized laser intensity). In another embodiment, a laser range finder system can selectively magnify a portion of the FOV containing a remote mirror, thereby providing a higher density of laser reflections from a remote mirror and increasing its utilization. For example. A set of laser steering parameters based on a location estimate for a remote mirror can be used to position a controllable magnifier within a flash LIDAR, thereby magnifying a portion of the FOV estimated to contain a remote mirror In a third group of embodiments a remote mirror positioning system is disclosed that controls (e.g. adjusts) a remote mirror based at least in part on processing reflection data from laser reflections, wherein at least some of the laser reflections have undergone deflection by the remote mirror. The remote mirror positioning system is useful for adjusting remote mirrors to provide enhanced utility for laser range finder or to dynamically compensate for changes in the local environment, such as when an articulated vehicle makes a sharp turn. In one embodiment a remote mirror control system comprises a laser transceiver subassembly and processing subassembly with a transceiver operable to transmit position signals to a mirror positioner. The laser transceiver functions to transmit a set of laser pulses, gather a corresponding set of laser reflections and generate corresponding reflection data. Some of the laser reflections have been deflected by a remote mirror in the FOV of the laser transceiver. The processing subassembly processes at least some of the reflection data and thereby generates a position signal. The transceiver transmits the position signal to mirror the positioner that is mechanically coupled to the remote mirror. Embodiments of the remote mirror positioning system can provide feedback control of a remote mirror when the position of the remote mirror is not fully controllable or initially known by the mirror positioning system.

In a related fourth group of embodiments a laser range finder can be operatively coupled to a positioning mechanism (e.g. a mirror positioner) attached to a remote mirror on a vehicle or in the local environment (e.g. a LIDAR on a truck that is connected to a remote mirror on a cargo trailer attached to the truck). The laser range finder can discover the position of the remote mirror and can reposition the remote mirror in response to a change in shape or position of the vehicle. For example, a tractor-trailer truck can have a LIDAR located in the tractor portion that discovers and utilizes a remote mirror located in the trailer. The trailer can be articulated relative to the tractor and the laser range finder can control the remote mirror to adapt as the tractor-trailer makes a sharp turn providing optimized coverage. In another embodiment a laser range finder is mounted on a first portion of an articulated vehicle and a set of reflectors on a second portion that is articulated relative to the first portion, and received some or all of the incoming sequence of laser pulses from the laser range finder. The laser range finder discovers and controls a remote mirror to compensate for the articulation of the second (e.g. trailer) portion relative to the first (e.g. tractor) portion. In this way the controllable remote mirror ensures the FOV associated with the set of reflectors on the second portion remains invariant to the articulation of the vehicle.

Advantages

The techniques described in this specification can be implemented to achieve the following exemplary advantages:

Several embodiments provide a laser range finder that can identify and estimate the location of a remote mirror. Laser range finders in autonomous vehicles are very likely to inadvertently and sporadically experience mirrors in their field of view. Therefore the accuracy of 3D laser range finding is improved by the disclosed systems and methods to detect and estimated the location of remote mirrors.

In a related advantage several embodiments enable tracking of a remote mirror in the FOV of a laser range finder, following mirror detection. For example, a large variation in range, reflection location, time of flight or depth in a small window of the FOV can be used to identify the presence of a remotely located convex mirror. In several embodiments a LIDAR can track the bounds of a region of the FOV identified to contain a remote mirror.

A laser range finder according to several embodiments can increase the use a discovered remote mirror to provide laser reflections from locations outside of the direct FOV (e.g. around corners). Convex mirrors have been used with limited success on roadways to help drivers see around corners. Such mirrors are sometimes found on country roads or sharp bends in roads. A drawback with convex mirrors is that objects are distorted and appear smaller than they really are. Hence drivers have difficulty understanding or utilizing convex mirrors and this has limited their deployment. Several embodiments of the present disclosure can enable an autonomous vehicle with a laser range finder to discover a remote mirror, zoom in (e.g. with optical or digital zoom) on the remote mirror to improve utilization of the mirror (i.e., magnify the remote field of view provided by the mirror) and use learned or stored characterization about the mirror to better understand the remote field of view offered by the mirror. For example, a remote roadside mirror can have defining features (e.g. a size or a model number indicator) that helps a laser range finder to recognize the type or model of remote mirror and thereby select a set of stored characteristics for the roadside mirror (e.g. the curvature, angular range, size).

In another advantage a laser range finder can identify a deflected subset of a set of laser reflections thereby enabling more accurate 3D ranging in an environment with remote mirrors.

Similarly, a laser range finder can identify and isolate reflection data from the deflected subset of laser reflections thereby providing a clear indication that the reflection data is from a mirror. For example, in one aspect a LIDAR can identify that a subset of a set of laser reflections have characteristics indicating that they come from a remote mirror. The LIDAR may not initially know the transfer function of the remote mirror and may isolate the subset as representing a deflected subset with known relative placement but unknown absolute placement relative to other laser reflections in the FOV.

Several embodiments enable gathering more information from a remote mirror by estimating the mirror location and then densely scanning the remote mirror, or estimated mirror location, with a laser range finder (e.g. greater than average density of laser pulses). In another advantage, a system for remotely controlling a remote mirror based on processing laser reflections can automate the process of provisioning mirrors (e.g. automatically characterize and provision a remote mirror attached to the trailer of a truck when a new trailer is attached to the truck), and improve the effectiveness of discovered mirrors (e.g. adjust the mirror position to provide greatest blind-spot coverage).

In yet another advantage, a system that controls the position of a remote mirror based at least in part on processing laser reflections can automatically adjust the remote mirror in response to a changing shape of a host vehicle (e.g. trailer position) and thereby compensate the indirect FOV from the remote mirror for changes in the vehicle shape (e.g. dynamic blind-spot coverage for a trailer during sharp turns). While such changing mirror position might confuse a vehicle driver and hence be inappropriate, an automated system can easily receive feedback regarding the changing orientation of a remote mirror and the anticipated indirect field of view expected from the remote mirror in response to the change in orientation.

In another advantage a remote mirror and laser steering parameters operable to distribute laser range measurement in a LIDAR can be adapted in combination to specific road conditions. For example, a set of remote mirrors on a vehicle trailer and an associated set of laser steering parameters can be adapted to scan a particular indirect FOV (e.g. a known blindspot of the LIDAR) during a sharp turn and adapted differently on a straight highway.

In another advantage, the most expensive component of a laser range finder is often the detector array (e.g. a focal plane array). Aspects of the present invention enable lower cost components such as remote mirrors to be disposed on a trailer (or cargo containers) while the expensive components can be located in the tractor portion of a vehicle and utilize the remote mirrors. Specific aspects provide methods for automatically discovering the location of these mirrors. Hence a long-haul truck driver can attach a trailer to a tractor and several embodiments disclosed herein provide for automatically discovering and characterizing a set of remote mirrors on the tractor or trailer that can enhance vehicle safety and autonomy.

DRAWINGS

FIG. 5A illustrates an exemplary laser range finding system including a processing subassembly and a steerable laser assembly connected by a communication link, according to an embodiment of the present disclosure.

FIGS. 5B and 5C illustrate exemplary laser steering parameters according to an aspect of the technology.

FIGS. 9A and 9B illustrate 3D depth maps including 3D locations indicative of the reflection locations corresponding to a set of laser reflections detected by a laser range finder, according to an embodiment of the present disclosure.

FIGS. 13A, 13B and 13C illustrate an exemplary FOV for an exemplary laser range finder in accordance with an embodiment of the present disclosure.

FIG. 16 illustrates a system mounted to a tractor-trailer vehicle that controls remote mirrors based at least in part on processing laser reflection data, according to some embodiments of the present disclosure.

FIG. 17 illustrates a method for controlling a remote mirror based at least in part on processing reflection data from a set of laser reflections, according to an embodiment of the present disclosure.

FIGS. 18A and 18B illustrate an articulated tractor-trailer vehicle with a system for controlling remote mirrors based on sensing a change in the direction of tractor-trailer vehicle, according to an embodiment of the present disclosure.

DETAILED DESCRIPTION

Figure 1:
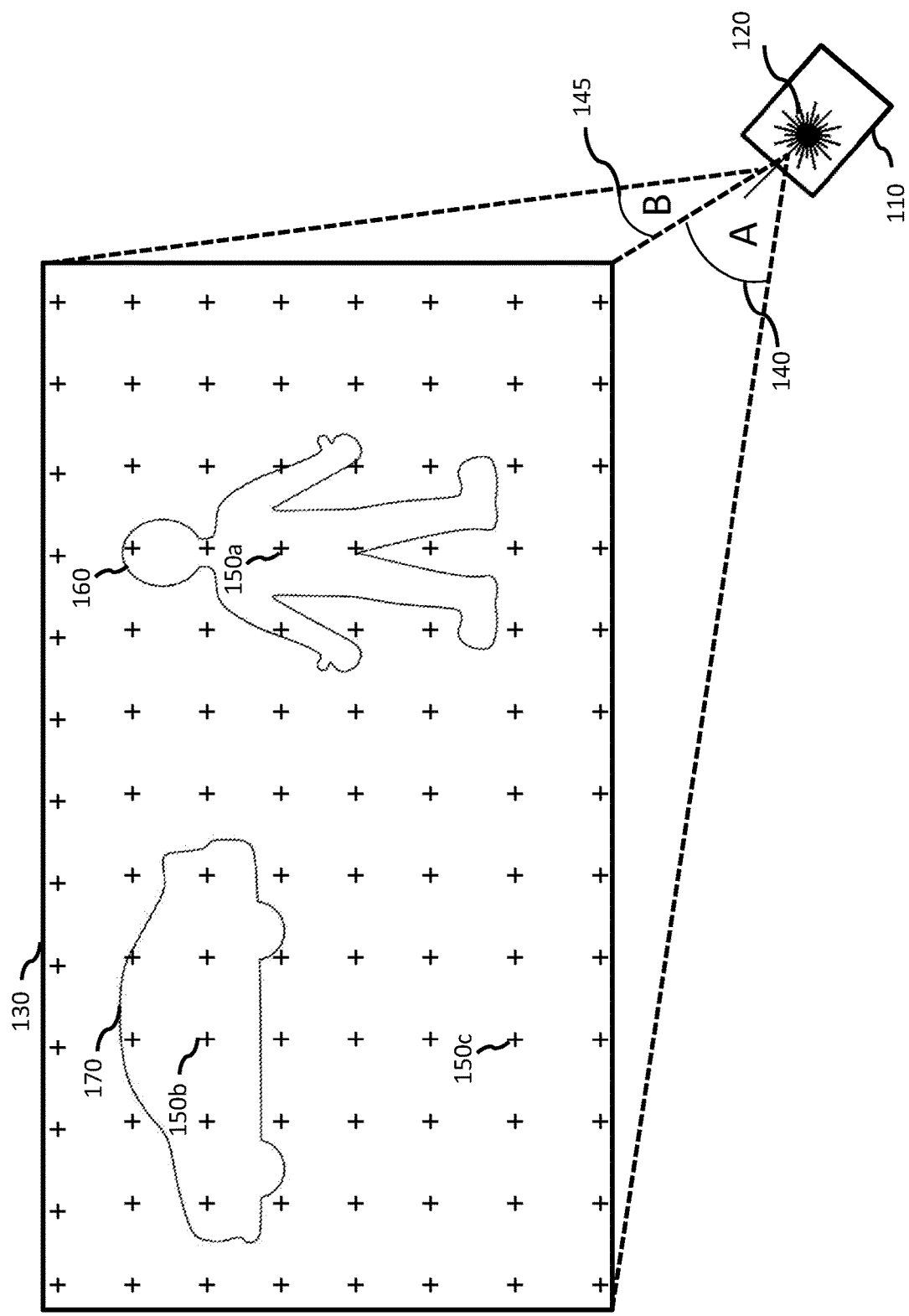
FIG. 1 is an exemplary diagram of a laser range finder and a plurality of laser pulse locations in a field of view, according to an embodiment of the present disclosure.

Unlike digital cameras where light is received from many points at once, a laser range finder (e.g. 110 in FIG. 1) can rely on a relatively small number of laser beams (e.g. 1-64) aimed sequentially at a number of points (e.g. 100,000) during each scan of the FOV. Hence the measurement density of laser ranging systems is often much lower than digital cameras. The laser pulses represent a scarce resource and the FOV is often undersampled with respect to sensing detailed boundaries or changes in topology. For example, a tree in the field of view could be scanned with 1000 points during a scan of the FOV and the same tree could occupy one million pixels in a digital camera image. For the purpose of this disclosure the FOV of a laser transmitter is the set of all directions in which the laser transmitter can emit a laser light. For the purpose of this disclosure the FOV of a detector (e.g. a photodetector) is the set of all directions along which the detector can detect light (e.g. a laser pulse). The FOV of a laser range finder is set of all directions in which the laser range finder can perform laser range finding (e.g. the set of all directions in which the laser range finder can both transmit and receive laser light). For the purpose of this disclosure a single scan of a FOV by a laser range finder is the process of performing laser ranging measurements in the largest substantially unique set of directions (e.g. the longest sequence of directions that does not repeat or cover a substantially similar portion of the FOV). In a simple example, a rotating laser range finder may scan the FOV by performing a 360 degree revolution. A raster scanning laser range finder may scan the FOV by performing 10 left to right sweeps of a FOV and changing the elevation angle of a laser generator after each sweep to cover the entire FOV.

Steerable Laser Assembly

LIDARs often provide laser ranging in a plurality of directions (e.g. a FOV) and thereby generate data for a 3D topology map of the surroundings. To accomplish this LIDAR can have a steerable laser assembly. For the purpose of this disclosure a steerable laser assembly is an assembly that scans one or more laser beams within a FOV. A steerable laser assembly can include a laser generator (e.g. a laser diode) and a laser positioner (e.g. a rotating scanning mirror) to position the laser beam in a variety of directions during a scan of the FOV. The steerable laser assembly can be mechanically-steerable (e.g. containing moving parts to direct a laser beam) or electronically-steerable (e.g. containing an optical phased array to form a laser beam in one of many directions).

In many LIDARs a mechanically steerable laser assembly rotates with a constant angular velocity and thereby scans the FOV with uniform measurement spacing (e.g. 1 laser pulse and 1 measurement for every 1 degree of the azimuthal FOV). The pattern of generated laser pulses is uniform and largely determined by the angular velocity of the rotating components. The angular velocity can be selected for many mechanical LIDAR (e.g. 5-20 Hz for the HDL-64E from Velodyne Inc. or Morgan Hill, Calif.), but remains constant (or nearly constant) from one rotation to the next. The uniform angular spacing of laser pulses within the FOV is simple and somewhat inherent in rotating LIDARs, but is sub-optimal for gathering the most information from the FOV. For example, large sections of the FOV can return a predictable, time-invariant, homogeneous response, such as reflections from walls or unoccupied sections of a highway.

Dynamically Steerable Laser Assembly

In a mechanical LIDAR the inertia of the spinning components prevents rapid changes in the angular velocity that would be necessary to dynamically steer a laser beam to produce a complex non-uniform and dynamically defined patterns of laser pulses. Recently, advancements in electronically-steerable lasers and phased array laser beam forming have made it possible to dynamically steer a laser beam within a FOV. Electronically-scanned LIDARs are solid-state and comprise no moving parts (e.g. the model S3 from Quanergy Inc. of Sunnyvale, Calif.). In a solid state LIDAR, the absence of inertia associated with moving parts makes it possible to move a laser beam with a complex trajectory thereby producing a series of laser pulses with non-uniform spacing, density, and location in the FOV.

For the purpose of this disclosure, dynamically steerable laser assemblies are a subset of steerable laser assemblies wherein the assembly can dynamically steer one or more laser beams by accepting inputs (e.g. user commands) and thereby dynamically changing aspects of the laser beam such as beam power, spot size, intensity, pulse repetition frequency, beam divergence, scan rate or trajectory. A dynamically steerable laser assembly can change aspects of one or more laser beams several times during a scan of the FOV. For example, a differentiating aspect of many dynamically steerable laser assemblies over traditional laser assemblies is circuitry operable to process instructions while the laser beam scans the FOV and continually adjust the direction of a laser beam. This is similar to the dynamic manner in which a 3D printer dynamically rasters a polymer filament to print an arbitrary shaped object. A traditional mechanically steered LIDAR, with associated inertia, can only implement small changes in angular velocity during each scan (e.g. changing from 20 Hz to 20.5 Hz scan rate in the course of a single 360 degree rotation). In contrast, it can be appreciated that a dynamically steerable LIDAR can make several changes to aspects of the laser pulse pattern in the course of a single scan of the FOV (e.g. rapidly changing the trajectory of a laser beam by 90 degrees within 10 milliseconds or tracing the outline of a complex shape with many turns during a single scan).

For the purpose of this disclosure dynamically steering a laser beam with a steerable laser assembly is the process of providing input data to the steerable laser assembly that causes the steerable laser assembly to dynamically modulate at least one aspect of the resulting laser pulse sequence during a scan of the FOV. Exemplary modulated aspects can include the beam or pulse power, spot-size, intensity, pulse repetition frequency (PRF), beam divergence, scan rate or trajectory of the laser beam. For example, a laser assembly that is designed to raster scan a FOV with a constant scan rate and pulse rate (e.g. PRF) is acting as a steerable laser assembly but is not being dynamically steered. The distinction is that such a laser assembly is not receiving input or acting on previous input and dynamically altering aspects of the beam pattern during the course of each scan of the FOV. However, the same steerable laser assembly could be dynamically steered by providing input signals that cause the steerable laser assembly to generate a variable laser power at locations in the FOV, based on the input signals (e.g. thereby generating an image on a surface in the FOV). A trajectory change can be a direction change (i.e., a direction formed by a plurality of pulses) or a speed or scan rate change (i.e., how fast the laser is progressing in a single direction across the FOV). For example, dynamically steering a steerable laser assembly can be dynamically changing the angular velocity, thereby causing the inter-pulse spacing to increase or decrease and generating a dynamic laser pulse density. In one aspect dynamic steering can often be recognized as the process of implementing dynamic control of a laser pulse pattern during a scan of a FOV.

In the context of the present disclosure many rotating LIDAR do comprise steerable laser assemblies, but these assemblies are not dynamically steerable since neither the power nor the trajectory of the laser beam is dynamically controllable within a single scan of the FOV. However, a rotating or mechanical LIDAR could be dynamically steered, for example by providing input data that causes the laser to dynamically vary the laser pulse rate within a scan of the FOV, since the net result is a system that can guide or steer the laser to produce a non-uniform density laser pulse pattern in particular parts of the FOV.

In many laser range finders the laser is periodically pulsed as the laser assembly moves along a trajectory and the exact location of each laser pulse in the FOV is controlled. Nevertheless such a periodically pulsed laser generator can be used in a steerable laser assembly to produce a complex shaped region with greater than average spatial density pulse, for example by increasing the laser dwell time within the complex shaped region. In this way a periodically pulsed laser generator (e.g. a laser diode) can produce a greater density of pulses in the complex shaped region. Other laser range finding systems transmit a continuous laser signal, and ranging is carried out by modulating and detecting changes in the intensity of the laser light. In a continuous laser beam systems the distance to a reflection location is determined based on the phase difference between the received and transmitted laser signals.

In one aspect a dynamically steered laser range finder can be used to mine the FOV for the boundaries. For example, a LIDAR can generate a laser pulses with a 3 milliradian beam divergence, thereby resulting in a 30 cm radius laser spot size at a distance of 200 m. This small laser spot size enables the LIDAR to identify the boundaries of an object at 200 m. In many cases the resolution of objects at considerable range is limited by the number of pulses devoted to an object rather than the ability of each pulse to identify a boundary. Therefore once a boundary is detected a dynamically steerable laser assembly could be dynamically steered to investigate and refine estimates of the boundary by devoting more pulses to the object. In contrast RADAR has much greater beam divergence and hence a much wider spot size impacts the object (often many times the object size). Hence the reflections from beam-steered RADAR represent the reflections from many points on the object, thereby making beam steered RADAR useful for object detection but impractical for detailed boundary localization. Hence, a small change in beam angle provides little if any actionable information regarding the edges of an object. In contrast the spot size of the laser remains small relative to the boundary of many important objects (people, dogs, curbs). The present technology enables the boundaries of such objects to be dynamically determined by a process of iteratively refining the scan points for the electronically steered LIDAR. For example, a LIDAR with dynamic steering could use a bisection algorithm approach to iteratively search for the boundary of a pedestrian in the FOV. The LIDAR could first process laser reflection data to identify that a 3D point P1 in the point cloud has a TOF consistent with the pedestrian and can subsequently scan iteratively to the right and left of P1 with decreasing angular range (e.g. in a bisection approach) to estimate the exact location of the boundary between the pedestrian and the surrounding environment. In general, this technique can be used to investigate changes in range (e.g. time of flight changes) within a point cloud to iteratively improve boundary definition.

FIG. 1 illustrates laser range finder system 110 that can scan a steerable laser assembly 120 within a field of view FOV 130. The field of view 130 can be defined by a horizontal sweep angle 140 and vertical sweep angle 145. Steerable laser assembly 120 scans FOV 130 and generates a plurality of laser pulses (e.g. pulses 150a, 150b and 150c). Some laser pulses (e.g. 150a and 150b) can reflect off objects (e.g. person 160 and vehicle 170). In the embodiment of FIG. 1 the laser pulses are evenly spaced in the FOV. Steerable laser assembly 120 performs a uniform, non-dynamic scan of the FOV in FIG. 1. A challenge with this uniform scan of the FOV is that few of the laser points (e.g. 5 or 6) reflect from person 160 and vehicle 170, due in part to the even laser pulse density throughout the FOV.

Figure 2A:
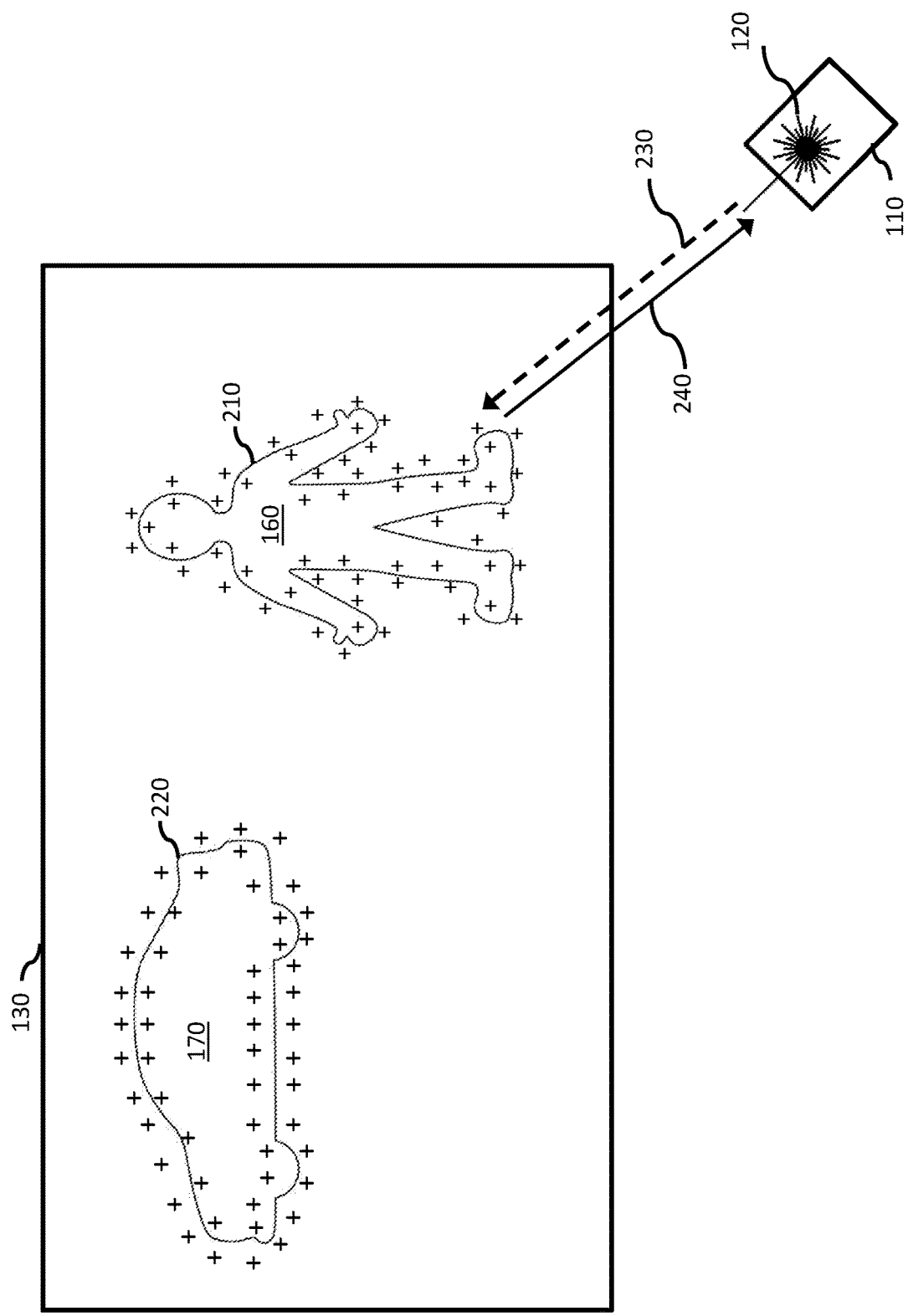
FIG. 2A-2E are exemplary diagrams of a laser range finder and a plurality of laser pulse locations in a field of view, according to an embodiment of the present disclosure.

FIG. 2A illustrates the same FOV 130 with the same number of laser pulses, except that the laser has been dynamically steered to generate a non-uniform high pulse density surrounding the boundaries 210 and 220 of the objects 160 and 170. Several embodiments of the present technology define laser steering parameters operable to dynamically steer a steerable laser assembly (e.g. an electronically steerable laser assembly) to generate regions of increased laser pulse density or non-uniform pulse density.

Figure 2B:
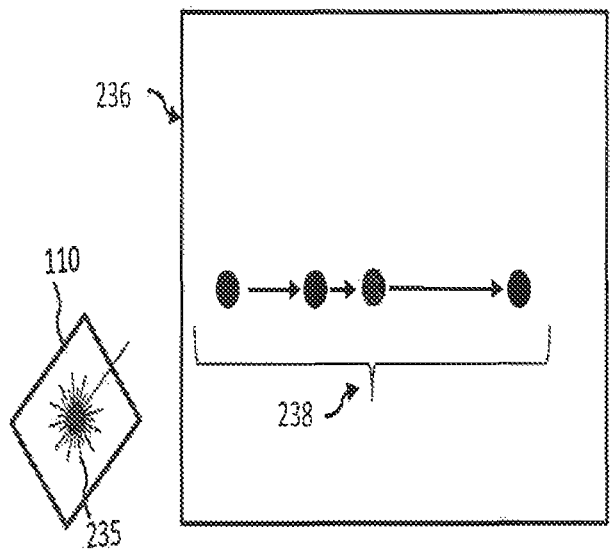

In FIG. 2B LIDAR 110 is dynamically steered by modulating the angular velocity of laser 235 while maintaining a constant pulse rate. The result of configuring the electronically steerable laser to dynamically modulate the angular velocity (or position of the laser in the FOV 236) is a sequence 238 of laser pulses with directions in a 1-dimensional range that are separated by varying amounts. FIG. 2B illustrates dynamically steering a laser including at least three different velocities in the course of a single sweep of the FOV including an initial nominal velocity followed by slowing down the laser trajectory to group pulses more closely and then followed by speeding up the laser to separate laser pulses by more than the nominal separation.

Figure 2C:
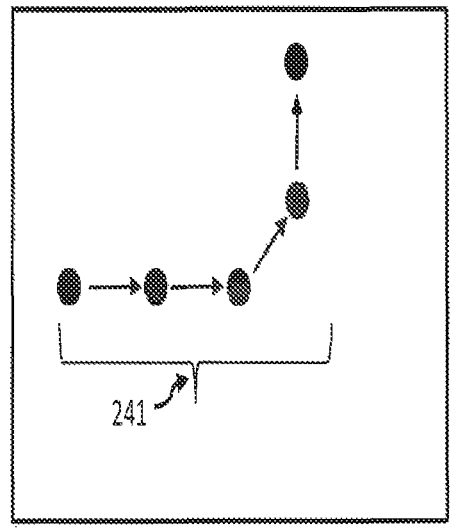

FIG. 2C illustrates dynamically steering a laser in 2 dimensions to generate a sequence of laser pulses 241 that span a 2-D angular range. The resulting sequence has a 2-D angular range from a single laser, in contrast to a rotating LIDAR where each laser generates a sequence with a 1-dimensional angular range. A LIDAR can be configured to dynamically steer a laser to produce sequence 241 by dynamically controlling the angular velocity or position of the laser in 2 dimensions (e.g. both azimuthal and elevation). Such a sequence cannot be performed by a rotating LIDAR due in part to the angular momentum of the rotating components preventing fast modulation of the elevation angle above and below azimuthal plane.

Figure 2D:
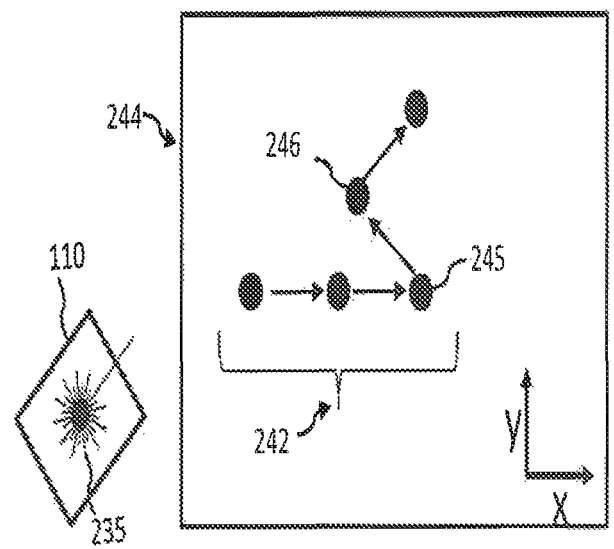

FIG. 2D illustrates dynamically steering a laser to generate a sequence of laser pulses, including several direction reversal during the sequence. For example, laser pulse sequence 242 begins by progressing the laser from left to right across the FOV 244. After laser pulse 245 the laser is reconfigured to reverse the X component of the laser direction from the positive X direction to the negative X direction. After laser pulse 246 the laser is configured to reverse direction again (i.e., back to a positive X direction). In contrast to merely modulating the speed of laser 235 in the positive X direction, direction reversals enable a dynamically steered laser to scan back and forth across a discovered boundary. In addition 2-D dynamic steering combined with direction reversal in the course of a scan of FOV 244 enables laser 235 to dynamically scan along a complex shaped boundary of an object.

Figure 2E:
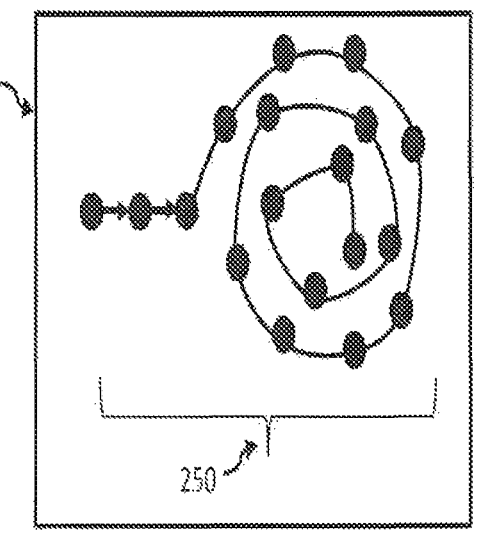

FIG. 2E illustrates dynamically steering a steerable laser (e.g. electronically steerable laser 235 in FIG. 2D) to generate a sequence of laser pulses 250 that generate a complex (e.g. spiral) shape. Complex sequence 250 is not possible with a LIDAR that is not dynamically steered (e.g. a LIDAR that that merely rotates around a single axis). One advantage of generating a complex shaped sequence with non-uniform spacing is the ability to arbitrarily determine the order in which portions of the FOV 255 are scanned. For example, sequence 250 may eventually scan a similar region with a similar density as a rotating LIDAR but has the advantage of scanning the outer perimeter first and then gradually progressing towards the center of FOV 255.

Figure 3:
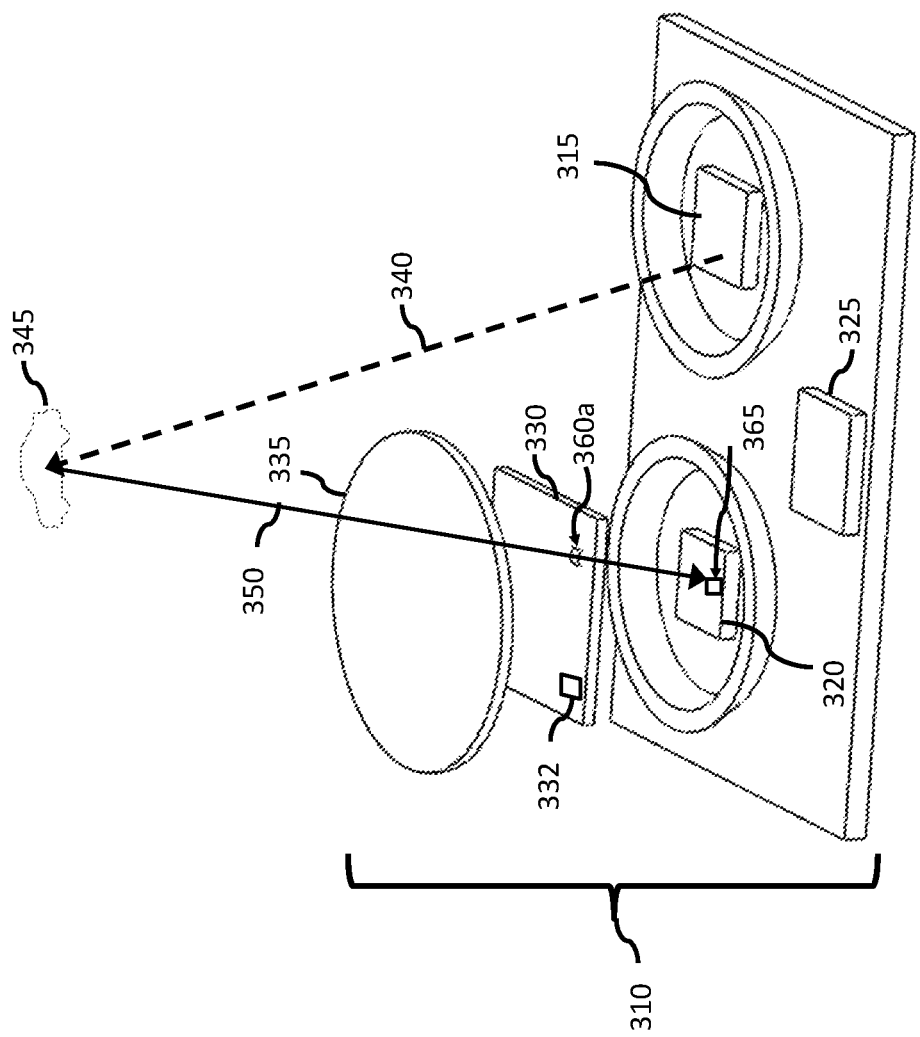
FIG. 3 illustrates several components of a solid state laser range finder, according to an embodiment of the present disclosure.

FIG. 3 illustrates some of the components of a solid-state laser range finder 310 operable to be dynamically steered. Laser range finder 310 can have a steerable laser transmitter 315, such as an optical phased array (OPA). Steerable laser transmitter 315 can comprise a laser generator to generate a set of laser pulses and a laser positioner to transmit the pulses in a set of directions in the field of view of the laser range finder. The laser positioner can comprise a laser splitter, a multimode interference coupler, an optical phase shifter (e.g. linear ohmic heating electrodes) or an out of plane optical coupler to combine the split, phase-shifted beams into an output laser beam pointed in a steerable direction. Laser range finder 310 has a light detector 320 (e.g. a PIN photodiode, avalanche photodiode, a focal plane array or CCD array). The light detector can function to detect reflections (e.g. 350) from the set of laser pulses (e.g. 340) when they interact with objects in the field of view (e.g. vehicle 345). Solid state laser range finder 310 can contain a lens 335 operable to focus laser reflections onto the detector 320. Laser range finder 310 can contain control circuitry 325. Control circuitry 325 can function to receive or generate laser steering parameters indicating how the steerable laser transmitter 315 should be steered (e.g. directions, paths, or regions to scan with the laser). Control circuitry 325 can further function to generate commands or signals to the steerable laser assembly 315 instructing the steerable laser assembly to generate a continuous or pulsed laser beam in a sequence of directions.

Dynamically Steerable Laser Range Finder

Figure 4A:
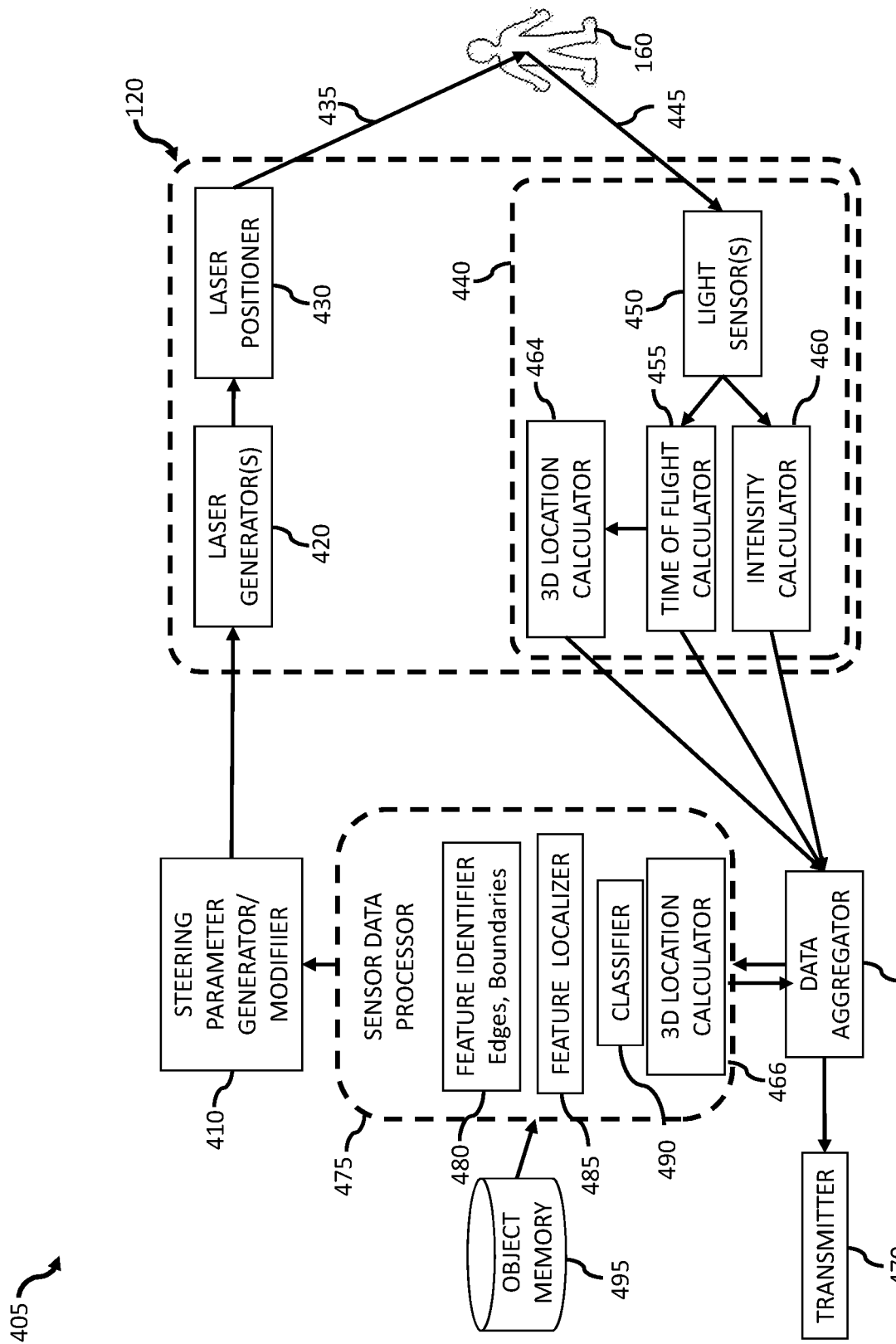
FIGS. 4A and 4B are functional diagrams illustrating several components of an exemplary dynamically steerable laser range finder in accordance with an embodiment of the present disclosure.

FIG. 4A illustrates several components of an exemplary laser range finder 405 operable to be dynamically steered in accordance with an embodiment of this disclosure. Laser range finder 405 can contain a steerable laser assembly 120 or a steerable laser transmitter comprising a laser generator 420 and a laser positioner 430. Laser range finder 405 can contain a laser steering parameter generator 410 to generate laser steering parameters based on processed sensor data from sensor data processor 475. Laser steering parameter generator 410 can function to generate laser steering parameters (e.g. instructions) and transmit the parameters to the steerable laser assembly 120. Laser steering parameter generator 410 can transmit the parameters in a timed manner, such that upon receiving each laser steering parameter the steerable laser assembly 120 executes or reacts to the laser steering parameter. Alternatively, laser steering parameters can be transmitted in a batch or instruction file that is executed over a period of time by the steerable laser assembly 120.

Steerable laser assembly 120 can comprise one or more laser generators 420, a laser positioner 430, and one or more detectors 440. The one or more laser generators 420 can be laser diodes (to produce one or more laser beams (e.g. beam 435) at one or more locations in the FOV determined by the laser positioner 430. Laser positioner 430 functions to steer one or more laser beams (e.g. beam 435) in the FOV based on the laser steering parameters. Laser positioner 430 can mechanically steer a laser beam from laser generator 420. Rotating LIDARs often use a mechanically steered laser positioner. An exemplary mechanically steered laser positioner 430 can include mechanical means such as a stepper motor or an induction motor to move optical components relative to the one or more laser generators. The optical components in an exemplary mechanical laser positioner can include one or more mirrors, gimbals, prisms, lenses and diffraction grating. Acoustic and thermal means have also been used to control the position of the optical elements in the laser positioner 430 relative to the one or more laser generators 420. Laser positioner 430 can also be a solid state laser positioner, having no moving parts and instead steering an incoming laser beam using electronic means to steer the laser beam 435 in an output direction within the FOV. For example, an electronically steerable laser assembly can have a solid state laser positioner comprising a plurality of optical splitters (e.g. Y-branches, directional couplers, or multimode interference couplers) to split an incoming laser beam into multiple portions. The portions of the incoming laser beam can then be transmitted to a plurality of delay line where each portion is delayed by a selectable amount (e.g. delaying a portion by a fraction of a wavelength). Alternatively, the delay lines can provide wavelength tuning (e.g. selecting slightly different wavelengths from an incoming laser beam). The variable delayed portions of the incoming laser beam can be combined to form an output laser beam at an angle defined at least in part by the pattern of delays imparted by the plurality of delay lines. The actuation mechanism of the plurality of delay lines can be thermo-optic actuation, electro-optic actuation, electro-absorption actuation, magneto-optic actuation or liquid crystal actuation. Laser positioner 430 and one or more laser generators 420 can be combined onto a chip-scale optical scanning system such as DARPA's Short-range Wide-field-of-view extremely agile electronically steered Photonic Emitter (SWEEPER).

Detector 440 can contain light sensors 450 (e.g. photodiodes, avalanche photodiodes, PIN diodes or charge coupled devices CCDs), signal amplifiers (e.g. operational amplifiers or transconductance amplifiers), a time of flight calculator circuit 455 and an intensity calculator 460. Detector 440 can comprise one or more photodiodes, avalanche photodiode arrays, charge coupled device (CCD) arrays, single photon avalanche detectors (SPADs), streak cameras, amplifiers and lenses to focus and detect reflected laser light from laser beam 435. The construction of the steerable laser assembly 120 can co-locate detector 440 and laser positioner 430 such that detector 440 is pointed in the direction of the outgoing laser beam and can focus the detector on a narrow part of the FOV where the reflected light is anticipated to come from.

The steerable laser assembly 120 of laser range finder 405 can generate a pulsed or continuous laser beam 435. Steerable laser assembly 120 can receive one or more laser reflections 445 corresponding to laser beam 440. Laser range finder 405 can contain a light sensor 450 to detect reflected light from the laser pulses or continuous laser beam.

Steerable laser assembly 120 can contain a time of flight calculator 455 to calculate the time of flight associated with a laser pulse striking an object and returning. The time of flight calculator 455 can also function to compare the phase angle of the reflected laser beam with the phase of the corresponding outgoing laser beam and thereby estimate the time-of-flight. Time of flight calculator 455 can also contain an analog-to-digital converter to detect an analog signal resulting from reflected photons and convert it to a digital signal. Laser range finder 405 can contain an intensity calculator 460 to calculate the intensity of reflected light.

Laser range finder 405 can contain a data aggregator 465 to gather digitized data from time of flight calculator 455 and intensity calculator 460 or 3D location calculator 464. Data aggregator 465 can group data into packets for transmitter 470 or sensor data processor 475. Laser range finder 405 can contain a transmitter 470 to transmit data packets. Transmitter 470 can send the data to a processing subassembly (e.g. a computer or a remote located sensor data processor) for further analysis using a variety of wired or wireless protocols such as Ethernet, RS232 or 802.11.

Laser range finder 405 can contain a sensor data processor 475 to process sensor data and thereby identify features or classifications for some or all of the FOV. For example, data processor 475 can identify features in the FOV such as boundaries and edges of objects using feature identifier 480. Data processor 475 can use feature localizer 485 to determine a region in which the boundaries or edges lie. Similarly a classifier 490 can use patterns of sensor data to determine a classification for an object in the FOV. For example, classifier 490 can use a database of previous objects and characteristic features stored in object memory 495 to classify parts of the data from the reflected pulses as coming from vehicles, pedestrians or buildings. In the embodiment of FIG. 4A sensor data processor 475 is located close to the steerable laser assembly (e.g. in the same enclosure), thereby enabling processing of the sensor data (e.g. reflection ranges) without the need to transmit the reflection data over a wired or wireless link FIG. 4A is an example of an embedded processing architecture where the latency associated with a long distance communication link (e.g. Ethernet) is avoided when transmitting range data to the sensor data processor.

Figure 4B:
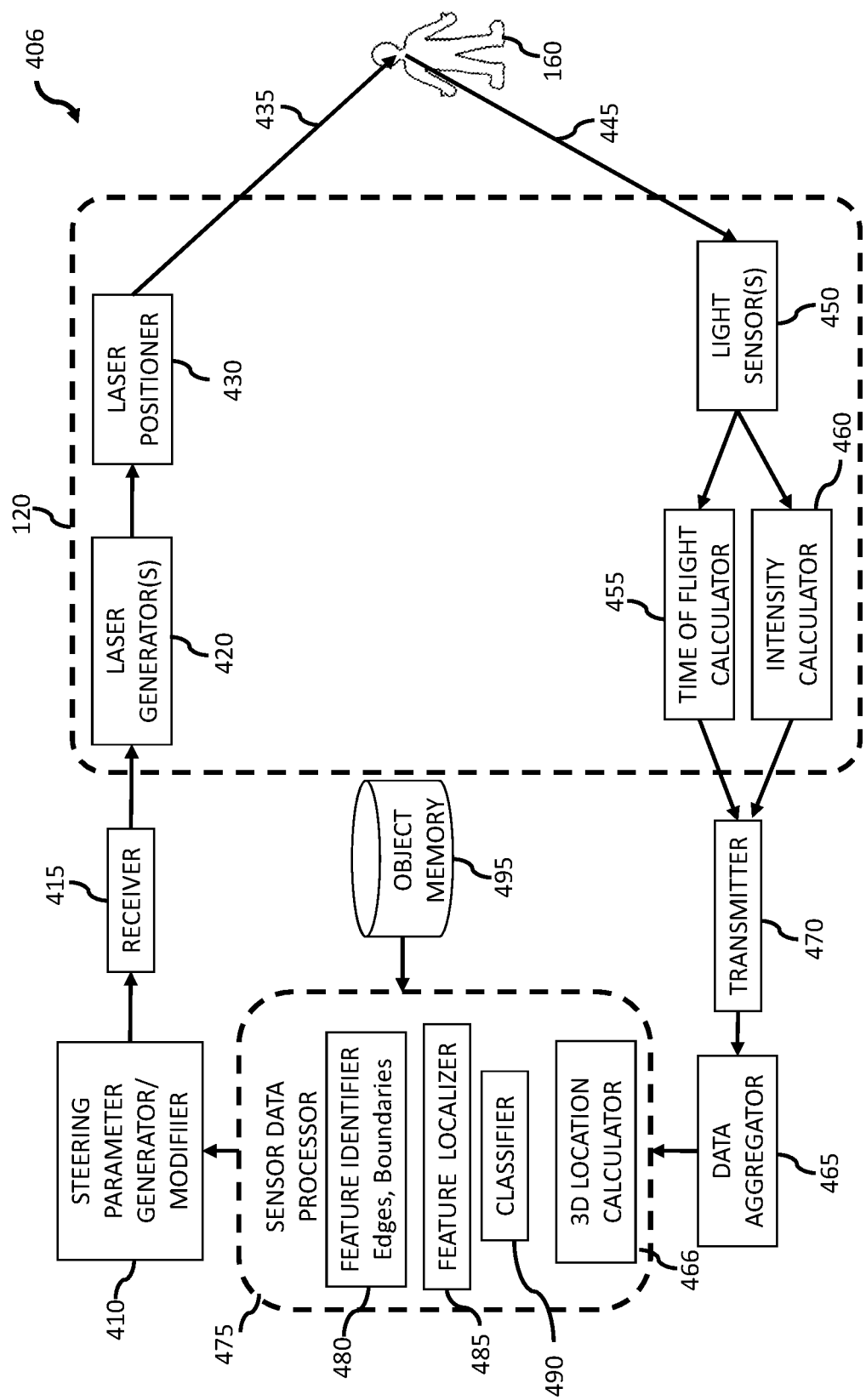

FIG. 4B illustrates several components of a dynamically steered laser range finder system 406 in accordance with an embodiment of this disclosure. In this embodiment the data processing and laser steering parameter generation components are remotely located from the steerable laser assembly 120. Laser range finder 406 can contain a receiver 415 to receive laser steering parameters from the remotely located laser steering parameter generator 410. Receiver 415 can be a wired or wireless receiver and implement a variety of communication protocols such as Ethernet, RS232 or 802.11. Transmitter 470 can transmit data from the time of flight calculator 455 intensity calculators and 3D location calculator 464 (in FIG. 4A) to a remote located data aggregator 465.

FIG. 5A illustrates several components of a laser range finder 510 according to several embodiment of the present disclosure. Laser range finder 510 can contain a processing subassembly 520, a steerable laser assembly subassembly 120 and a communication link 530 for linking the processing and steerable laser assemblies. Processing subassembly 520 can include one or more processors (e.g. sensor data processor 475 in FIGS. 4A and 4B) and one or more transceivers (e.g. a transceiver including receiver 415 and transmitter 470 in FIG. 4B) such as an Ethernet, RS485, fiber optic, Wi-Fi, Bluetooth, CANBUS or USB transceiver. Processing subassembly 520 can also include a computer-readable storage medium (e.g. flash memory or a hard disk drive) operable to store instructions for performing a method to detect and utilize a remote mirror (e.g. a roadside mirror). Steerable laser assembly 120 can include a laser generator 420 and a laser positioner 430 to steer a laser beam at one or more locations in the FOV based on the laser steering parameters. Laser positioner 430 can include one or more optical delay lines, acoustic or thermally based laser steering elements. In a solid state steerable laser assembly, laser positioner 430 can function to receive instructions (e.g. laser steering parameters) and thereby delay portions of a laser beam (i.e., create a phase difference between copies of the laser beam) and then combine the portions of the laser beam to form an output beam positioned in a direction in the FOV. A mechanical laser positioner 430 can be a mirror and mirror positioning components operable to receive input signals (e.g. PWM input to a steeper motor) based on laser steering parameters and thereby steer the mirror to position a laser in a direction in the FOV. Steerable laser subassembly 120 can also include a detector 440 comprising components such as light sensor(s) 450, time of flight calculator 455 and light intensity calculator 460 and 3D location calculator. Steerable laser subassembly 120 can include one or more transceivers (e.g. receivers 415 and transmitters 470 in FIG. 4B) such as Ethernet, RS485, fiber optic, Wi-Fi, Bluetooth, CANBUS, or USB transceivers. Communication link 530 can be a wired link (e.g. an Ethernet, USB or fiber optic cable) or a wireless link (e.g. a pair of Bluetooth transceivers). Communication link 530 can transfer laser steering parameters or equivalent instructions from the processing subassembly 520 to the steerable laser assembly 120. Communication link 530 can transfer ranging data from the steerable laser assembly to the processing subassembly 520.

When operably linked to steerable laser assembly 120 the processing subassembly 520 can perform one or more embodiments of the method to find, utilize and correct for a remote mirror in the FOV of laser range finder 510.

FIG. 5B illustrates exemplary laser steering parameters 501 according to aspects of the technology. Laser steering parameters can be instructions operable to steer a laser beam with a steerable laser assembly in a FOV or steer a controllable magnifier. For example, in an electronically scanned laser range finder (e.g. model S3 from Quanergy Inc. of Sunnyvale, Calif.) a set of laser steering parameters can define aspects of the output laser beam such as the direction, pulse duration, intensity and spot size. Laser steering parameters can function to instruct the laser generator 420 in FIG. 4A to define aspects such as laser spot size, intensity and pulse duration. Laser steering parameters can instruct laser positioner 430 in FIG. 4A how to delay portions of the laser beam and combine the delayed portions to define the direction of the output laser beam. A mechanically steered LIDAR can perform dynamic steering by using laser steering parameters to dynamically position the laser in the FOV or to dynamically position a mirror to reflect the laser beam in a desired direction. Laser steering parameters can be operable to instruct a steerable laser assembly to steer a laser beam and can be transmitted to the steerable laser assembly as a file. Alternatively laser steering parameters can be stored in a file and can be sequentially processed and used to generate electrical signals operable to generate and guide a laser beam. For example, laser steering parameters can be similar to the parts of a stereolithography (.STL) file. STL files are commonly used as instruction sets to position extruder heads and cutting heads in 3D printers, cutting tools and laser stereolithography. A set of laser steering parameters 501 can include a start location 502 indicating where one or more other laser steering parameters should be applied. Start location 502 can be a point in a Cartesian coordinate system with an associated unit of measure (e.g. 20 mm to the right and 20 mm above the lower right corner of the lower left corner of the field of view). In several laser range finders the FOV is described in terms of angular position relative to an origin in the FOV. For example, a starting point could be +30 degrees in the horizontal direction and +10 degrees in the vertical direction, thereby indicating a point in the FOV.

A laser steering parameter can be a region width 504 or a region height 506. The width and height can be expressed in degrees within the FOV. One exemplary set of laser steering parameters could include a start location, region width and region height thereby defining a four sided region in the FOV. Other laser steering parameters in the exemplary set of laser steering parameters can indicate how to tailor a scan within this region, such as laser scan speed 514, laser pulse size 516 or number of laser pulses 518.

A laser steering parameter can be one or more region boundaries 508 defining the bounds of a region. A laser steering parameter can be one or more laser pulse locations 511. Pulse locations 511 can provide instructions to a steerable laser to move to corresponding positions in the FOV and generate on or more laser pulses. In some embodiments the laser can be generating a laser beam while being steered from one location to another and can dwell for some time at the laser pulse locations. In other embodiments the steerable laser can use these points 511 to generate discrete pulses at defined locations. In such embodiments the laser beam can be generated at discrete pulse locations and can dwell at the pulse location for some time.

A laser steering parameter can be one or more path waypoints 512, which define points in a FOV where a steerable laser can traverse or points at which the steerable laser can implement direction changes. FIG. 5C illustrates two exemplary paths 540 and 550 that can be defined by path waypoints (e.g. waypoints 512) and used to instruct a steerable laser. It would be obvious to a person of skill in the art that several laser steering parameters can produce equivalent or nearly equivalent regions of non-uniform pulse density, for example, selecting various combinations of laser steering parameters such as combinations of paths 540 and 550 to produce similar regions of increased or non-uniform laser pulse density.

Remote Mirror

Figure 6A:
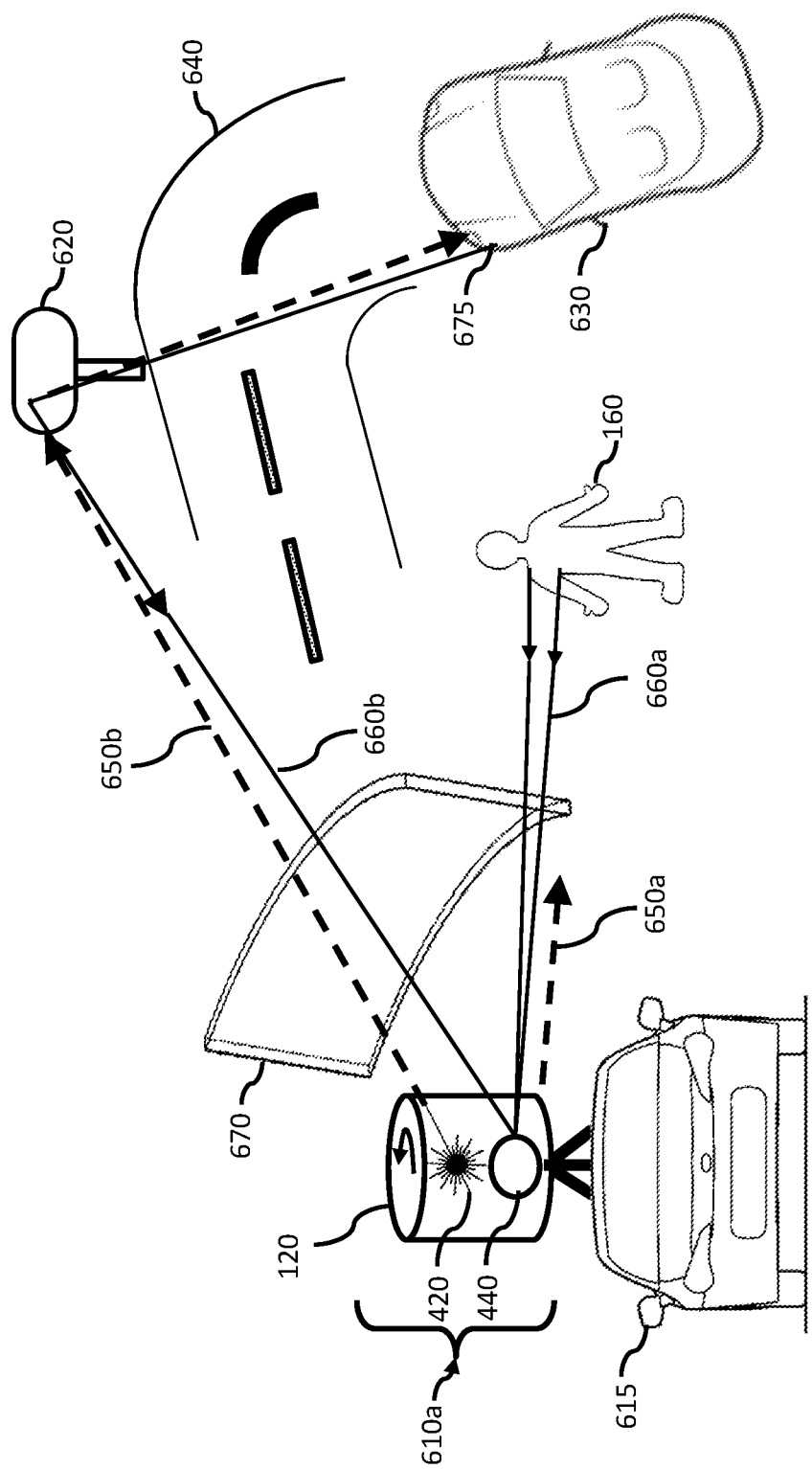
FIGS. 6A, 6B and 6C illustrate systems in which a laser range finder utilizes a remote mirror in the FOV to provide some of laser reflections, according to embodiments of the present disclosure

Turning to FIG. 6A reflectors (e.g. mirrors) are an integral part of many vehicles where they provide drivers with an augmented field of view. Humans are well suited to recognizing mirrors and adapting the position of mirrors to achieve desired remote fields of view (e.g. a remote field of view showing a blind-spot over the drivers shoulder). While mirrors provide indirect reflected images from locations in the environment local to the vehicle, the exact locations associated with the reflected images are often difficult to determine.

In the context of laser range finders, two possible categories of mirrors are: integrated mirrors that are integrated or attached to the range finder and remote mirrors that are observed by the laser range finder in the local environment (e.g. a mirror on a passing vehicle that appears in the range finder FOV but is not associated with a laser range finder). Laser range finders use integrated mirrors to perform a variety of functions. For example, an integrated scanning mirror in a rotating LIDAR (e.g. HDL-64e from Velodyne Inc. of Morgan Hill, Calif.) can distribute laser pulses in a plurality of directions. Similarly, U.S. Pat. No. 9,285,477 issued to Smith discloses a compensation mirror that deflects outgoing and incoming laser pulses that have been distributed by a scanning mirror in a plurality of directions. In the Smith patent, the compensation mirror is part of the laser range finder, has a known position and occupies the entire FOV of the scanning mirror (i.e., all outgoing and incoming laser beams are deflected by the compensation mirror). Integrated mirrors (e.g. attached or integrated) in laser range finders can be characterized during the design or manufacturing process. Therefore, the effect of integrated mirrors can be accounted for at the design stage. Similarly, an integrated mirror in a laser range finder can be controlled by the laser range finder (e.g. rotating a scanning mirror to a controlled direction), and thereby provide a predictable effect on a laser pulse.

In contrast, when a laser range finder encounters a remote mirror in the local vicinity, several aspects of the remote mirror can be unknown (e.g. mirror shape, dimensions or orientation) or uncontrolled (e.g. mirror location in the FOV). For the purpose of this disclosure a mirror is a remote mirror with regard to an optical assembly if the mirror is neither attached to nor integrated into the optical assembly. In some cases the remote mirror can have a variable location in the FOV of the optical system (e.g. laser range finder, optical detector or steerable laser assembly). The location of the remote mirror can be controlled or uncontrolled by the optical system. Exemplary remote mirrors include wing-mirrors and rear-view mirrors in vehicles and roadside mirrors.

In the context of a laser range finder a remote mirror can function to occupy a portion of the FOV (e.g. a subset of all laser directions in which the range finder can perform laser ranging) and provide indirect laser reflections that have been deflected by the remote mirror. As such, a remote mirror can deflect outgoing laser pulses from a laser range finder and thereby provide laser reflections from locations beyond the set of reflection locations that can be directly reached by the laser range finder. A remote mirror can be placed at some fixed or variable distance from a laser range finder (e.g. 10 meters). In this way the remote placement of the remote mirror acts to provide an alternative FOV. For example, an integrated compensation mirror such as disclosed in U.S. Pat. No. 9,285,477 can reposition an outgoing laser pulse but cannot compensate for obstacles in the local environment. However, a remote mirror with suitable placement at some distance from the laser range finder can provide a valuable alternative FOV (e.g. around corners or in a vehicle blind spot).

A remote mirror can have transient placement in the FOV of a laser range finder, such as stationary roadside mirror that appears briefly in the FOV of a laser range finder attached to a passing vehicle. A remote mirror can occupy a variable or fixed portion of the FOV of a laser range finder. A remote mirror can have a variable orientation (e.g. a variable angle of rotation or compass direction) while occupying a fixed portion of the FOV of a laser range finder. For example, a wing-mirror on an autonomous vehicle can occupy a fixed portion of the FOV of a range finder while having an unknown orientation. A remote mirror can occupy a portion of the FOV of a laser range finder that is initially unknown to a laser range finder (i.e., initially unknown placement) but is later learned by processing aspects of sensor data (e.g. camera imagery or laser reflection data). A remote mirror and a laser range finder can be attached to a common host vehicle. Alternatively, a remote mirror can be stationary and the laser range finder can be on a host vehicle operable to move relative to the remote mirror. A remote mirror can be dedicated to a laser range finder (e.g. a wing-mirror dedicated to a laser range finder on an autonomous vehicle). Alternatively, a remote mirror can be shared by many laser range finders (e.g. a remote road-side mirror at a busy traffic intersection). A remote mirror can have a concave, convex, flat or complex shape. A remote mirror can constructed from a reflective metal, metallized glass or metallized plastic. A remote mirror can occupy a small portion of the FOV of a laser range finder (e.g. a small 5×5 degree portion of the FOV) that is operable to provide detailed range data regarding a remote FOV, such as a larger remote field of view provided by a small convex remote mirror.

Figure 6B:
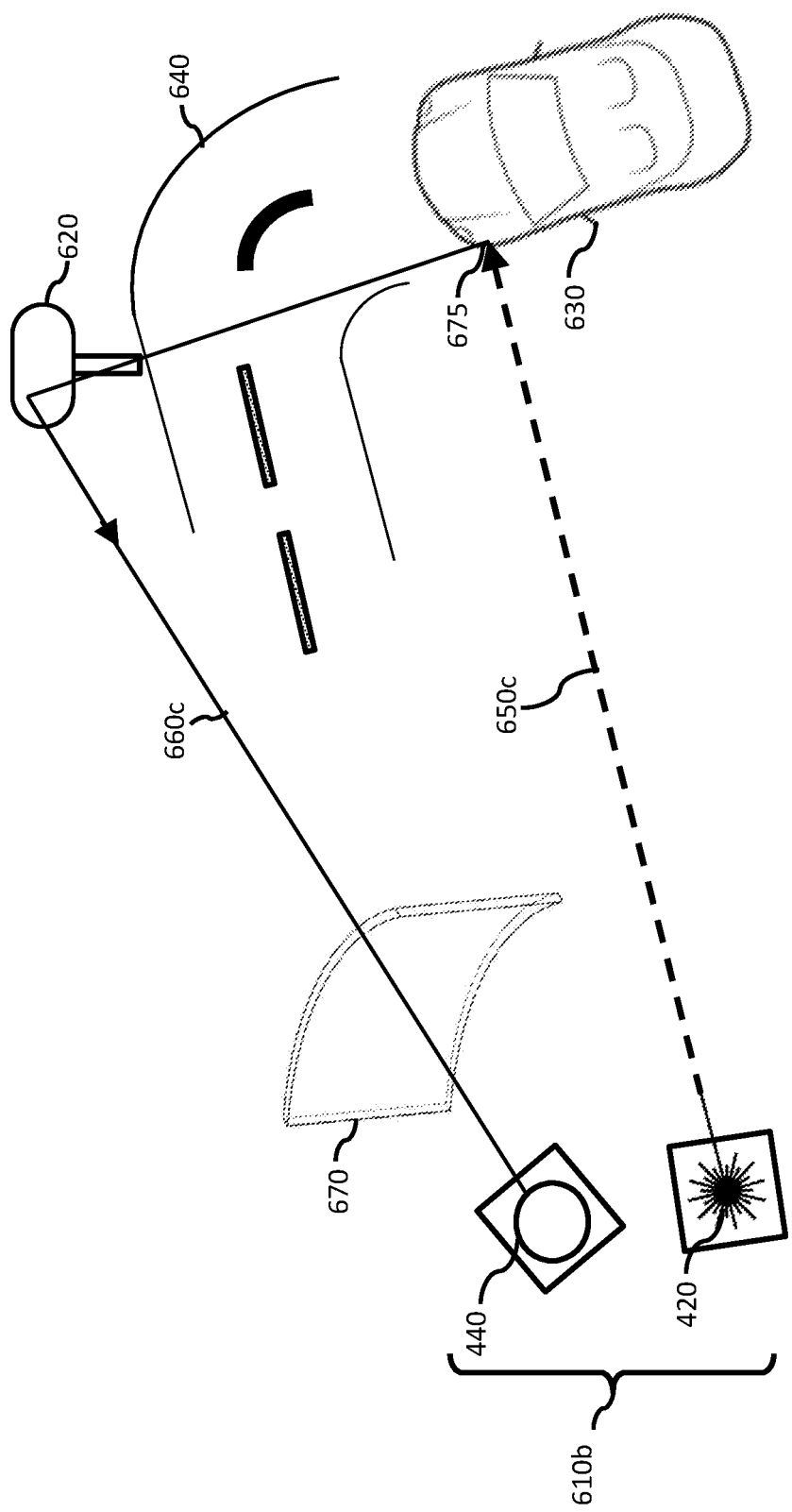
Figure 6C:
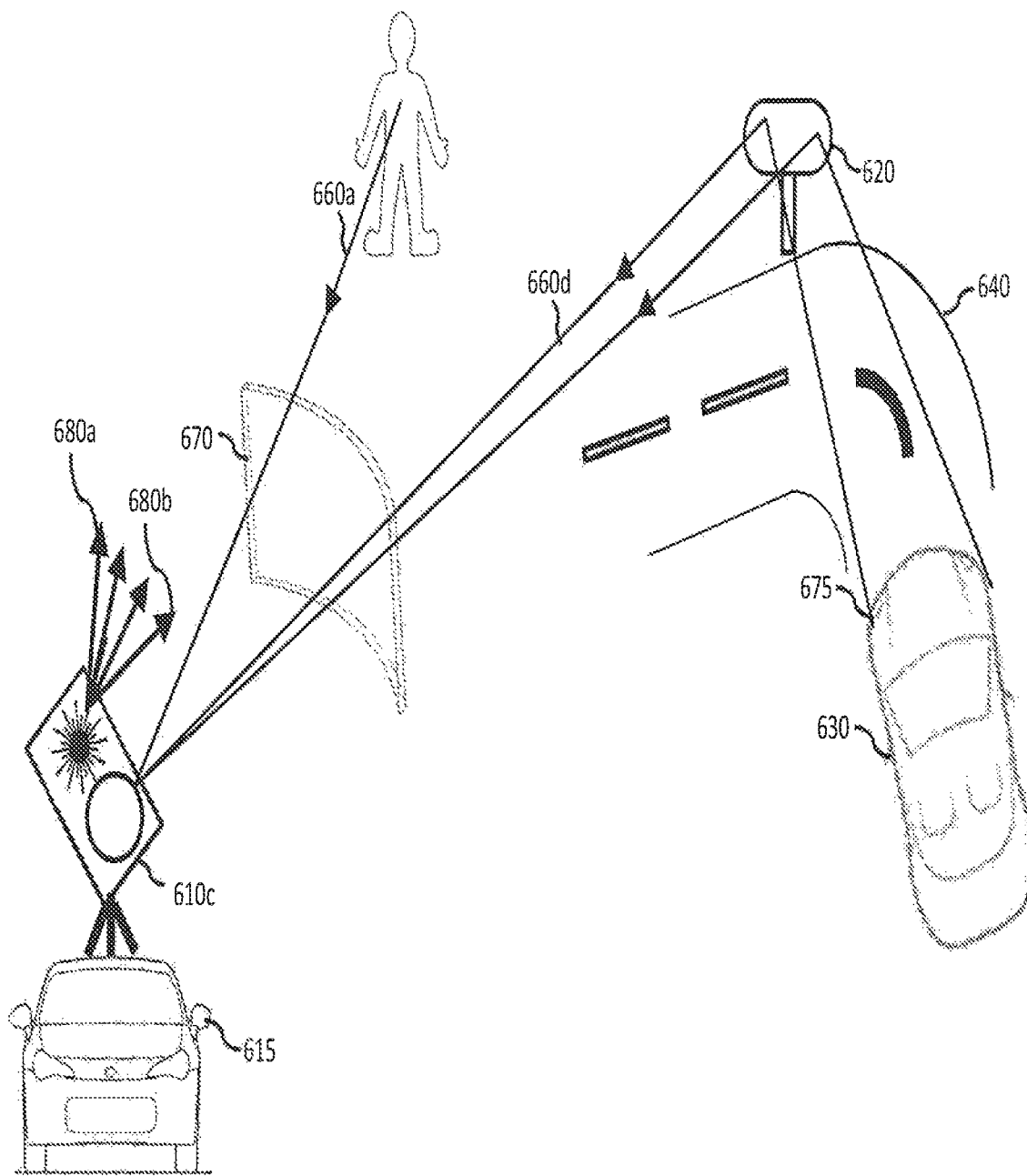

FIGS. 6A, 6B and 6C illustrate systems in which a laser range finder utilizes a remote mirror in its FOV to deflect some laser reflections and thereby utilize the mirror to access remote reflection locations (e.g. around a bend 640 in a roadway). Finding a mirror with an unknown location using a laser range finder is a difficult challenge because the mirror appears to be a window to a remote (i.e., indirect) field of view that is being deflected and is difficult to distinguish from the reflected location itself. In this regard a mirror with an unknown location could trick a laser range finder, similar to a how a house-of-mirrors confuses humans. There are many cases when autonomous vehicles (e.g. self-driving cars and robots) could encounter and utilize a remotely located mirror (i.e., a remote mirror) positioned in the vicinity of the vehicle but not necessarily under the control of the vehicle (e.g. roadside mirrors, mirrors in office corridor). Remote mirrors can provide reflections from important or safety critical locations beyond the direct FOV of the laser range finder.

Hence, two relevant challenges when utilizing a remote mirror with a laser range finder are to firstly discover and track the location of a remote mirror with the laser range finder and secondly to determine a correction step in the process of identifying a 3D location representative of the reflection location for the subset of laser reflections that have undergone deflection by a remote mirror. Several embodiments of the present disclosure are directed to systems and methods for discovering and correcting for a remote mirror in the FOV of a laser range finder. In particular, several embodiments provide a method for measuring reflection data, including distance and direction data, for a set of laser reflections resulting from a sequence of outgoing laser pulses. The method can identify the location of a remote mirror with variable or unknown location in the FOV and determine a subset of the set of laser reflections that have undergone deflection by the remote mirror in the process of reaching the laser range finder (i.e., a deflected subset). The method can then compute a 3D location for each of the laser reflections in the set of laser reflections from the corresponding reflection data and apply a correction step in the computation process for those laser reflections in the deflected subset. In some embodiments the correction step can function to generate 3D locations for deflected laser reflections that are more representative of the actual reflection locations than without the correction step.

In some embodiments, the method can generate a 3D location for the complete set of reflections (e.g. as is commonly output by many LIDAR in a .las file format) and the then post process the 3D locations to apply the correction step to the initial 3D location corresponding to reflections in the deflected subset of reflections. In this way, a standard steerable laser assembly such as those found in many LIDAR can be used to gather laser reflections and output 3D locations, via a communication link, to a processing subassembly (e.g. 520 in FIG. 5). The processing subassembly can subsequently correct a subset of the locations corresponding to laser reflections that are judged to have undergone deflection by a remote mirror prior to reaching the steerable laser assembly.

FIG. 6A illustrates a laser range finder 610a utilizing a roadside remote mirror 620 to gather reflections (e.g. 660a) from a vehicle 630 located around a bend in the road 640. In FIG. 6A laser range finder 610a can comprise a steerable laser assembly 120 including a laser generator 420 and a detector 440. Laser range finder 610a is mounted to vehicle 615.

Steerable laser assembly 120 can rotate or scan thereby enabling the laser generator 420 to generate a set of outgoing laser pulses (e.g. 650a, 650b) in a variety of different directions. Following each outgoing laser pulse, detector 440 can monitor for laser reflections (e.g. 660a, and 660b) within a detector FOV 670. The detector FOV can be defined as the set of all possible directions at the detector in which an incoming laser reflection can reach the detector. Each reflection (e.g. 660a) detected by the detector has an associated reflection direction within the detector FOV 670.

Some of the outgoing laser pulses e.g. 650a are reflected by objects in the FOV and generate corresponding laser reflection (e.g. 660a). Other outgoing laser pulses (e.g. 650b) are deflected by a remote mirror 620 and are subsequently reflected from an object (e.g. vehicle 630). Reflection 660b can travel a similar path to laser pulse 650b, being deflected by the remote mirror towards detector 440. In this way, an outgoing beam 650b causes a reflection 660b that is measured by the detector to come from the direction of the mirror, when it actually comes from reflection location 675. In some embodiments, a correction step performed by electronic circuitry in the laser range finder 610a provides means to identify the actual reflection location 675 for laser reflection 660b instead of identifying the remote mirror 620 as the reflection location. Remote mirror 620 can provide valuable information regarding the location of vehicle 630 to a variety of systems in vehicle 615, such as collision avoidance systems and autonomous driving systems. In the embodiment of FIG. 6A both laser generator 420 and detector 440 are collocated in a steerable laser assembly 120. Furthermore, the detector 440 can be aimed to point in the same direction as the laser generator 420 as the steerable laser assembly scans. Hence, some of the outgoing laser pulses (e.g. 650b) and the corresponding laser reflections (e.g. 660b) can be deflected by a remote mirror. For the purposes of this disclosure a laser range finder (e.g. 610a) is considered monostatic when the laser generator is collocated with the detector.

FIG. 6B illustrates a system similar to FIG. 6A with a bistatic laser range finder 610b. For the purpose of this disclosure a bistatic laser range finder has a detector that is not co-located with the laser generator. For example, detector 440 could be located on a different part of a vehicle (e.g. behind the grille or the headlights) while the laser generator 420 can be located on top of host vehicle (e.g. 615 in FIG. 6A). One or more outgoing laser pulses (e.g. 650c) can directly reflect from an object (e.g. at reflection location 675). A reflected laser pulse (e.g. 660c) can be deflected by remote mirror 620 and hence reach the detector 440. In the embodiment of FIG. 6B the laser generator and detector can have different fields of view but the detector can nevertheless have a detector FOV 670 in which some of the laser reflections reaching the detector have undergone deflection by the remote mirror (e.g. a deflected subset of laser reflections). FIG. 6C illustrates a flash laser range finder 610c in which the laser generator illuminated a plurality of directions (e.g. 680a and 680b) simultaneously. The advantage of a flash laser range finder (e.g. 610c) is that many parts of the emitter FOV can be illuminated simultaneously without necessarily having to scan the laser generator to a plurality of individual locations. A flash laser range finder or a 3D camera can provide multiple reflections following a single laser flash transmitted into the surrounding environment. Some of the laser reflections such as 660d can reach the flash laser range finder after being deflected by the remote mirror.

Figure 7A:
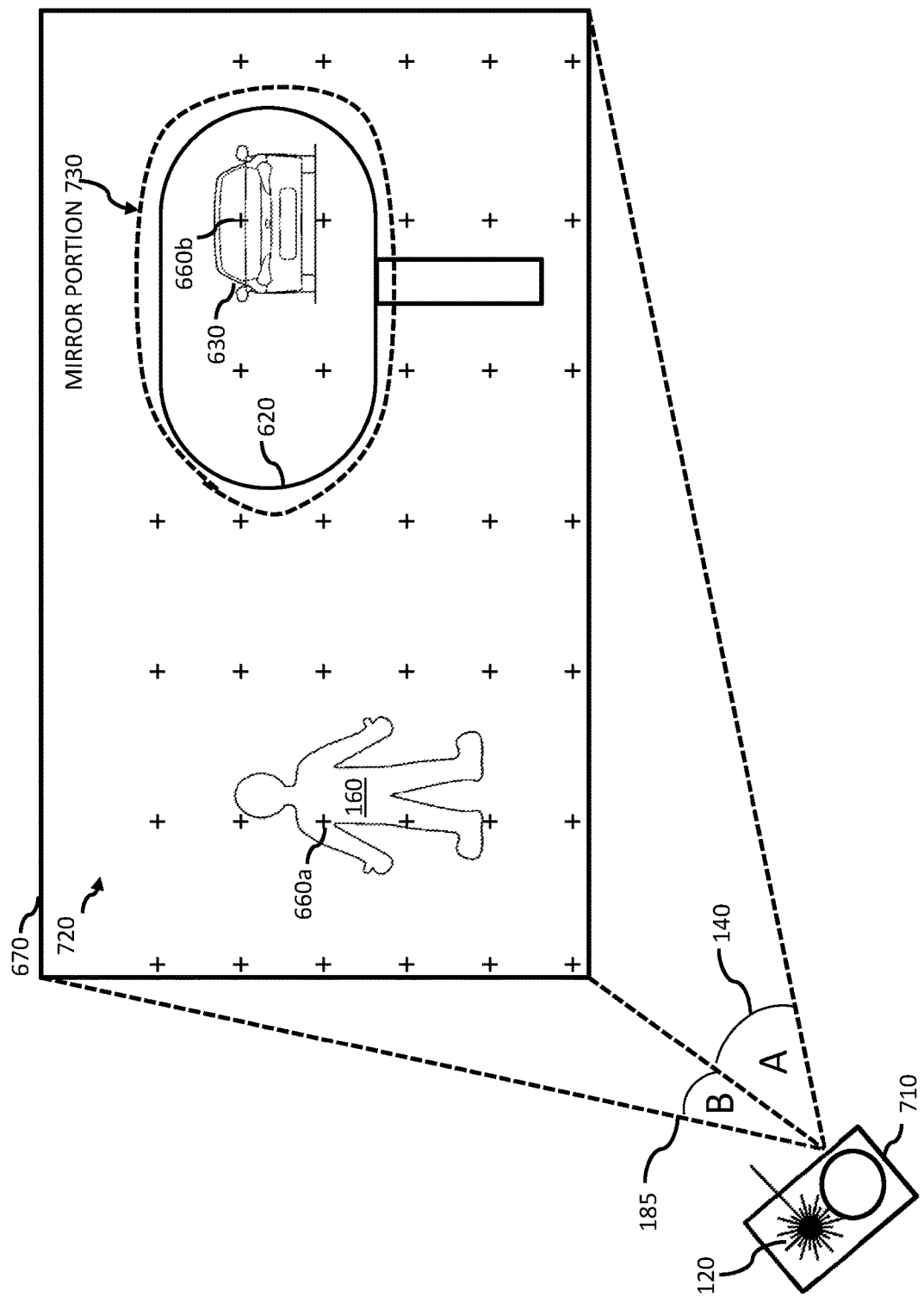
FIGS. 7A and 7B illustrate a laser range finder and an associated FOV that contains a remote mirror, according to aspects of the present technology.

FIG. 7A illustrates a laser range finder 710 and a FOV 670 for the detector. A set of laser reflections 720 is detected by detector 440, corresponding to an outgoing laser pulse sequence (not shown). Reflections are shown as points in the FOV since each reflection can be represented by a point location in the 2-D X-Y FOV. Some laser reflections (e.g. 660a) come directly from objects (e.g. person 160) in the FOV.

Deflected Subset of Laser Reflections

Figure 7B:
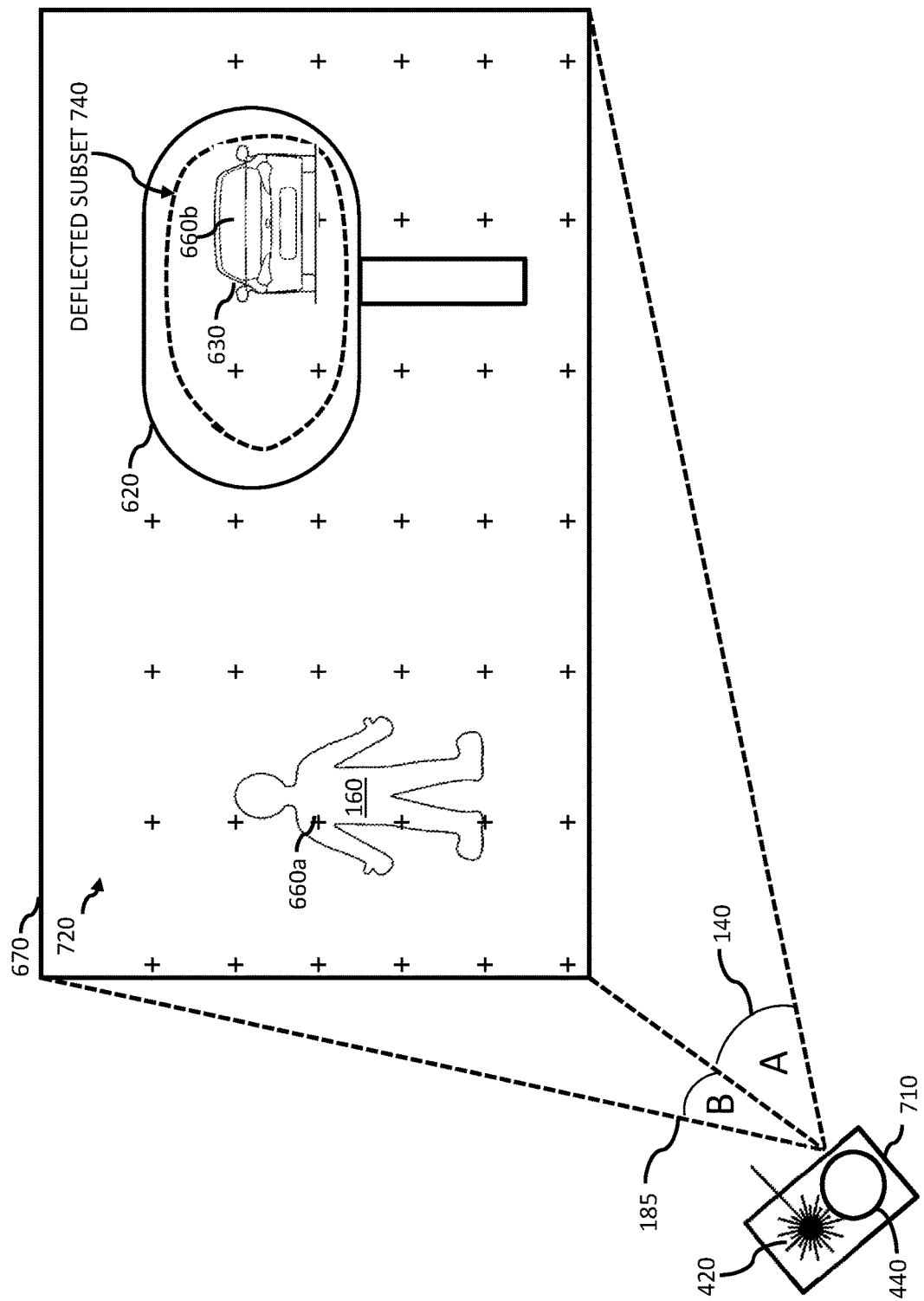

In one aspect of several embodiments a portion 730 of the FOV can contain a remote mirror. In some embodiments the mirror portion 730 encompasses some of the mirror and in some embodiments the mirror portion encompasses the entire remote mirror. In one aspect, the portion 730 can be considered the subset of the set of all directions in the detector FOV in which reflections come from the remote mirror. The mirror portion 730 of the FOV is interesting because some or all of the laser reflections with directions in the mirror portion are from reflection locations outside of the mirror portion (i.e., the remote mirror is deflecting an incoming laser reflection from another location). Previous laser range finders use the time of flight and the incoming direction of laser reflections to calculate a 3D location for each laser reflection. When this approach is applied to reflection from the mirror portion 730 of FOV 670, some or all of the 3D locations are incorrect due to the deflection of the laser reflection. For example, vehicle 630 appears to be in the upper right corner of FOV 670. A laser range finder without the benefit of this disclosure would likely construct a 3D location map for reflection locations and place the laser reflections from vehicle 630 along the direction of a vector starting at the detector 440 and ending at the center of the remote mirror 620. The result would be the correct estimated distance for vehicle 630 but the wrong reflection location. FIG. 7B illustrates a deflected subset 740 of the set of laser reflections 720. Reporting the wrong location for a laser reflection, due to undetected deflection by a remote mirror has serious safety implications for robotic and autonomous vehicles.

Hence one aspect of several embodiments of this invention is to identify those laser reflections that are in the deflected subset 740 of the set of laser reflections 720. In one embodiment of this disclosure laser range finder 710 can gather a set of laser reflections and compute reflection data indicative of the time-of-flight of each laser reflection and a direction associated with each reflection (i.e., the location in the FOV or the direction can be a pixel in a detector array that detects the laser reflection or a 2-D angular coordinate of a direction in the FOV in which the detector was pointing). The detector 440 can transmit the set of reflection data to an electronic circuit (e.g. 3D location calculator 466 in FIGS. 4A and 4B or processing subassembly 520 in FIG. 5A) configured or operable to discover the location of the mirror in the FOV (i.e., determine portion 730 of the FOV in FIG. 7A). The electronic circuitry can further function to identify a subset of the set of laser reflections that are deflected by the remote mirror 620. The electronic circuitry in the laser range finder can finally calculate a 3D reflection location associated with each laser reflection in a set of laser reflections by processing the reflection data corresponding to the reflection indicating the direction and the time of flight. The processing can include a correction step for laser reflections found to be in the subset of laser reflections from the remote mirror.

In one aspect of several embodiments a laser range finder (e.g. 710) can determine the subset 740 of laser reflections that have been deflected by a mirror. A first group of embodiments can involve analyzing the set of laser reflections to identify a subset that has undergone deflection. A second group of embodiments can determine the deflected subset by discovering and tracking the location of the mirror in the FOV and thereby calculate a set of directions (e.g. mirror portion of the FOV) for which laser reflections must have undergone deflection.

Figure 8:
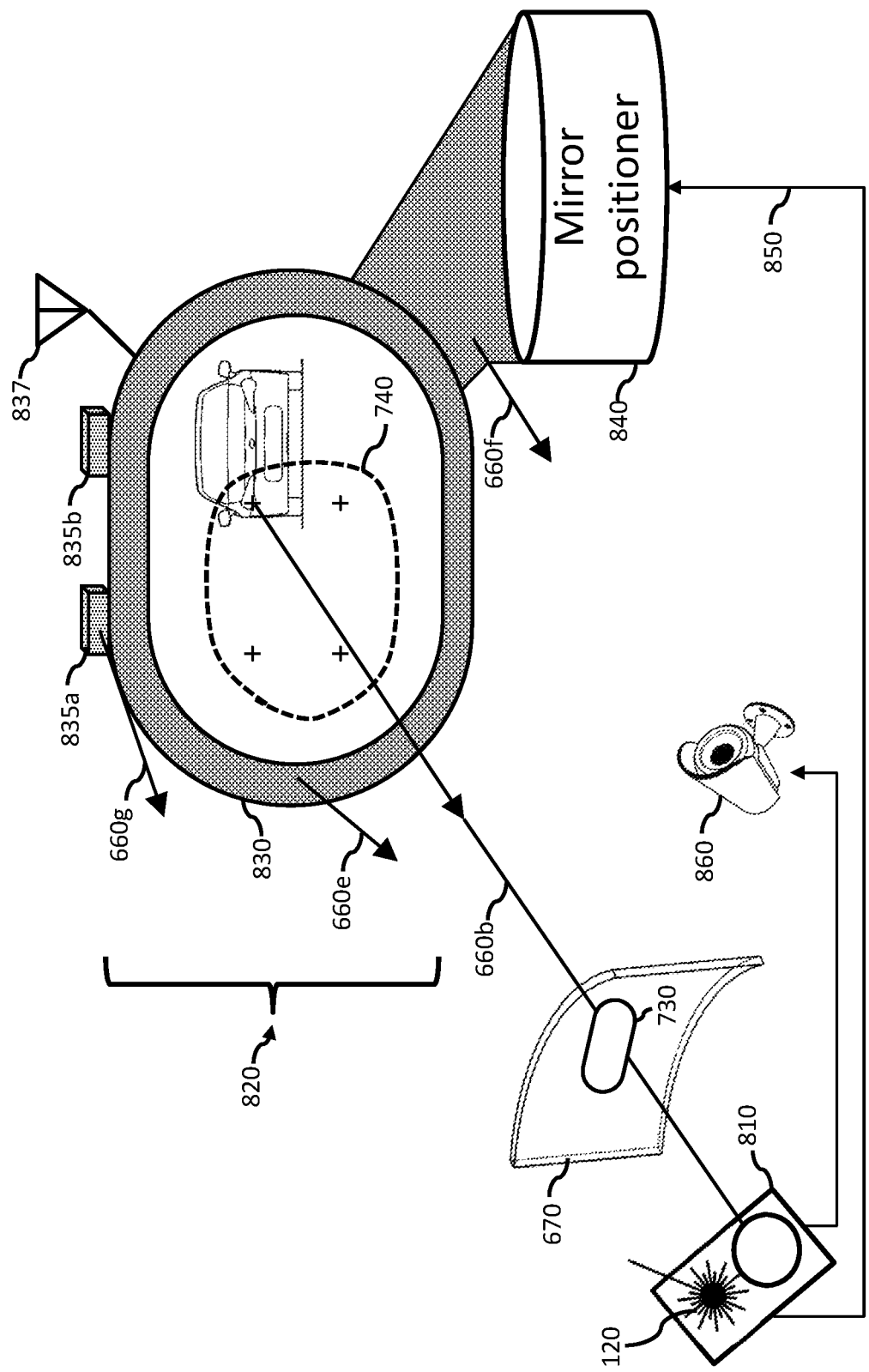
FIG. 8 illustrates several components operable to estimate the location of a remote mirror by a laser range finder accord to aspects of the present technology.

FIG. 8 illustrates several components operable to help in determining a location estimate for a remote mirror 820 in the field of view of a laser range finder 710. Remote mirror 820 can be a roadside mirror (e.g. similar to remote mirror 620) or a mirror attached to part of a vehicle (e.g. a rearview mirror or a wing-mirror). In one exemplary embodiment, laser range finder 810 can determine a location estimate of the remote mirror 820 by processing camera data and thereby identifying the surrounding structure of the remote mirror (e.g. pattern matching the oval surround structure 830 to a wing mirror). The location estimate of the mirror can then be used to determine a portion 730 of the FOV 670 that contains or encompasses the remote mirror 820 and thereby determine a subset 740 of the set of laser reflections that have undergone deflection by the remote mirror.

In a related exemplary embodiment, a mirror location estimate or a mirror portion 730 of FOV 670 can be determined by identifying laser reflections indicative of the frame or support structure of a remote mirror (i.e., portions that are not themselves deflective but indicate the a location of a mirror). For example, laser reflections (e.g. 660e) from the frame 830 of a remote mirror, or reflections (e.g. 660f) from the support structure of the remote mirror can indicate the placement of the remote mirror 820.

Laser range finder 810 can obtain a location estimate for remote mirror 820 by processing sensor data (e.g. camera image data) based on location feature (e.g. protrusions or bumps 835a and 835b). Location features can be identified by camera image data or by laser reflections (e.g. reflection 660g). For example, laser range finder 810 can comprise a processing subassembly (520 in FIG. 5) or a sensor data processor (475 in FIGS. 4A and 4B) to process image data and thereby generate a location estimate of the remote mirror. The location estimate can be a 3D Cartesian coordinate (e.g. 4,3,10 in an XYZ Cartesian coordinate system) or a range of 3D locations (e.g. in a region with X-coordinate between 4 and 6 and Y-coordinate equal to 3 and Z-coordinate equal to 10). In other embodiments a location estimate can be a 2D coordinate in the FOV of the laser range finder. For example, exemplary laser range finder 810 can have a FOV 670 with angular range 0-90 degrees in the azimuthal plane and −10 to 20 in the elevation plane. A location estimate can be a coordinate or a range of coordinates in the field of view (e.g. the point +23 degrees azimuth and −10 degrees elevation or the range 21 to 25 azimuthal and −10 to −5 elevation).

A wireless radio transmitter 837 associated with remote mirror 820 can transmit or broadcast the location or orientation of the remote mirror, thereby providing a location estimate to electronic circuitry in the laser range finder. Similarly a wired communication link 850 between the remote mirror and the laser range finder can transmit information regarding the placement of the remote mirror. Wireless radio transmitter 837 can be part of a transceiver (e.g. a Bluetooth, Zigbee or Wi-Fi transceiver) Wireless radio transmitter 837 can be part of a radio frequency transponder system (e.g. an RFID system). The wired communication link 850 can be similar in both protocol and structure to communication link 530 in FIG. 5A.

In one example, a plurality of roadside remote mirrors (e.g. 820) could be placed at strategic points along a roadway. Circuitry coupled to the remote mirrors (e.g. a GPS or indoor positioning system circuitry) could learn the location of the remote mirror (e.g. a GPS coordinate, or a relative location such as at the corner of the hallway at a specified height or relative location at an road intersection) and relay this information to laser range finders (e.g. 810) that are attached to systems that approach the vicinity of one or more of the remote mirrors (e.g. laser range finders on autonomous vehicles). In this way a remote mirror can transmit a location estimate (e.g. the GPS coordinates of the remote mirror) to electronic circuitry in the laser range finder. Similarly, sensors on the remote mirrors can detect the orientation (e.g. pointing Northeast) of a remote mirror and report this direction or orientation to one or more approaching laser range finders using wired or wireless communication links. In one example, a remote mirror deployed in an environment (e.g. roadway, building, school zone, parking structure) can be one of a set of standard remote mirrors with a characteristic curvature or shape that is indicated by a model number of the remote mirror. The remote mirror can use wireless transmitter 837 or wired link 850 to transmit or broadcast the model number of the remote mirror. The laser range finder can access one or more properties of the remote mirror (e.g. location estimate, shape, height, curvature, characteristic shape of the mirror, field of view, reflectivity or purpose) stored in a local or remote memory based on the identifying information (e.g. model number) transmitted by the remote mirror. For example, an exemplary remote mirror could be a standard remote mirror from a series of such remote mirrors that are deployed on vehicle trailers, railway cars or shipping containers. A laser range finder could be located on a tractor (e.g. a truck) designed to pull such a trailer. The exemplary remote mirror could be designed to augment the FOV of the laser range finder. Initially (e.g. prior to determining a location estimate for the remote mirror) the placement of the exemplary remote mirror on the trailer could be unknown. A wired or wireless connection (e.g. transmitter 837 or wired link 850) can announce the model number for the exemplary remote mirror (e.g. the model number within the standard series of such remote mirrors). Similarly, a wired or wireless transmitter associated with the remote mirror can transmit a location estimate (e.g. a specific location or a range of locations). The laser range finder can then use the model number and the location estimate or orientation information to identify a portion 730 of the FOV 670 that contains the remote mirror or a deflected subset 740 of the laser reflections. Interestingly, this portion can vary greatly with operation of a vehicle, particularly when the remote mirror is mounted to an articulated portion of a vehicle. Therefore, in one aspect of several embodiments the location estimate and the mirror portion 730 are continuously determined from sensor data. Laser range finder 810 can determine a subset 740 of the laser reflections within the FOV that have undergone deflection by the remote mirror.

In another embodiment, wireless transceiver 837 or wired link 850 can transmit identity location or orientation information regarding the remote mirror 820. Subsequently, for a given laser reflection in a set of laser reflections the laser range finder 810 can use the information supplied by the remote mirror to determine if that laser reflection has been deflected by the remote mirror. For example, remote mirror could report that it is located at the bend in a road (e.g. 640 in FIG. 6A) in the form of a location estimate using GPS coordinates. Laser range finder 810 can process the location estimate and identify portion 730 of the FOV corresponding to the remote mirror 820. Laser range finder 820 can gather a set of laser reflection (e.g. 720 in FIG. 7A, 7B) including some reflections that have been deflected by the remote mirror 820. Electronic circuitry in the laser range finder (e.g. processing subassembly 520 in FIG. 5) can determine for each laser reflection in the set of reflections (e.g. 720) if that laser reflection has been deflected by the remote mirror 820 based at least in part on the portion 730 of the FOV 670 occupied by the remote mirror 820. An exemplary mirror portion 730 of the FOV can have an azimuthal range between 40 and 50 degrees and elevation range between 30 and 40 degrees, thereby defining a 10×10 degree portion of the FOV 670 in which reflections have been deflected by the remote mirror 820.

In the previous example one or more laser reflections from a set of laser reflections (e.g. 720 in FIG. 7A, 7B) are determined to have undergone deflection based on correlation with a location estimate for a discovered remote mirror. In several other embodiments a test can be applied directly to sensor data (e.g. laser reflections) received from a portion of the FOV to determine if a laser reflection has undergone deflection by a remote mirror. For example, a camera 860 can gather image data from a field of view containing some of the detector FOV 670 and including at least a portion of the mirror. The camera can be coupled to an image processor (e.g. sensor data processor 475 or processing subassembly 520) to identify a portion 730 of the FOV that contains the remote mirror.

Another exemplary method to determine if a laser reflection has been deflected by a remote mirror uses the nature of images reflected in the mirror. For example, remote mirrors such as wing-mirrors and roadside mirrors are often convex in order to capture a wider FOV than an equivalent sized flat mirror. For this reason wing-mirrors on vehicles often carry a warning sign "Warning—Objects in mirror are closer than they appear" The convex nature of a remote mirror can cause a wide variation of the laser reflections provided by the relative small portion of the FOV occupied by the remote mirror. A laser range finder can have a predefined set of criteria or rules based on aspects of laser reflections that are used to determine if a reflection has undergone deflection in a remote mirror. Exemplary criteria can be based on variations in the time-of-flight of reflections or identification of unusually small objects (e.g. smaller than expected people and cars in the reflected data). For example, a subset of the set of laser reflections that exhibit a large variation in time of flight (e.g. indicating ranges between 60 m and 160 m) in a small 5×5 angular range of the FOV can satisfy a criteria, thereby defining that all laser reflection in that 5×5 degree portion of the FOV should be determined to have undergone deflection by a remote mirror. In another example a subset of the set of laser reflection identified to indicate a car with unusual distortion or an unusual size scale can be used to satisfy a criterion and thereby all reflections from a related portion of the FOV can be determined to have undergone deflection by a remote mirror.

Yet another method to determine if a laser reflection (e.g. 660b) has undergone deflection by a remote mirror 820 can be to perturb the position of the remote mirror (e.g. using a mirror positioner 840 such as a motor or an actuator) and thereby identify a portion of the FOV that is modulated when the remote mirror is perturbed. A laser reflection can be determined to have undergone deflection in the remote mirror if it comes from the portion of the FOV that has been identified to undergo a change (i.e., point at a different reflection location) when the mirror is perturbed (e.g. rotated, translated or vibrated). For example, a first reflection R1 (e.g. 660b) with an associated direction D1 in the detector FOV 670 can have a time-of-flight of 1 microsecond relative to an outgoing laser pulse, thereby indicating a distance to the reflection location is 150 m based on a speed of light of 300 m per microsecond. Laser range finder 810 can seek to determine if reflection R1 has undergone deflection by remote mirror 870 using the following method: firstly emit a laser pulse and measure reflection R1, secondly command mirror positioner 840 to rotate mirror 820 slightly, thirdly emit a second laser pulse operable to cause a reflection R2 from the same direction D1 as reflection R1 and observe if reflection R2 has a considerably different time of flight (e.g. 2 microseconds instead of 1 microsecond) or a considerably different associated range (e.g. 250 m instead of 150 m). Finally, the laser range finder can determine if R1 has been deflected by a remote mirror based on a measure of the range or time-of-flight difference between R1 and R2. If R1 is determined to be in the deflected subset of all reflection then associated direction D1 in the FOV can be included in the mirror portion of the FOV.

In a related example, laser range finder 810 can vary the position of remote mirror 820 in a periodic manner (e.g. rotating the mirror slightly back and forth), thereby producing a periodic variation in the laser reflections in the mirror portion and helping to identify the mirror portion 730 of FOV 670. In another related example, a remote mirror that is not controlled by the laser range finder can execute a periodic position change (e.g. a momentary rotation or vibration) operable to cause one or more laser range finders in the vicinity to experience a shift in range or time of flight from laser reflections within the mirror portion 730 of FOV 670 for each laser range finder. For example, an autonomous vehicle approaching a roundabout with a remote mirror could discover and track the location of the remote mirror based on deliberate variations (e.g. small vibrations or rotations) of the remote mirror. In one embodiment the remote mirror can perform a continuous or periodic scanning motion so as to increase the range of reflection locations (i.e., the indirect FOV) provided by the remote mirror.

In another embodiment, the remote mirror can have a characteristic curvature that is initially unknown to the laser range finder. For a given orientation of the remote mirror the curvature characteristic of the mirror acts like a transfer function converting the incident directions of laser reflections from reflection locations into a deflected directions travelling towards the detector in the laser range finder. In one aspect of this embodiment the remote mirror can change its position several times (e.g. perform a slow sweep or rotation) and the laser range finder can perform processing (e.g. correlation analysis) on the laser reflections received at various orientations and thereby determine the characteristic curvature of the remote mirror. For example, an object can reflect laser pulses such that the laser pulses are deflected by different parts of the remote mirror in different orientations as the remote mirror moves, thereby enabling a laser range finder to characterize the curvature of the surface of the remote mirror. The remote mirror can also announce its characteristic curvature using the wireless transmitter 837 or wired communication link 850.

In one aspect of several related embodiments, upon obtaining a characteristic curvature and orientation for the remote mirror the laser range finder can use this information to determine a corrected 3D location for laser reflections that are determined to have undergone deflection by the remote mirror.

3D Depth Map

Figure 9A:
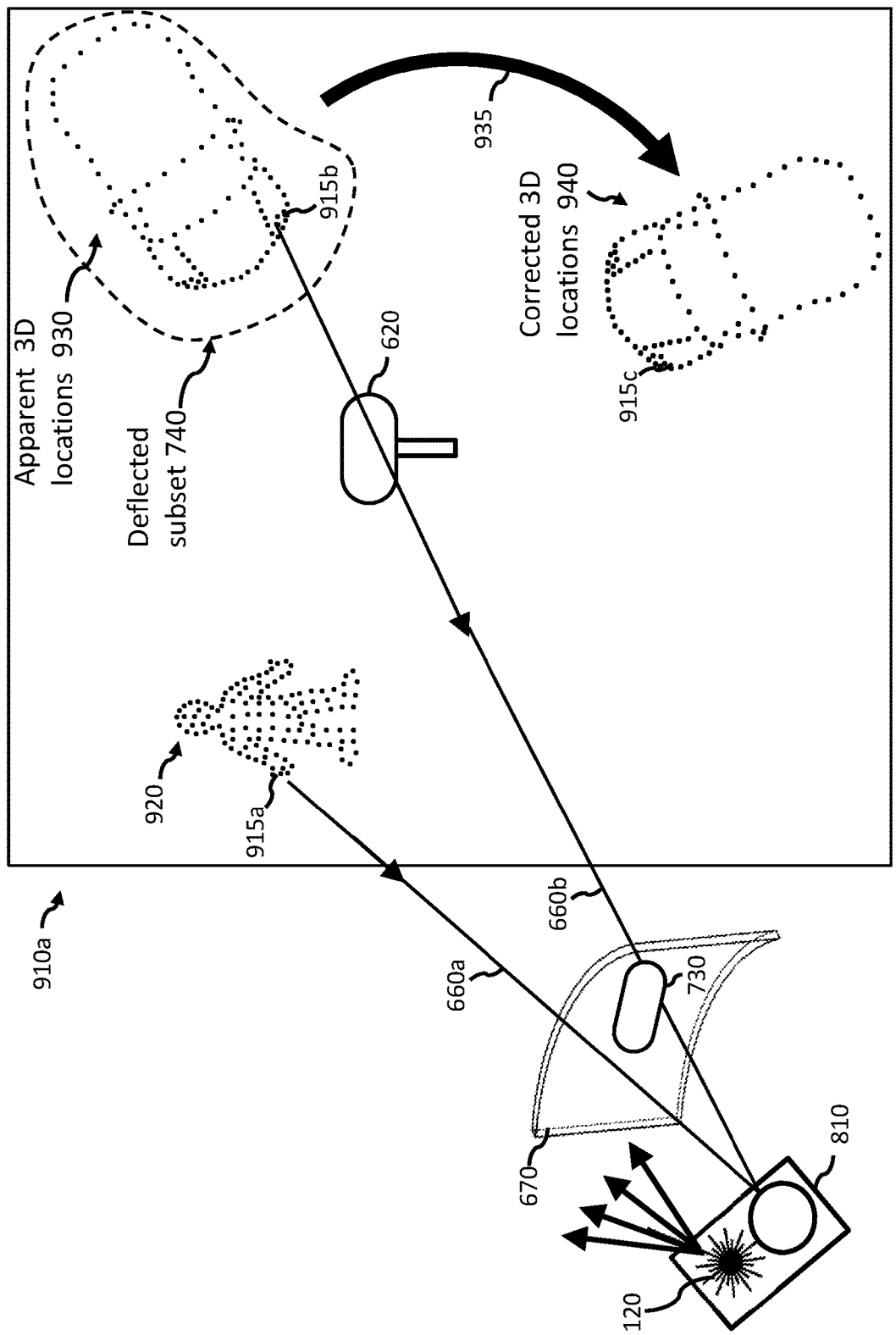

FIGS. 9A and 9B illustrate 3D depth maps comprising a set of 3D locations indicative of the reflection locations corresponding to a set of laser reflections detected by laser range finder 810. FIG. 9A illustrates a 3D depth map 910a (e.g. a point cloud) comprising a plurality of 3D locations (e.g. locations 915a and 915b) calculated from a set of laser reflections. One simple method for calculating the 3D location corresponding to a laser reflection is to record a direction associated with the reflection and to calculate a distance based on the time-of-flight for the reflection (e.g. 100 m). The laser reflection can then assigned a corresponding 3D location equal to a point in 3D space at the calculated distance (e.g. 100 m) in the recorded direction. For example, using the detector as the origin (e.g. 0,0,0 in Cartesian coordinates), the computed location for a laser reflection with direction (1,1,1) and a range of 100 m, would be located at a 3D location 100 m along the vector (1,1,1) resulting in a 3D location of (58,58,58) meters. This approach works well for the subset of laser reflections (e.g. reflection 660a) that travel directly from their corresponding reflection locations to the detector 440. For example, subset 920 of the 3D locations correspond to laser reflections from a person that reflected directly from the person. Hence, the subset of 3D locations 920 is an accurate representation of the actual reflection locations for the person. Specifically, using the previous method on laser reflection 660a, the computed 3D location 915a is an accurate indication of the actual reflection location. However this approach fails to provide the correct computed 3D location for the deflected subset 740 of the set of laser reflections. For example, applying the previous method of assigning 3D locations to laser reflections based on simply following sensed direction at the detector, results in a computed 3D location 915*b* corresponding to laser reflection 660*b*. In general applying a 3D location generation process to a deflected subset 740 of laser reflections that fails to account for the deflection of those laser reflections by the remote mirror results in a subset of apparent 3D locations 930 that would be poor indications of the corresponding 3D locations.

The accuracy of computed 3D locations (e.g. location 915*c*) corresponding to laser reflections that have undergone deflection by a remote mirror 620 can be improved by performing one or more correction steps (illustrated by arrow 935) in the process of computing the corresponding 3D locations. In one aspect of several embodiments the deflected subset 740 of the set of laser reflections are first identified and then a correction step is performed during the process of calculating the corresponding 3D locations. The correction step can generate a subset of corrected 3D locations 940 corresponding to the deflected subset of laser reflections. In several embodiments the correction step can account for at least in part the deflection of the deflected subset 740 of laser reflections by the remote mirror. Exemplary corrections (illustrated by arrow 935) can include operations on the incident direction associated with a laser reflection in the deflected subset such as adding, subtracting, multiplying or dividing a vector associated with the incident direction by another correction vector or scalar. A more complex correction step could be to determine the position of the mirror in 3D space, calculate the incident angle of a laser reflection on the remote mirror and compute a corrected 3D location based on the position of the mirror and the estimated incident angle. In a related embodiment, laser range finder 910 can obtain data indicative of the curvature and/or orientation of remote mirror 620, and can then compute a corrected 3D location based at least in part on the curvature of the remote mirror.

In another exemplary embodiment, a remote mirror (e.g. a roadside mirror on a road bend) can have a known transfer function (e.g. relating incident and outgoing angle on the mirror). Laser range finder 910 can then obtain the transfer function of the remote mirror 620 (e.g. by receiving the transfer function in signals from the remote mirror or by lookup of mirror characteristics for a particular road intersection). Laser range finder 810 can then use the location of the remote mirror and the transfer function to determine a relationship between incident direction on the remote mirror and the incident direction of deflected laser reflections on the detector 440. Laser range finder 910 can use this relationship as a correction step in the process of generating 3D locations corresponding to laser reflections in the deflected subset 740.

FIG. 9B illustrates a 3D depth map wherein the deflected subset 740 of the laser reflections is corrected using a step that isolates the 3D locations corresponding to the deflected subset in a dedicated secondary portion 950 of the 3D depth map. In some embodiments, upon identification of one or more laser reflections that have undergone deflection the correction step can be to isolate those 3D locations by moving the resulting 3D locations to corrected locations. The corrected locations can be in a secondary portion of the 3D depth map (e.g. a portion in the top left that is dedicated to showing 3D locations for the deflected subset). One way to perform a correction step that shifts 3D locations corresponding to deflected laser reflections into a secondary portion of the depth map is to define a secondary origin that is applied exclusive to 3D locations in the deflected subset (e.g. remove a value of (10, −20, 30) from each point in the deflected subset in order to place the 3D locations corresponding to the deflected subset in a defined portion of the 3D depth map. One advantage of isolating the 3D locations for the deflected subset is that other systems or humans can readily associate a portion of the 3D depth map or computer screen with objects observed in remote mirrors. Another advantage of a correction step that isolations the deflected subset is that such a step can preserve the relative location of laser reflections within the deflected subset (thereby enabling object identification or classification), while establishing that the deflected subset has an unknown or unspecified spatial relation to the 3D locations corresponding to or derived from the direct laser reflections in the primary portion of the 3D depth map. Correction by isolating deflected 3D locations is similar to the concept of: "here is an indirect FOV from a remote mirror in the local environment, but the exact spatial relation of objects in the mirror to objects in the local environment is unclear". In one aspect the correction step can be a transfer function that is uniformly applied to all laser reflections in the deflected subset (e.g. applied to the direction data and the time of flight data for each laser reflection in the deflected subset). Alternatively, the correction step can be customized to each reflection direction (e.g. a direction based correction step). In one example, of a customized correction step a laser range finder can learn the curvature and orientation of a remote mirror (e.g. broadcast wirelessly by the remote mirror) and can determine a correction step based on the curvature and the incident angle of each laser reflection in the deflected subset. In one embodiment, for each laser reflection that has undergone deflection by the remote mirror the correction step can be a multi-stage process, with a first stage that customizes or configures the correction step to the laser reflection and a second stage that performs the correction step on reflection data corresponding to the laser reflection.

Operation

Figure 10A:
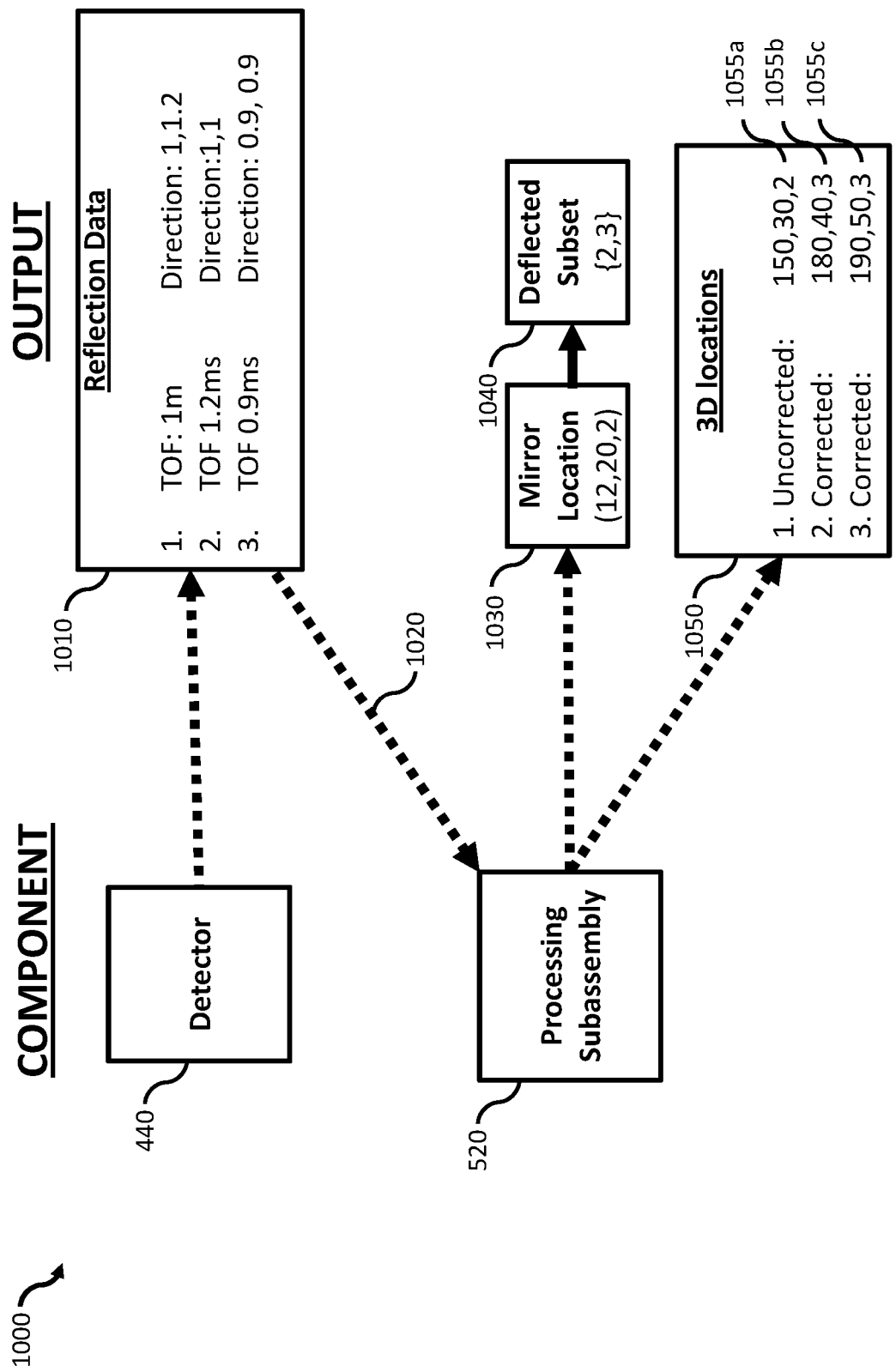
FIGS. 10A and 10B are functional diagrams illustrating the generation of 3D locations from reflection data including applying a correction step for laser reflections that have been deflected by a remote mirror in the local environment, according to aspects of the present disclosure.

FIG. 10A illustrates an embodiment in which laser range finder 1000 identifies a remote mirror in the local environment (e.g. a roadside mirror), detects a set of laser reflections, some of which have undergone deflection by the remote mirror, and corrects a subset of 3D locations for the presence of the remote mirror in the local environment. In the embodiment of FIG. 10A detector 440 receives a set of laser reflections from an outgoing sequence of laser pulses. In response detector 440 generates reflection data 1010 indicative of the time-of-flight and direction corresponding to a set of reflections. Some of the reflections have undergone deflection in a remote mirror but in the embodiment of FIG. 10A the members of the deflected subset need not be known when the reflection data is generated. The reflection data 1010 can be transmitted in detector signals 1020 (e.g. Ethernet packets, or streaming LAS file format) from detector 440 to electronic circuitry operable to compute a 3D location corresponding to each reflection. For example, in FIG. 10A the electronic circuitry can be processing subassembly 520 and can include one or more processors such as sensor data processor 475 in FIG. 4A. Processing subassembly 520 can obtain a mirror location 1030 for a remote mirror. Mirror location 1030 can be a 3D location relative to the detector 440. For example, a mirror location can be a 3D location determined by processing laser reflections from the mirror edges (e.g. frame or support structure) or camera image data, or a broadcast location by the remote mirror. Mirror location 1030 can also be a portion of the detector FOV (e.g. a range of directions) that encompasses some or all of the remote mirror. Processing subassembly 520 can further identify a deflected subset 1040 of the set of laser reflections (e.g. indicating that reflections #2 and reflection #3 have been deflected). Processing subassembly 520 can then compute a 3D location for each laser reflection in the set of laser reflections, based on the reflection data 1010 delivered from the detector 440 in detector signals 1020. For example, the computation by the processing subassembly can use the direction and time-of-flight reflection data corresponding to each laser reflection to determine a 3D location. For laser reflections determined to be undeflected by the remote mirror (e.g. reflections #1) in reflection data 1010, the corresponding 3D location can be uncorrected (i.e., no step is performed to account for the remote mirror). For laser reflections determined by the processing subassembly to be deflected by the remote mirror (e.g. reflections #2 and #3) a correction step can be performed to generate corresponding corrected 3D locations such as locations 1055b and 1055c. The correction step can be translation of the incoming direction, rotation of the incoming direction, or a complex transformation of the incoming direction based on the mirror location 1030. The processing subassembly can display the final 3D locations 1050 (including some corrected and some uncorrected 3D locations) in a 3D depth map such as 910a in FIG. 9A or 910b in FIG. 9B. Alternatively, the processing subassembly can store or transmit the set of 3D locations corresponding to the set of laser reflections.

Figure 10B:
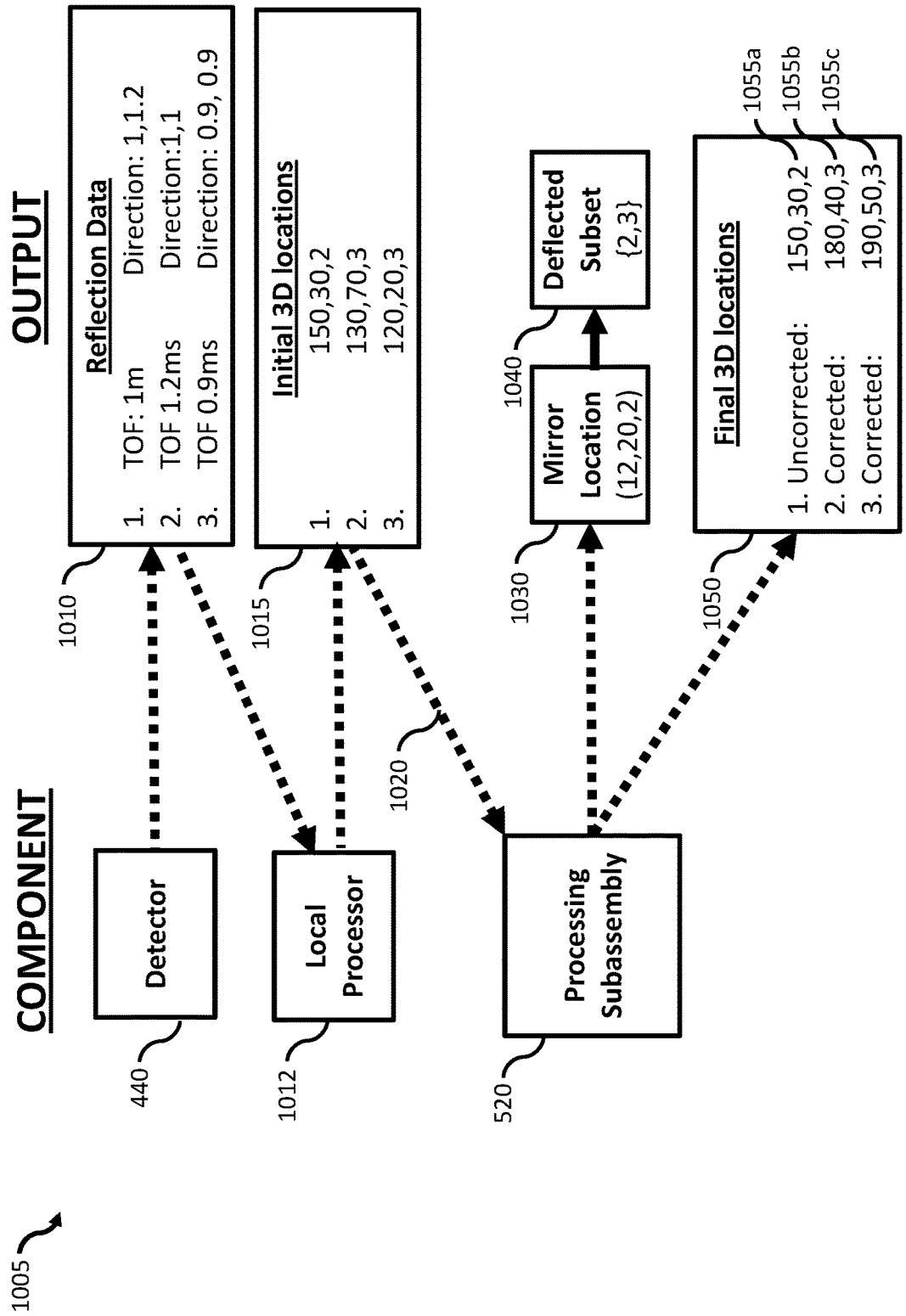

FIG. 10B illustrates an embodiment of a system 1005 that receives a set of laser reflections, some of which have undergone deflection by the remote mirror, and uses associated electronic circuitry to calculate an initial 3D location for each laser reflection, determine a subset of the laser reflections that have been deflected by a remote mirror and computes a corrected 3D location for the deflected subset of the set of reflections. Several models of LIDAR (e.g. HDL-64 from Velodyne Inc. of Morgan Hill, Calif.) can output an uncorrected 3D reflection location corresponding to each laser reflection in a set of laser reflections. In such LIDARs the detector can initially measure the time-of-flight and direction as reflection data 1010 and then compute a set of initial 3D locations 1015 using a local computer processor 1012. Processor 1012 can be part of the steerable laser assembly 120 in FIG. 4A and can be part of detector 440 or operably coupled to receive reflection data from detector 440. A LIDAR such as HDL-64 can output an uncorrected set of 3D locations that can subsequently be corrected using one or more embodiments of the present disclosure. In the embodiment of system 1005 electronic circuitry (e.g. local processor 1012 and processing subassembly 520) can compute a set of 3D locations corresponding to a set of laser reflections in a multi-stage computation process. At a first stage the local processor 1012 calculates initial 3D locations 1015 for a set of laser reflections. The initial 3D locations are transmitted to a processing subassembly 520 in detector signals 1020. At a second computation stage processing subassembly 520 can obtain a mirror location 1030 for a remote mirror and can determine a deflected subset 1040 (e.g. members 2 and 3) of the set of laser reflections. At the second stage the processing subassembly can perform a correction step on the initial 3D location for each of the laser reflections in the deflected subset and thereby generate a final set of 3D locations 1050 including some initial 3D locations that are uncorrected (e.g. 1055a) and some 3D locations (e.g. 1055b and 1055c) that have been corrected to at least in part account for deflection of the corresponding laser reflection by the remote mirror.

Processing subassembly 520 can include a sensor data processor (e.g. processor 475 in FIG. 4A) operable to receive sensor data from a variety of sensor systems (e.g. laser range finders, cameras, radars and ultrasound sensors) and thereby determine and track the mirror location 1030. In one aspect a processing subassembly can determine a trajectory for a discovered remote mirror (i.e., estimate of future location at a future time). Processing subassembly 520 can use a GPU and identify a bounding box (e.g. a portion of the detector FOV in which the remote mirror should lie). The electronic circuitry (e.g. local processor 1012 and processing subassembly 520) can use a database of sensor data gathered by the host vehicle or other vehicles (e.g. other autonomous cars) to determine the placement of a remote mirror. In a similar manner the electronic circuitry in the laser range finder can obtain or modify a correction step based on the effectiveness (e.g. location accuracy) of a previously used correction step. For example, the electronic circuitry can determine a correction step based in part on 3D locations computed by previous laser range finders that have encountered the same remote mirror. For example, two roads can meet at a 37 degree angle and a remote mirror can be placed at the intersection. Initially, a laser range finder moving along one of the roads can initially detect a remote mirror in the detector's FOV but may not have enough information to characterize the curvature of the remote mirror and thereby determine precisely corrected 3D locations representative of the actual reflection locations corresponding to a deflected subset of the set of laser reflections. The laser range finder can realize that insufficient historical data exists (e.g. from its own historical data or other range finders that have encountered the remote mirror) to correct the 3D locations of the deflected subset in a manner that places the 3D locations relative to direct reflection locations (e.g. subset 920 from person 160 in FIG. 9A). Therefore, the laser range finder may perform an initial correction step that functions to isolate the 3D locations corresponding to the deflected subset. The laser range finder can subsequently receive laser reflections directly from objects (e.g. buildings and trees) that were previously observed using the remote mirror and compare 3D location from direct reflections with previously computed (and corrected) reflections locations from the deflected subset. In this way the laser range finder determines the effectiveness of a correction step performed on the deflected subset or refine a correction step based on subsequent direct laser reflections from objects.

A 3D location for a deflected laser reflection can be computed using one or more correction steps that are based at least in part on the accuracy of a previous corrected 3D location. For example, the accuracy of a previous 3D location computed using a correction step to account at least in part for a remote mirror can be compared against a 3D location for the same reflection location gathered directly from the same reflection location. In this way a laser range finder can perform a closed loop comparison of corrected 3D locations and uncorrected 3D locations for the same reflection point from different points in time.

Figure 11A:
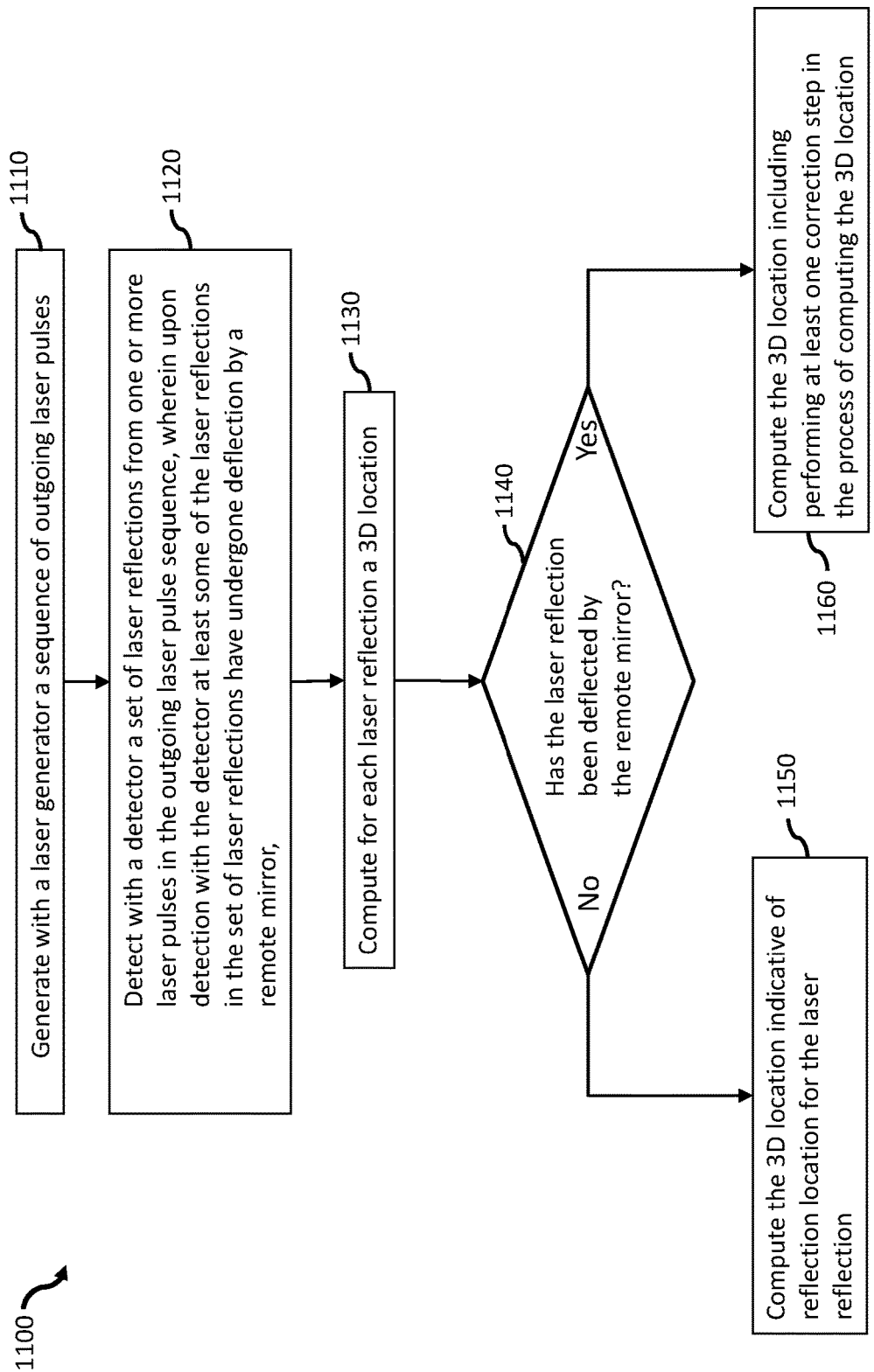
FIGS. 11A, 11B and 11C illustrate methods for computing 3D locations indicative of laser reflection locations including a correction step performed for laser reflections that are deflected by a remote mirror, according to embodiments of the present disclosure.

FIG. 11A is a flow chart illustrating a method 1100 for utilizing a remote mirror by a laser range finder in accordance with an embodiment of the present disclosure. At step 1110 a sequence of outgoing laser pulses is generated with a laser generator. At step 1120 a set of laser reflections from one or more laser pulses in the outgoing laser pulse sequence is detected with a detector. The laser generator and the laser detector can be part of the same laser range finder. In method 1100 at least some of the laser reflections in the set of laser reflections have undergone deflection by a remote mirror prior to reaching the detector.

At step 1130 a 3D location is computed for each laser reflection in the set of laser reflections. At step 1130, for each laser reflection in the set of laser reflections sub-step 1140 is performed to determine if the laser reflection has undergone deflection by the remote mirror and depending on the outcome either sub-step 1150 or 1160 is performed in order to determine the corresponding 3D location. At step 1140 method 1100 determines whether a laser reflection from the set of laser reflections has undergone deflection by the remote mirror. Step 1140 can use one or more approaches previously described to make the determination of whether each laser reflection has been deflected by the remote mirror. Exemplary detection methods can include detecting aspects of the reflection (e.g. reflection range), the dynamic range of surrounding laser reflections, consistency with surrounding laser reflections and a reflection direction that is associated with a remote mirror. Upon determination that a laser reflection has not undergone deflection by a remote mirror at step 1150 a 3D location indicative of a reflection location corresponding to the laser reflection is calculated. At step 1150 a laser reflection can be considered to have a reflection location along the reflection direction of the incoming laser reflection (i.e., the reflection arrives directly from the reflection location without changing direction along the way).

Upon determination at step 1140 that a laser reflection has undergone deflection by a remote mirror the method performs step 1160. At step 1160 a 3D location indicative of a reflection location corresponding to the laser reflection is calculated including performing at least one correction step in the calculation of the 3D location. The at least one correction step can function to account for deflection of the laser reflection by the remote mirror (e.g. improve the accuracy of the computed 3D location relative to the corresponding reflection location for the laser reflection). Alternatively, the correction step can function to isolate, identify or indicate the 3D locations corresponding to laser reflections that have undergone deflections (e.g. isolating the corresponding 3D locations by modifying the 3D location relative to undeflected 3D locations to occupy a particular portion of a 3D depth map).

Figure 11B:
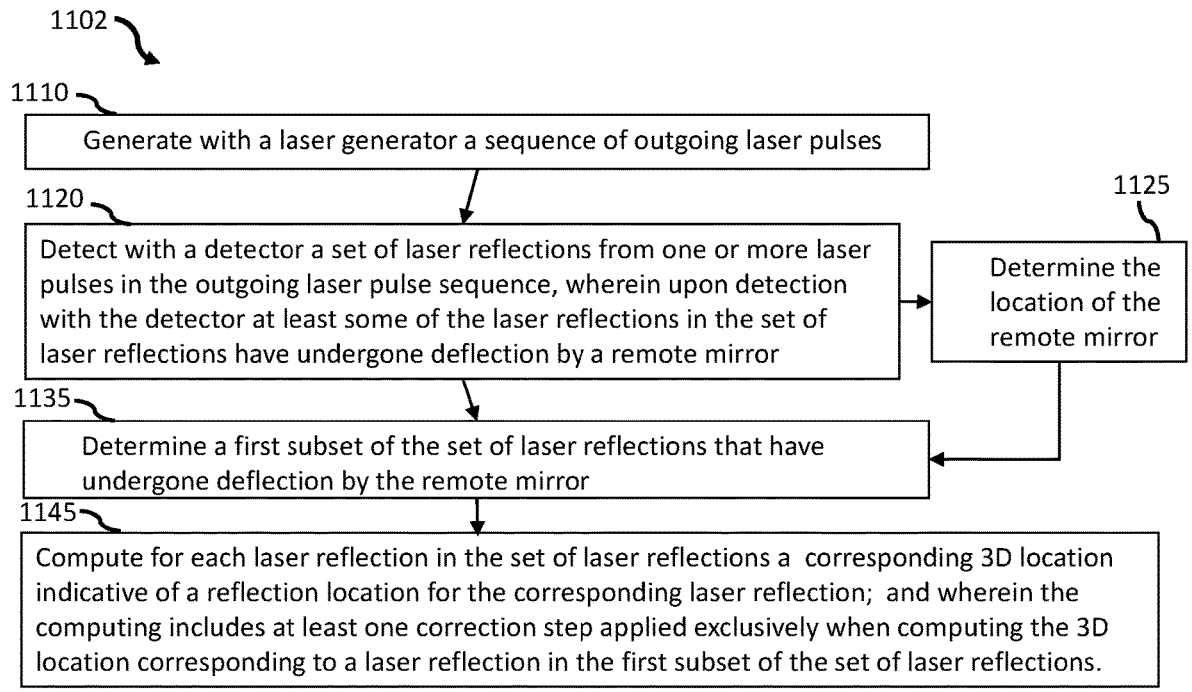

FIG. 11B is a flow chart illustrating a method 1102 for utilizing a remote mirror by a laser range finder in accordance with an embodiment of the present disclosure. Method 1102 starts with steps 1110 and 1120 similar to method 1100. At step 1135 a first subset of the set of laser reflections that have undergone deflection by the remote mirror can be determined.

At step 1145 a 3D location indicative of a corresponding reflection location is computed for each laser reflection in the set of laser reflections. The computing at step 1145 includes at least one correction step performed exclusively when computing 3D locations corresponding to the laser reflection in the first subset of the set of laser reflections. For example, step 1145 can include performing with a processor a set of instructions stored in a computer memory to determine a 3D location corresponding to each laser reflection in the set of laser reflections. The at least one correction step can comprise one or more instructions that are only included in the set of instructions performed for a laser reflection when that laser reflection is in the first subset of the set of laser reflections.

In a related embodiment, step 1125 can be performed to determine the location of the remote mirror. The location of the remote mirror can be a 3D location, a range of 3D locations, a 2D location within the FOV or a range of locations within the FOV. The location of the remote mirror can subsequently be used at step 1135 to determine the subset of the set of laser reflections that have been deflected by the remote mirror. For example, the mirror can be estimated or determined to occupy a first 2D angular range in the detector FOV (i.e., an azimuthal angular range and an elevation angular range). All laser reflections determined by the detector to have incoming directions within the 2D angular range in the FOV can be considered to have undergone deflection by the remote mirror.

Figure 11C:
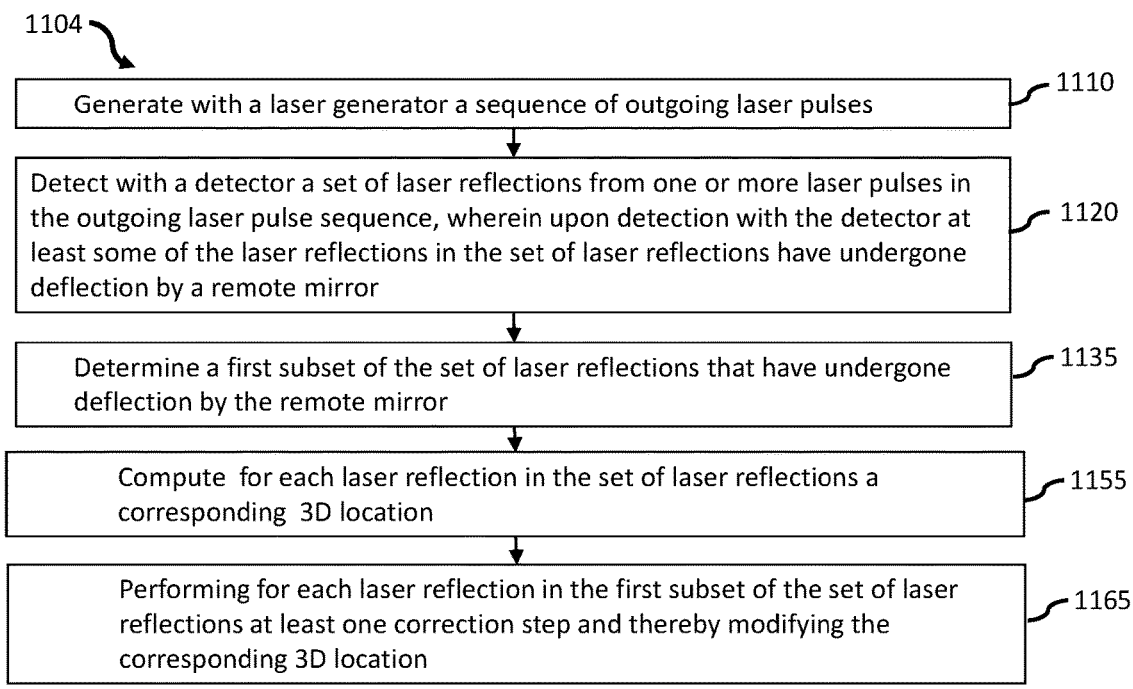

FIG. 11C is a flow chart illustrating a method 1104 for utilizing a remote mirror by a laser range finder in accordance with an embodiment of the present disclosure. Method 1104 starts with steps 1110, 1120 and 1135 similar to method 1102. At step 1145 a 3D location is computed for each laser reflection in the set of laser reflections, based at least in part on at least some of the reflection data. At step 1155 for each laser reflection in the first subset of the set of laser reflections at least one correction step is performed that modifies the corresponding 3D locations for those laser reflections that have been deflected by the remote mirror. The at least one correction step can be performed exclusively for laser reflections in the first subset. The at least one correction step can function to account for the deflection of the laser reflection by the remote mirror in the process of computing the corresponding 3D locations.

A Remote Mirror with Non-Uniform Laser Range Finding

A mirror in the local environment of a laser range finder can augment a direct field of view (i.e., all the directions that the laser range finder can receive a reflection directly) with an indirect field of view. A convex mirror compresses a large field of view into a smaller reflected image which can be difficult for humans to understand or intuitively recognize due to distortion or size scale. A laser range finder can interrogate such a convex mirror with a dense set of incident laser pulses (e.g. with a greater spatial density than the average laser pulse density for the whole FOV) thereby increasing utilization of the remote mirror and increasing the amount of refection data gathered from the remote FOV provided by the remote mirror. For example, a convex roadside mirror may only occupy a 10-by-10 degree portion of a LIDAR's field of view but may offer insight into a 90 degree range of input angles thereby providing a 90 degree indirect field of view to the LIDAR. In one embodiment, a laser range finder identifies a mirror region of range finder FOV that containing a remote mirror and generates a dense non-uniform subset of laser pulses in the mirror region, thereby interrogating the indirect field of view offered by the remote mirror and improving the utilization of the remote mirror.

Mirrors serve a variety of useful purposes that aid human visual activities. For example, rearview mirrors help drivers see objects behind the vehicle without turning their heads and roadside mirrors help drivers see around bends in the road. Similarly, mirrors on trailers help drivers to see the sides and rear of trailers. Cameras can perform some of the functions of mirrors by capturing a remote field of view but cameras capture an image and recreate a representation of the image elsewhere. The recreated image is only representative of the rays of light incident on the camera CCD array. In contrast, mirrors can deflected rays of light from objects in an indirect field of view towards an observer, thereby providing direct optical detection (i.e., actual light rays not recreated reflections) from remote objects.

While a mirror can provide a useful indirect FOV they often distort the shape and condense the size of reflected objects. This can be confusing to humans. For example, vehicle wing mirrors are typically convex mirrors designed to gather a reflections from a greater angular range (i.e., indirect FOV) than an equivalent flat mirror. This convex shape causes reflections to appear smaller and hence many wing-mirrors carry a warning label stating "Objects are closer than they appear". Humans can have difficulty making use of remote mirrors because of distortions and image size reduction. For example, a driver could require an increased reaction time to comprehend a distorted image in a roadside mirror (e.g. showing reflections from around a bend in the road). Similarly, the condensing nature of convex mirrors makes them ineffective when drivers are far away. Hence roadside mirrors have been used with only limited success for vehicles driven by humans.

Interestingly, computer-based optical ranging systems (e.g. LIDARs) can make better use of remote mirrors, thereby promoting their use in autonomous driving applications. Reasons for this include the ability of computer systems to zoom in on a discovered remote mirror with greater acuity than humans and thereby gather a wealth of information from the indirect FOV offered by the remote mirror even at considerable distance from the remote mirror. For example, consider a remote mirror (e.g. a roadside mirror) encountered by a laser range finding system on an autonomous vehicle. The remote mirror may not be a permanent fixture in the FOV of the laser range finder. Alternatively, the remote mirror may be a permanent fixture but have a placement (e.g. location in or portion of the FOV) that is variable and not under the direct control of the laser range finder. The laser range finder can start by learning the location of the remote mirror and then can dynamically increase the density of laser ranging measurements in the region of the field of view containing the remote mirror. In this way, a mirror (e.g. a roadside mirror 100 m away) may occupy a small portion of the field of view of the laser range finder but offer reflections from a wide range of angles (e.g. a large indirect FOV). A laser range finder according to one embodiment could generate a non-uniform measurement distribution in the range finder FOV with a high density of measurements located in a portion of the FOV that interrogates the remote mirror and gains a wealth of information about objects reflected in the remote mirror. For example, imagine a remote mirror at an traffic intersection that occupies 1-5% of the FOV of a laser range finder on an approaching vehicle 100 m away and uses a denser than average subset of laser pulses to map the distance to objects reflected in the remote mirror. Such a system could generate a 3-D depth map of the traffic intersection by interrogating the remote mirror while approaching the intersection. In another aspect the remote mirror at the intersection can have a variable orientation (e.g. can rotate or scan) and can report or broadcast the position of the remote mirror, thereby facilitating the approaching laser range finder to correct the laser beams deflected by the remote mirror.

Therefore one aspect of several embodiments is to identify and track the variable location of a remote mirror in the FOV of a laser range finder. Another aspect of several embodiments is to dynamically control the laser range finder to increase the density of laser ranging measurements in a region of the FOV that contains the remote mirror. For example, in one exemplary embodiment a laser range finder periodically determines a region of the FOV that contains a remote mirror, and generates instructions to dynamically steer a steerable laser assembly to track the location of the remote mirror with a high density of laser pulses relative to the average laser pulse density for the whole FOV. A detector in the laser range finder can thereby receive a dense plurality of laser reflections from the region of space reflected in the remote mirror.

In one simple embodiment, a method for increasing the utilization of a remote mirror by a laser range finder comprises the steps of: obtaining at electronic circuitry a location estimate for a remote mirror located in the vicinity of a laser transceiver, operating a laser transceiver subassembly comprising a laser generator and a laser detector, based at least in part on the location estimate and thereby detecting a set of laser reflections from a corresponding set of outgoing laser pulses such that a first subset of the laser reflections are deflected by the remote mirror and that first subset has a greater than average density in the laser transceiver FOV.

In another simple embodiment, a laser range finder apparatus with enhanced utilization of a remote mirror comprises: Electronic circuitry at least some of which is coupled to a laser transceiver subassembly, wherein the electronic circuitry obtains a location estimate for a remote mirror. The laser transceiver subassembly comprises a laser generator, a detector and means to generate a high density measurement region with a higher than average density of laser reflection measurements (e.g. more reflection data gathered per unit solid angle or angular area in the detector FOV). The electronic circuitry instructs the means to generate the high density measurement region to position the high density measurement region such that a subset of the set of reflections measured by the detector is both deflected by the remote mirror and has a greater than average measurement density.

For example, a laser range finder can scan a FOV with a 360 azimuthal range and a 20 vertical range. The laser range finder can scan the FOV with a nominal measurement density of one outgoing and reflected laser pulse every 5 degree in the azimuthal direction. The laser range finder can detect a vehicle wing-mirror in the FOV and control a laser transceiver subassembly (e.g. a steerable laser assembly) to increase the measurement density to one measurement every 1 degree in the azimuthal direction in a small portion of the FOV, the small portion being based on a location estimate for a remote mirror. The laser range finder can thereby receive a first subset of the laser reflections that has been deflected by the remote mirror and with a greater than average density (e.g. 1 measurement every 1 degree). The higher density subset of reflection can be very useful for improving the utilization of the remote mirror. For example, if the remote mirror condenses a 50 degree angular range (e.g. a remote mirror FOV) into a 10 degree portion of the detector FOV the high density subset of the laser reflections would serve to provide one measurement for every 1 degree of azimuthal range, thereby corresponding to one measurement every five degrees of the angular range captured by the remote mirror.

Various embodiments can improve the utilization of a remote mirror by scanned laser range finders and flash-based laser range finders. Hence, several embodiments provide a method to discover remote convex mirror in the FOV and develop laser steering parameters designed to interrogate the remote mirror more effectively, for example with a customized non-uniform sequence of laser pulses that has increased density, decreased angular spacing, smaller or larger laser spot sizes, or optimized laser intensity.

In a scanned laser range finder embodiment, a laser transceiver subassembly can be a steerable laser assembly operable to scan a laser beam in a dynamic non-uniform sequence based on instructions from coupled electronic circuitry. The steerable subassembly can comprise a laser generator, a laser positioner and a detector. The electronic circuitry can determine a location estimate for a remote mirror. The electronic circuitry can instruct the steerable laser assembly to scan the FOV in a non-uniform manner based on the location estimate and thereby generate a set of laser reflections with a first subset that has been both deflected by the remote mirror and has a greater than average density, thereby providing enhanced utilization of the remote mirror.

In a flash LIDAR embodiment, the laser generator can generate a set of laser pulses that illuminate some or all of the FOV at once. Hence with a flash LIDAR it is difficult to increase the pulse density specifically in a region of the FOV containing the mirror. In a flash LIDAR embodiment reflections arrive at the detector from many locations in the detector FOV at once. Hence the detector is often an array of individual detectors (e.g. a focal plane array or a CCD). A flash LIDAR can selectively magnify a portion of the FOV onto a portion of the detector, thereby providing a variable measurement density from different regions of the FOV. A magnifying component (e.g. a lens) can be controlled based on the estimated location of the remote mirror to provide a subset of the set of laser reflections with greater than average measurement density and the subset can also be selected to include those reflections that have undergone deflection by the remote mirror. Hence a flash LIDAR with dynamically steerable magnification of a portion of the FOV (e.g. a zoom lens that can be moved relative to a detector array), can implement one embodiment of the remote mirror utilization method.

Figure 12A:
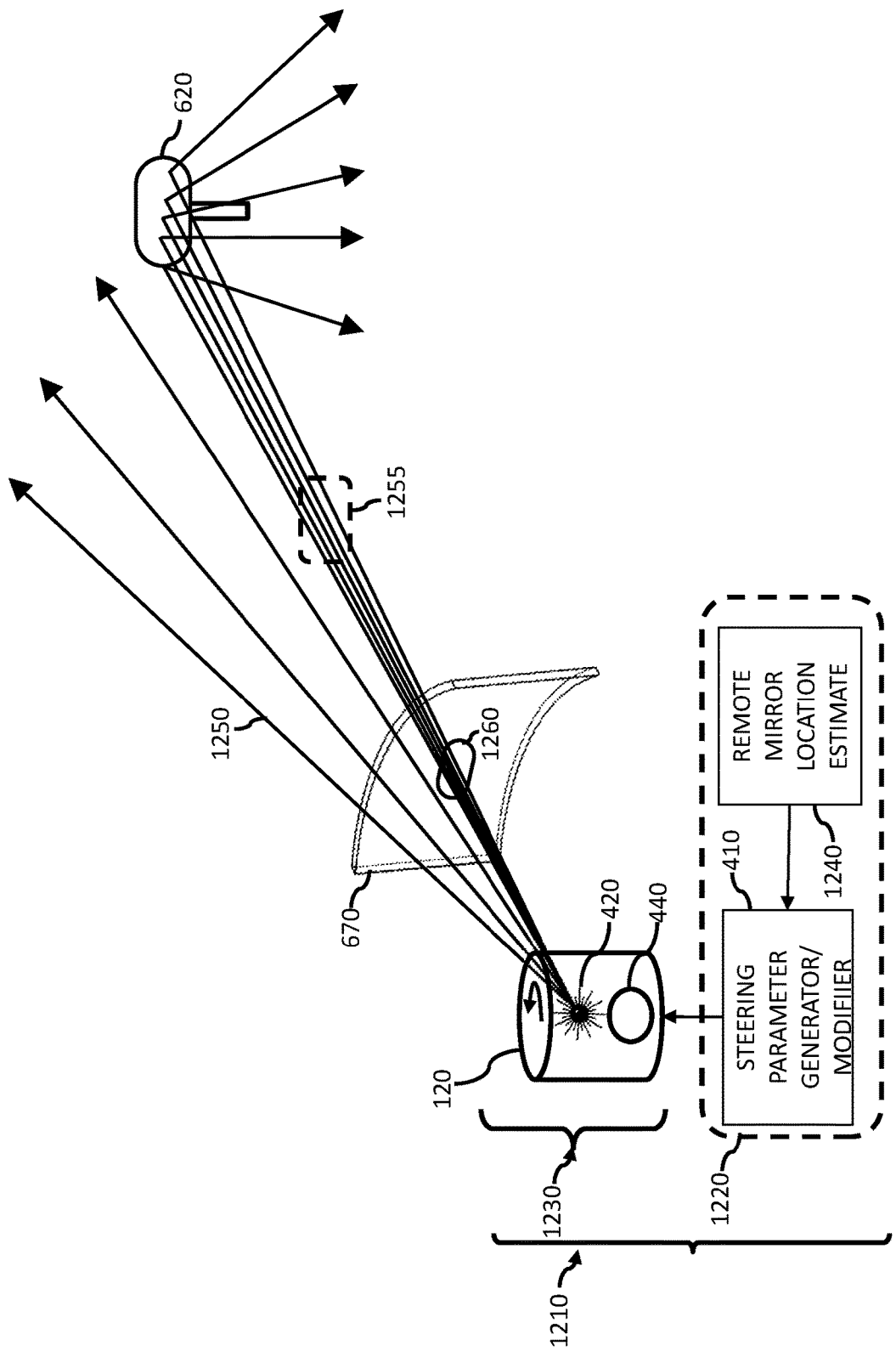
FIGS. 12A, 12B and 12C illustrate several components of optical systems operable to modulate the density of laser reflection measurements based at least in part on the location of a remote mirror, according to embodiment of the resent disclosure.
Figure 12B:
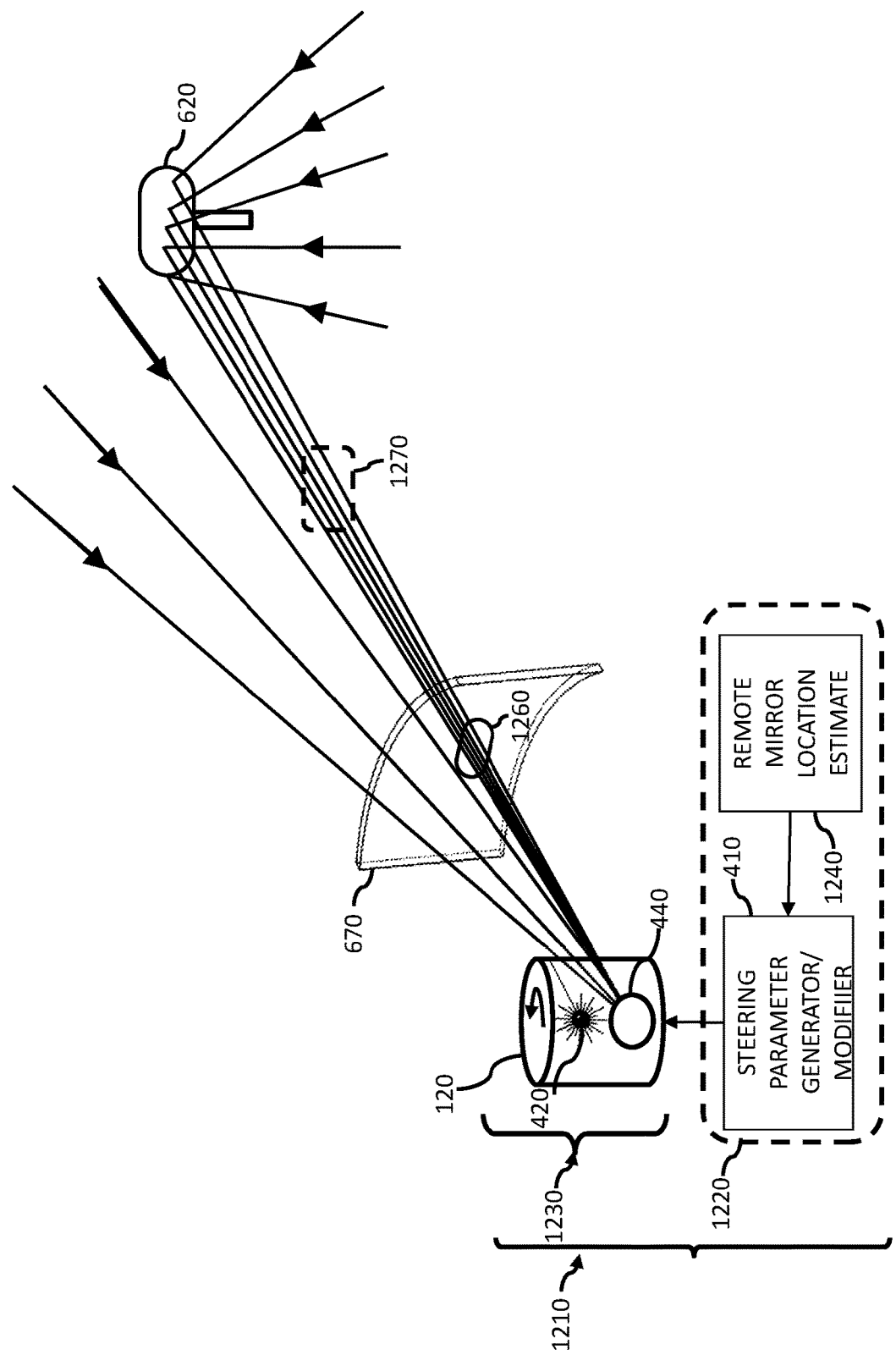

FIGS. 12A and 12B illustrate components of a laser range finder that obtains a location estimate for a remote mirror in a FOV and controls a laser transceiver subassembly based on the location estimate to generate a denser than average subset of laser reflections that have been deflected by the remote mirror, thereby increasing utilization of the remote mirror. FIG. 12A illustrates an exemplary embodiment in which a laser range finder 1210 comprising electronic circuitry 1220 and a laser transceiver subassembly 1230, that is operable to gather a set of reflections (1270 in FIG. 12B) from a field of view 670. At least some of the electronic circuitry (e.g. circuitry 1240) obtains a location estimate for a remote mirror 620. In the embodiment of FIG. 12A the location estimate is provided to a steering parameter generator/modifier 410 that generates a set of steering parameters (e.g. instructions to steer an aspect of the laser transceiver subassembly). At least some of the electronic circuitry can be coupled to transmit the laser steering parameters to the laser transceiver subassembly 1230. In the embodiment of FIG. 12A the laser transceiver subassembly is a steerable laser assembly 120 comprising a laser generator 420, a laser positioner (not shown) and a detector 440. The laser positioner (e.g. 430 in FIGS. 4A and 4B) can steer at least one laser beam from the laser generator 420 in a variety of directions in FOV 670. The sequence of directions and aspects of pulses generated in each direction can be based at least in part on the laser steering parameters. In this way steerable laser assembly 120 can generate a non-uniformly spaced set of outgoing laser pulses.

In the embodiment of FIG. 12A the outgoing set of laser pulses (e.g. 1250 and 1255) has a subset 1255 with a greater than average density, this subset is positioned by the steerable laser assembly 120 to be directed at the remote mirror in the FOV (e.g. occupying region 1260 of the FOV). The dense subset 1255 of outgoing laser pulses causes a corresponding deflected subset of laser reflections (illustrated as subset 1270 in FIG. 12B) that has been deflected by the remote mirror and has a greater than average density of laser reflections based at least in part on the set of laser steering parameters causing the steerable laser assembly to dynamically steer. In this way the embodiments of FIGS. 12A and 12B can track the location of the remote mirror in the FOV with a dense subset of outgoing laser pulses and a corresponding dense deflected subset of laser reflections. In this way laser range finder 1210 can increase the utilization (e.g. number of laser reflections per unit of angular range of the FOV) of a remote mirror with may have transient placement in the FOV or a variable location in the FOV. In one embodiment of FIG. 12A at least some of the electronic circuitry 1220 can be configured to compute a deflected subset of the set of laser reflections that have undergone deflection by the remote mirror (e.g. subset 740 in FIG. 9A). At least some of the electronic circuitry 1220 can be configured to compute for each laser reflection in a set of laser reflections that includes the deflected subset a corresponding 3D location indicative of a corresponding reflection location. Further, at least some of the electronic circuitry can be configured to perform for each laser reflection in the deflected subset of the set of laser reflections a correction step when computing the corresponding 3D location.

Turning in detail to FIG. 12A and FIG. 12B laser range finder 1210 can be mounted to a vehicle and thereby encounter remote mirrors (e.g. roadside mirror 620) along roadways or remote mirrors on other parts of the vehicle. Laser range finder 1210 can comprise electronic circuitry 1220. Exemplary electronic circuitry 1220 can comprise a processing subassembly (e.g. 520 in FIG. 5A). A communication link (e.g. 530 in FIG. 5A) can couple at least some of the electronic circuitry 1220 to laser transceiver subassembly 1230. The electronic circuitry 1220 in laser range finder 1210 can comprise circuitry 1240 to obtain a location estimate for a remote mirror (e.g. remote mirror 620). The circuitry 1240 can include one or more transceivers, processors or memories that receive the location estimate from the remote mirror or from a data processor that has processed sensor data (e.g. camera image data) to determine the location estimate. For example, an autonomous vehicle can approach an intersection with a remote mirror. A GPS receiver in the autonomous vehicle can identify an approximate location for the vehicle. The electronic circuitry 1240 can access a database of remote mirror locations (e.g. for all intersections in the country) and obtain or determine a location estimate for the remote mirror relative to the autonomous vehicle. Based on this location estimate the laser range finder can identify a portion of the FOV estimated to contain the remote mirror.

In several other embodiments the electronic circuitry 1240 can receive sensor data and obtain the location estimate for the remote mirror by processing the sensor data. For example, a processing subassembly (e.g. 520 in FIG. 5) or sensor data processor (e.g. 475 in FIG. 4A) can process laser reflections, camera imagery or radio frequency signals from a remote mirror to determine the location of the remote mirror.

Laser range finder 1210 can include a steering parameter generator/modifier, which can generate a set of steering parameters (e.g. instructions) operable to dynamically steer the steerable laser assembly to generate a non-uniform distribution of laser pulses in the FOV, based on the location estimate for the remote mirror.

Steering parameter generator/modifier 410 can transmit the set of steering parameters to the laser transceiver subassembly 1210 (e.g. steerable laser subassembly). In the embodiment of FIG. 12A steerable laser assembly 120 can include a laser positioner (e.g. 430 in FIGS. 4A and 4B) that is dynamically steerable to dynamically position a laser beam from laser generator 420. The laser position can mechanically steer the laser generator or can laser positioner 430 can use a solid-state mechanism to steer the laser beam. The dynamic steering of the steerable laser assembly (e.g. steering the laser positioner) can generate a set of outgoing laser pulses (e.g. 1250 and 1255) with a non-uniform distribution that is based at least in part on the location estimate for the remote mirror. For example, a mechanical laser positioner can rotate with a first speed thereby scanning the FOV and scan with a slower speed in a first region 1260 of the FOV 670. For a particular constant laser pulse rate the slower angular velocity in the first region 1260 of FOV 670 causes a denser than average subset 1255 of the set of outgoing laser pulses in the first region. In one aspect of several embodiments, the laser steering parameters cause the steerable laser assembly to position the denser-than-average subset of outgoing laser pulses within the FOV such that at least some of the subset of outgoing laser pulses is deflected by the remote mirror.

Turning to FIG. 12B a detector 440 in the steerable laser assembly 120 can detect a set of laser reflections corresponding to the set of outgoing of laser pulses. A deflected subset 1270 of the set of laser reflections undergoes deflection by the remote mirror in the process of reaching the detector 440. In several cases the deflected subset 1270 corresponds to those outgoing laser pulses that have been deflected in the outgoing direction by the remote mirror. In one aspect of several embodiments the steerable laser assembly increases the density of laser pulses in a region 1260 of the FOV. The region 1260 is positioned to include at least some of the remote mirror in the FOV and thereby increasing the density of both the outgoing laser pulses that are deflected by the remote mirror and the corresponding deflected subset of reflections 1270. Hence the deflected subset 1270 of the set of laser reflections can have a greater than average density, based at least in part on dynamically steering the steerable laser assembly based on the location of the remote mirror.

Figure 12C:
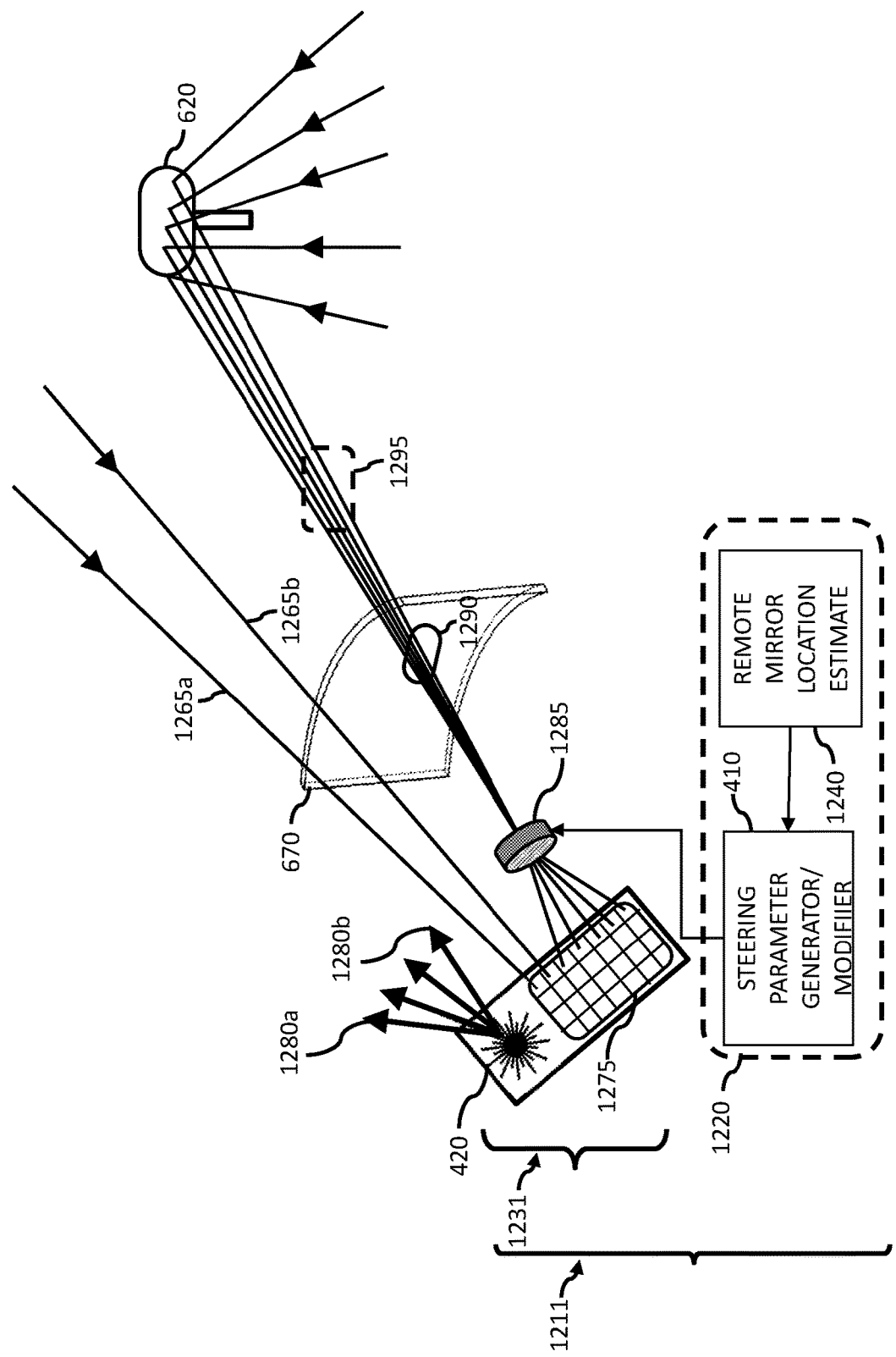

FIG. 12C illustrates a flash LIDAR embodiment. In the embodiment of FIG. 12C a flash LIDAR illuminates many points in the local environment simultaneously with a flash of light and a laser transceiver subassembly dynamically magnifies a portion of the FOV containing a remote mirror, thereby generating a subset of laser reflections that have been deflected by the remote mirror and have a greater than average density in the field of view. The light source in a flash LIDAR can be a laser beam or non-collimated non-coherent light (e.g. from one or more LEDs or a light bulb). The flash LIDAR of FIG. 12C comprises electronic circuitry 1220 and a laser transceiver subassembly 1231 similar to the embodiments of FIG. 12A and FIG. 12B. Unlike scanned laser range finders (e.g. 1210) the laser generator 420 in flash LIDAR 1211 illuminates a plurality of directions at once (e.g. directions 1280a and 1280b). The flash LIDAR has an arrayed detector 1275 (e.g. a focal plane array or a CCD array) designed to capture all of the reflections from the laser flash (or light flash) in a short period of time. Therefore unlike a scanned laser range finder that completes 10-15 scans of the FOV per second, a flash LIDAR can pulse the entire FOV with laser light and gather reflections in less than 100 milliseconds.

One challenge with flash LIDAR is limited measurement density (i.e., the number of measurements gathered from each laser flash). Often the FOV is uniformly magnified onto the detector array 1275. Interestingly, the embodiment of FIG. 12C has a dynamically controllable magnifier 1285 that can selectively magnify a portion of the FOV thereby spreading light from the magnified region onto an increased number of the detector pixels in the detector array 1275. This is similar to how a telescope magnifies an image from a small portion of the surrounds and a person can receive enhanced resolution from a small, but variable portion of the total available field of view. Therefore controllable magnifier 1285 magnifies a region of the FOV onto the detector array 1275 to produce more detected laser reflections, thereby increasing the resolution of laser ranging from the magnified portion of the FOV. Controllable magnifier 1285 can be similar to a zoom lens in a camera and can include mechanical or solid-state positioning components to position the optical elements in the controllable magnifier. In the embodiment of FIG. 12C electronic circuitry 1220 operates similar to a scanned laser range finder by obtaining a location estimate for the remote mirror and generating a set of laser steering parameters. However in the case of a flash LIDAR the laser steering parameters steer the controllable magnifier to magnify a portion of the FOV. For example, controllable magnifier 1285 can receive at least some of the set of laser steering parameters and dynamically position the controllable magnifier to expand (i.e., magnify) a portion of the FOV containing a remote mirror, thereby detecting a greater than average number of reflections from the portion of the FOV. Without the controllable magnifier the subset 1270 form the convex mirror could be mapped onto a single pixel (or a few pixels) in the detector array, thereby losing much of the information from the mirror, particularly a convex mirror that condensed the reflected image. Instead, the controllable magnifier 1285 functions to magnify the deflected subset 1270 from the remote mirror, thereby increasing the density of laser reflections in the deflected subset. In the exemplary embodiment of FIG. 12C laser reflections 1265a and 1265b are not associated with the remote mirror and have nominal measurement density at the detector (e.g. one detected laser reflection for every 10 degrees of the azimuthal range in the FOV). The deflected subset 1270 of the set of laser reflections contains a wealth of information from the region reflected by remote mirror 620. Unfortunately, the deflected subset is tightly grouped in a small angular range. The controllable magnifier increases the number of pixels in the detector array that record reflections from region 1290, thereby increasing the density of the deflected subset 1295 of detected laser reflections. For example, the average density of all laser reflections could be one laser reflections for every 10 degrees of azimuthal range in the FOV and the density in the reflected subset could be one laser reflection for every two degrees of azimuthal angular range. In this example the controllable magnifier increases the density of laser reflections from the remote mirror detected at the detector by a factor of five.

FIGS. 13A, 13B and 13C illustrate an exemplary field of view 1310 for an exemplary laser range finder in accordance with embodiments of the present disclosure. In FIGS. 13A, 13B and 13C a set of outgoing laser pulses (e.g. laser pulse 1320) is generated within the FOV 1310. Consider that exemplary FOV 1310 has a 40 degree azimuthal range and a 40 degree elevation range. The nominal density of outgoing laser pulses is one pulse for each 10 degree of azimuthal sweep and 10 degree of elevation. In FIG. 13A FOV 1310 encompasses a remote mirror 1330a. In an exemplary embodiment a steerable laser assembly can dynamically generate a subset of outgoing laser pulses 1340a with a higher than average spatial density that is positioned in the FOV to overlap at least a portion of remote mirror 1330a. For example, in FIG. 13A the pulse density of subset 1340a is increased to one laser pulse every 2 degrees of azimuthal sweep and 2 degrees of elevation.

Upon estimating the location of a remote mirror in the FOV several embodiments can dynamically vary other properties of the outgoing laser pulses (e.g. pulse intensity, laser spot size, laser divergence angle, pulse repetition rate, or laser color) to increase utilization of the remote mirror for ranging activities. For example, FIG. 13B illustrates a set of outgoing laser pulses with a nominal pulse density equal to FIG. 13A and a dense subset 1340b. The dense subset 1340b is used to interrogate a remote mirror 1330b. The laser spot size of the dense subset 1340b is reduced relative to the nominal laser spot size. For example, laser pulse 1320 can have a nominal spot size of 2 square centimeters at a distance of 1 meter from the laser range finder and laser pulses in the dense subset (e.g. laser pulse 1350) can have a spot size of 1 square centimeter. The smaller spot size can enhance the ability of a laser range finder to interrogate a convex remote mirror by reducing overlap between neighboring laser pulses. Dense subset 1340b has a complex non-uniform distribution of laser pulses (e.g. the complex diamond pattern). In several embodiments the pattern requires the ability to dynamically steer a steerable laser assembly (e.g. assembly 120 in FIG. 12A). FIG. 13C illustrates a similar situation except that both the density and intensity of laser pulses is modulated in the dense subset 1340c. The dense, intense subset 1340c is positioned to overlap with remote mirror 1330c. For example, nominal laser pulses (e.g. 1320) can have a nominal intensity of 1 joule per square centimeter and the laser pulse intensity in the dense subset 1340c can be 2 joules per square.

Figure 14A:
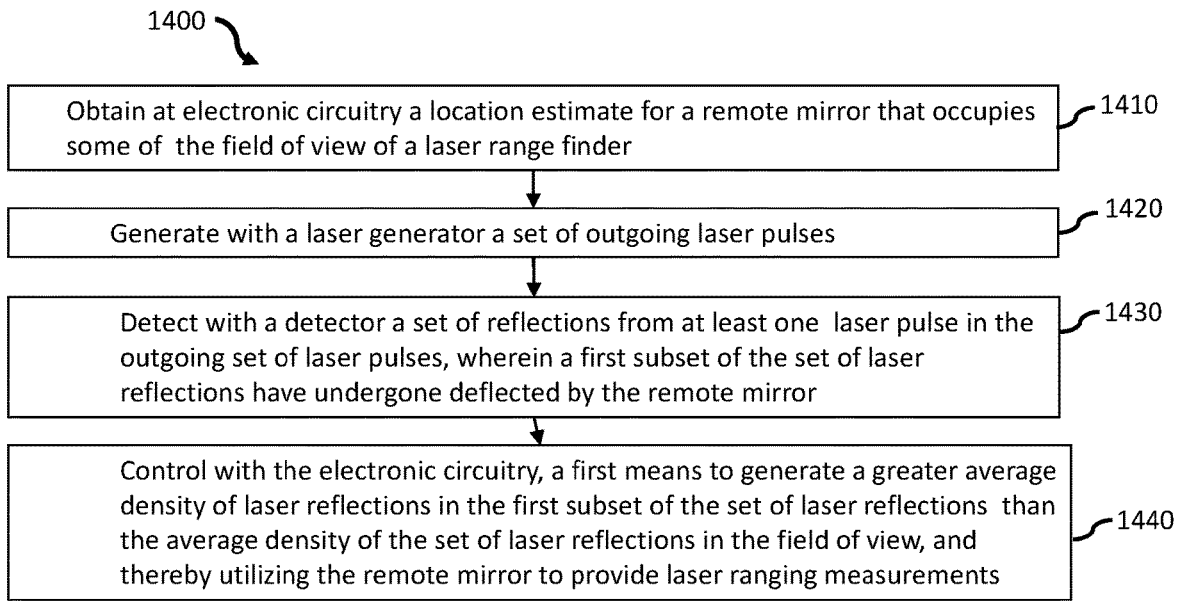
FIGS. 14A and 14B illustrate flow diagrams of methods to detect a set of laser reflections from a FOV including detecting an increased density of laser reflections in a region of the FOV containing a remote mirror, according to some embodiments.

FIG. 14A is a flow chart illustrating a method 1400 for generating with a laser range finder a deflected subset of reflections that have undergone deflection by a remote mirror in the FOV and wherein the laser range finder causes the deflected subset to have a greater than average density, thereby utilizing the remote mirror to perform laser ranging in accordance with one embodiment of this disclosure. At step 1410 a location estimate for a remote mirror that occupies some of the FOV of a laser range finder is obtained at electronic circuitry. At step 1420 a laser generator generates a set of outgoing laser pulses. The laser generator can be part of a steerable laser assembly. The laser generator can be a laser diode in a laser transceiver subassembly (e.g. laser transceiver subassembly 1230 in FIG. 12A or 1231 in FIG. 12B). At step 1430 a detector detects a set of reflections from at least one laser pulse in the outgoing set of laser pulses. Upon detection by the detector at step 1430, a first subset of the set of laser reflections have undergone deflected by the remote mirror. At step 1440 the electronic circuitry controls a first means disposed in the laser range finder to generate a greater average density of laser reflections in the first subset of the set of laser reflections than the average density of the set of laser reflections in the field of view. Exemplary means can be a laser positioner (e.g. 430 in FIG. 4A and FIG. 4B or a controllable magnifier such as 1285 in FIG. 12C). For example, at step 1440 the electronic circuitry can transmit a set of instructions (e.g. laser steering parameters 501 in FIG. 5B) to a steerable laser assembly comprising a laser generator and a laser positioner. The set of instructions can cause the steerable laser assembly to generate a non-uniform distribution of the set of outgoing laser pulses at step 1420 and thereby cause the first subset of set of reflections (e.g. a deflected subset) detected at step 1430 to have a greater than average density. One or more steps in method 1400 can be performed iteratively or periodically thereby enabling a laser range finder to track a remote mirror in the FOV with a high-density subset of the outgoing laser pulses (e.g. subset 1255 in FIG. 12A). In this way performing some or all of the steps in method 1400 in a variety of orders can provide that more laser reflections are gathered (e.g. converted into reflection data) from the remote mirror (e.g. more reflection per unit area or per unit solid angle of the FOV) than the average number of laser reflections gathered per unit area or per unit solid angle in the entire FOV.

Figure 14B:
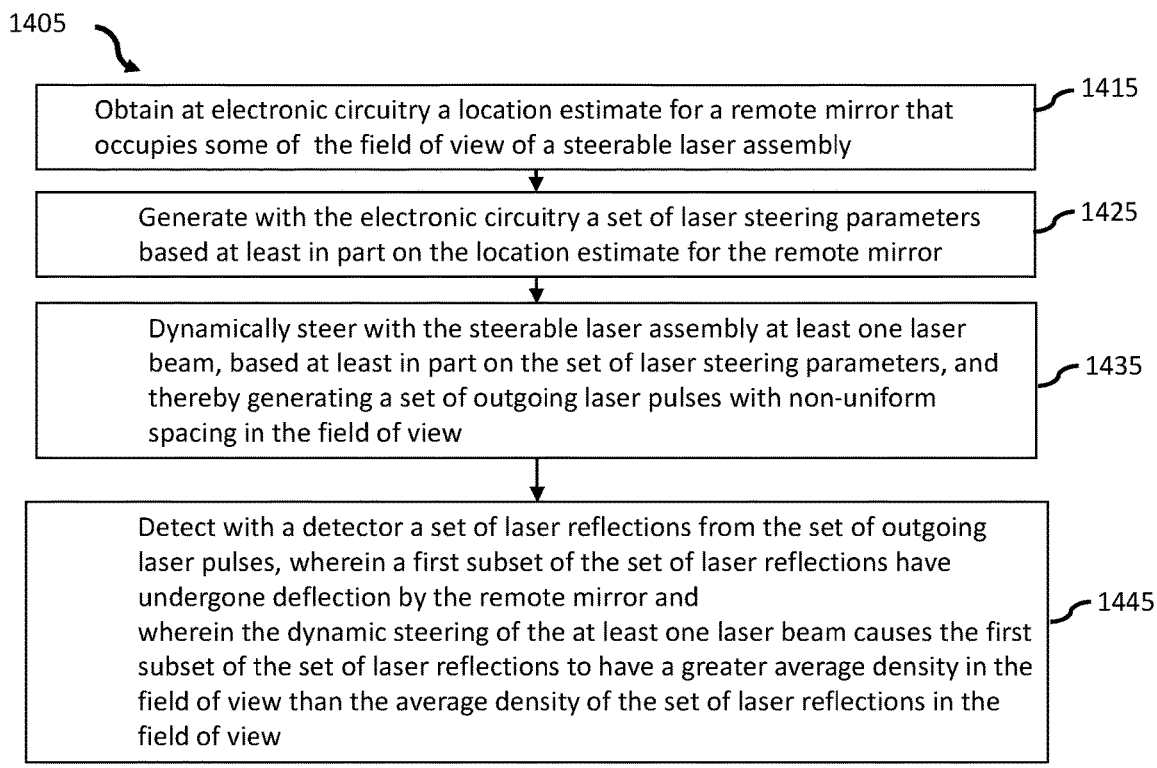

FIG. 14B is a flow chart illustrating a method 1405 for generating with a laser range finder a deflected subset of light reflections that have undergone deflection by a remote mirror in the FOV and wherein the laser range finder causes the deflected subset to have a greater than average density in accordance with one embodiment of this disclosure. At step 1415 a location estimate for a remote mirror that occupies some of the field of view of a steerable laser assembly is obtained by electronic circuitry. At step 1425 the electronic circuitry generates a set of laser steering parameters based at least in part on the location estimate for the remote mirror. At step 1435 the steerable laser assembly dynamically steers at least one laser beam, based at least in part on the set of laser steering parameters, and thereby generates a set of outgoing laser pulses with non-uniform spacing in the FOV of the laser range finder. At step 1445 a detector detects a set of laser reflections from the set of outgoing laser pulses, wherein a first subset of the set of laser reflections have undergone deflection by the remote mirror and wherein the dynamic steering of the at least one laser beam by the steerable laser assembly causes the first subset of the set of laser reflections to have a greater average density in the field of view than the average density of the set of laser reflections in the field of view.

LIDAR with Feedback Control of Remote Mirror

In a related area, autonomous vehicles may increasing rely on mirrors to augment the direct FOV of several sensors (e.g. laser range finders and cameras) with an indirect FOV provided by directions in the FOV of the sensors for which light is deflected by the mirrors. In several situations these mirrors can be remote mirrors and have aspects that complicate their interaction with autonomous vehicle sensors. Exemplary remote mirror aspects can include transient placement in the FOV of a sensor, occupying a small (e.g. <10%) variable portion of the FOV of a sensor, uncontrolled variable position in the FOV of a sensor and uncontrolled variable distance of the remote mirror and placement of the remote mirror on an unknown part of a vehicle enabling unforeseen movement independently of the sensor. Modern laser range finders (e.g. LIDARs) often incorporate rotating or scanning mirrors to scan a FOV and have used compensation mirrors to deflect all outgoing laser pulses. These mirrors are typically incorporated into the housing of the range finder and have a predetermined position in the FOV of the laser range finder (e.g. a compensation mirror or a scanning mirror). The controlled motion or controlled position of integrated mirrors enables the manufacturer to anticipate the effect of the mirror on a laser beam or accurate characterize the transfer function of the mirror. For example, a scanning mirror in a rotating LIDAR is assumed to deflect one or more laser beams from a laser generator in a predetermined manner as the scanning mirror rotates. For example, a scanning mirror in a LIDAR is characterized by the manufacturer and a dedicated position sensor is often provided such that the direction of a laser reflection can be estimated from the known characteristics and position of the scanning mirror.

In the real world a laser range finder can encounter remote located mirrors that are not well characterized (e.g. occupies an unknown position, or occupies a variable and unknown region of the FOV). A remote mirror may have unknown characteristics such as curvature, orientation, distance and occupy an unknown region of the FOV. In one example, a remote mirror on the trailer of an articulated truck can provide a very useful indirect FOV (e.g. in a blind spot behind the trailer). One challenge for a laser range finders with control over a remote mirror (e.g. on a vehicle trailer) is to select a position (e.g. orientation) for that remote mirror that provides the most effective indirect portion of the FOV (e.g. that portion in which laser reflection have been deflected by the remote mirror). In several aspects this challenge can be likened to how rental-car customers often adjust the wing-mirrors on their rental car, based on their preferences and visual feedback. A remote mirror can be useful for laser range finding as well as computer vision system (e.g. camera systems) on an autonomous or semi-autonomous vehicle. In one aspect the remote mirror can be remotely positioned based at least in part on processing laser reflections that have undergone deflection by the remote mirror.

Consider that an autonomous articulated truck can benefit greatly from remote located mirrors located on the trailer. The tractor portion can contain a laser range finder and can have an electrical cable with a separable coupling (e.g. an electrical connector) operable to connect to a mirror positioner to position a remote mirrors on a trailer. During a typical week the tractor can pull a variety of different trailers, each comprising a different arrangement and placement of remote mirrors. Hence in one aspect of several embodiments a method includes the steps of coupling two communication components (e.g. the two halves of an electrical connector) to form a communication link between a laser range finder in the tractor of a vehicle and a remote mirror in the trailer portion of an articulated vehicle. Upon establishing a communication link with a remote mirror, the laser range finder with remote mirror control capability can adjust the one or more remote mirrors. Electronic circuitry (e.g. a processing subassembly) can send position signals to the remote mirror to adjust the remote mirror based on a criterion (e.g. that some of the rear of the trailer must appear in reflections from the remote mirror) or based on stored preferences. In one aspect the mirror positioning signals can be based on processed aspects of laser reflections that have been deflected by the remote mirror, thereby providing rangebased feedback control of the remote mirror to address the challenges associated with the unknown remote mirror characteristics.

Consider that upon sensing a new remote mirror coupled to a laser range finder several key aspects may be unknown such as the location of the remote mirror in 3D space relative to the laser range finder, the portion of the FOV of the laser range finder occupied by the remote mirror, the orientation (e.g. direction) of the remote mirror or the actual locations of objects reflected in the remote mirror (e.g. the indirect FOV). While the initial orientation of the remote mirror can be reported to a processing subassembly in the laser range finder, properties such as the reflection locations provided by the remote mirror and the portion of the FOV in which laser reflections are deflected by the remote mirror can require feedback of reflection data and subsequent adjustment of the remote mirror.

In one exemplary embodiment, a method for provisioning a remote mirror by a laser range finder includes the steps of; generating a set of outgoing laser pulse, detecting a corresponding set of laser reflections including at least some reflections that have been deflected by the remote mirror. The exemplary method then generates reflection data from the set of laser reflections and processes at least some of the reflection data to generate one or more position signals operable to instruct a mirror positioner to change the position of the remote mirror. In some embodiments the method continues to adjust the remote mirror based on gathered laser reflections until a criterion is satisfied (e.g. a quality aspect of the remote FOV offered by the remote mirror, or a determination of the portion of the FOV in which reflections are deflected by the remote mirror). In one example, the processing subassembly can process the reflection data and adjust the remote mirror position until a criterion is satisfied such as seeing a portion of the trailer in the deflected subset of laser reflections is achieved. Embodiments of this disclosure enable the mirror to be provisioned by the laser range finder based on desired range or desired reflection location.

In one embodiment a system for adjusting a remote mirror can comprise a laser transceiver subassembly to gather laser ranging data, a processing subassembly, a remote mirror, a mirror positioner, a communication cable and a separable coupling (e.g. an electrical connector). The system for adjusting the remote mirror operates to position the remote mirror based on processing reflection data from a set of laser reflections, including some laser reflections that have undergone deflection in the remote mirror.

Figure 15:
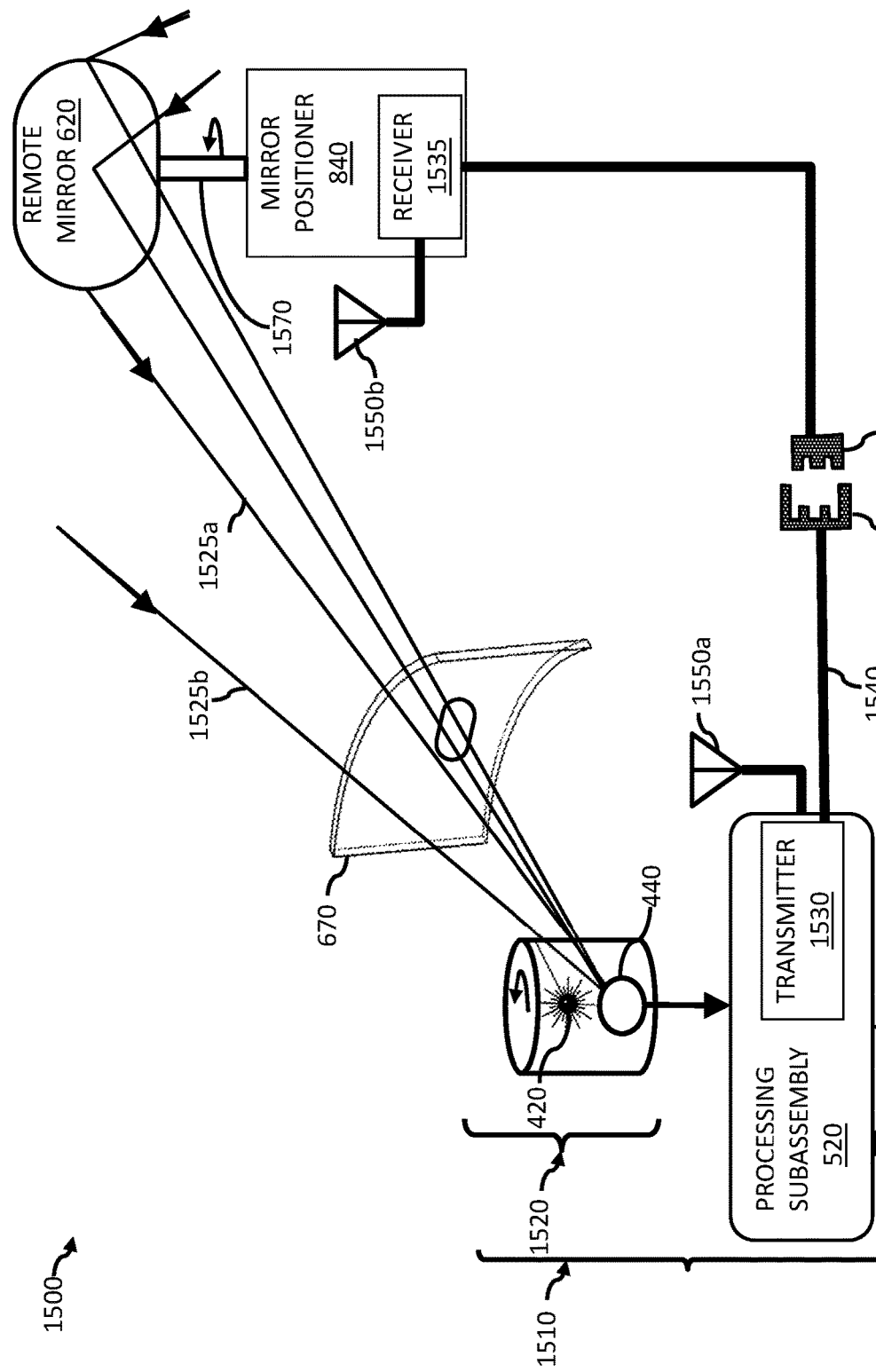
FIG. 15 illustrates several components of a system that controls the position of a remote mirror based at least in part on laser reflections, according to an embodiment of the present disclosure.

FIG. 15 illustrates several components of several embodiments of a system 1500 for adjusting a remote mirror based on feedback from a laser range finder. Laser transceiver subassembly 1520 functions to transmit laser light in an at least 2D range of directions in a field of view 670 and gather a corresponding set of laser reflections. In the first embodiment laser transceiver subassembly 1520 can be part of a laser range finder 1510. Laser transceiver subassembly 1520 can be a steerable laser assembly (e.g. steerable laser assembly 120 in FIG. 12B) and comprise a laser generator 420 and a laser positioner to scan a laser beam from the laser generator in the at least 2D range of directions within the FOV. In an alternative embodiment laser transceiver subassembly 1520 can be have a flash laser generator that generates laser light in the 2D range of directions from a single laser pulses. For example, a flash laser generator can comprise laser generator 420 and a laser positioner 430 designed to position the laser beam in a wide range of directions at once (e.g. a spreader or a diffuser). In this way a flash can illuminate many locations in the FOV 670 at once.

Laser transceiver subassembly 1520 can further comprise a detector 440. Laser detector 440 can comprise a single photodiode, pin diode or an array of photo diodes, pin diode or charge coupled devices (CCDs) that functions to receive a set of laser reflections corresponding to a set of outgoing laser pulses from the laser generator and thereby generate reflection data. A remote mirror 620 positioned in the FOV 670 causes some of the set of laser reflections (e.g. 1525*a*) to undergo deflection by the remote mirror prior to reaching the detector. Other laser reflections (e.g. 1525*b*) reach the detector directly.

Detector 440 can comprise circuitry to generate reflection data corresponding to the set of laser reflections indicative of the reflection location. Detector 440 can transmit at least some of the reflection data to a processing subassembly 520. Reflection data can include a corresponding range for each laser reflection in the set of laser reflections. The range can be calculated based on the time of flight of the corresponding laser reflection relative to the transmission time of a corresponding outgoing laser pulse. For example, if light travels at 300 meters per microsecond and the time of flight of a reflection is 1 microsecond then the range for the laser reflection can be estimated as 150 meters from the detector. Reflection data can include a corresponding direction for each laser reflection in the set of laser reflections. The direction can be at least a two-dimensional direction. The direction corresponding to each laser reflection can be a measure of the direction of a mechanically steerable laser assembly at the time of arrival of the laser reflection or can be a pixel (e.g. single element) of a detector array indicating the direction in which the laser reflection struck a detector comprising an array of elements (e.g. photodetectors). In FIG. 15 detector 440 is operably coupled to transmit at least some of the reflection data to an electronic circuitry such as processing subassembly 520.

Processing subassembly 520 can be housed in laser range finder 1510 with laser transceiver subassembly 1520 or can be a separate processing subassembly coupled to laser transceiver subassembly 1520 by a communication link (e.g. an Ethernet cable). Processing subassembly 520 can perform a variety of functions including processing at least some of the reflection data and thereby generating one or more position signals operable to cause a mirror positioner 840 to change the position of remote mirror 620. For example, processing subassembly 520 can process at least some of the reflection data, to identify a subset of the laser reflections that has been deflected by remote mirror 620 (or the corresponding subset of the reflection data) and thereby generate a position signal based on the identified subset. In another example processing subassembly 520 can identify a deflected subset of the reflection data and evaluate a test on the deflected subset of the reflection data and determine one or more position signals for the mirror positioner based on the test result.

Processing subassembly 520 can further comprise a transmitter 1530. Mirror positioner 840 can comprise a receiver 1535 that functions to communicatively couple the processing subassembly 520 to the mirror positioner 840. Transmitter 1530 can transmit position signals using a cable 1540 comprising at least one wire to carry position signals to the mirror positioner. The cable 1540 can be designed to carry a specific signal protocol such as an Ethernet cable, CANBUS cable, a serial communication cable, USB cable. Alternatively the communication cable can carry voltage pulses designed to actuate a mechanical motor or actuation component in the mirror positioner. Cable 1540 can include one or more signal wires to carry position signals and one or more power wires to carry power from electronic circuitry to the mirror positioner.

In one example, many tractor-trailer vehicles use coiled cables (e.g. SAE J2394 7-conductor cables) for coupling ABS brakes in the trailer to ABS controllers in the tractor portion. A tractor-trailer truck with a remote mirror 620 and mirror positioner 840 located on the trailer can transmit position signals from electronic circuitry (e.g. processing subassembly 520) located in the tractor portion using one or more SAE J2394 standard coiled cables. Cable 1540 can have a separable coupling, such as connector 1545a, (e.g. a 7-way connector, common in commercial vehicles) operable to connect a corresponding connector 1545b connected to mirror positioner 1545b. Connectors 1545a and 1545b can provide a separable communication link for transmitting position signals from communication circuitry (e.g. processing subassembly 520) to the mirror positioner 840.

Transmitter 1530 can be a wired transceiver such as a CANBUS, SAE J1939 or Ethernet transceiver. Transmitter 1530 can receive position data from processing subassembly 520 and subsequently generate corresponding position signals based on the position data. For example, transmitter 1530 can perform actions such as assigning a communication address to mirror positioner 840 and then generating position signals using the assigned address and the position data.

Transmitter 1530 can also be a wireless transmitter that utilizes an antenna 1550a to transmit one or more position signals wirelessly to a corresponding receiver 1535 and antenna 1550b at the mirror positioner. Transmitter 1530 can use a variety of short range wireless protocols (e.g. Bluetooth, Zigbee, or Wi-Fi) to transmit position signals to the mirror positioner. For the purposes of this disclosure a short range wireless signal is a wireless signal with an effective operating range of less than 400 m. Transmitter 1530 can use a variety of long range wireless protocols such as 3G, 4G or 5G protocols to transmit position signals. For the purpose of this disclosure a long range wireless protocol has a range greater than 400 m. Transmitter 1530 can be responsible for forming a wired or wireless link between electronic circuitry (e.g. processing subassembly 520) and the mirror positioner 840, including receiver discovery, protocol arbitration, address assignment advertising and link maintenance. In one example, upon receiving power a remote mirror positioner 840 can begin advertising its presence and capabilities. Transmitter 1530 can be part of a transceiver that receives the advertising signals from the remote mirror positioner and establishes a communication link operable to transfer position signals from the processing subassembly 520 to the mirror positioner 840.

The mirror positioner 840 can be mechanically coupled to the remote mirror 620 and communicatively coupled to processing subassembly 520. Mirror positioner 840 can function to position the remote mirror in response to receiving one or more position signals from the processing subassembly or other electronic circuitry attached to the laser transceiver subassembly 1520. Mechanical positioner 840 can comprise a motor or actuator (e.g. a steeper motor, a linear actuator, or servo motor) to change the position of remote mirror 620.

The mirror positioner 840 can change the orientation of a remote mirror (e.g. cause the mirror to rotate by a specified amount or to a specified direction about an axis). For example, the mirror positioner can comprise an axle 1570 around which the remote mirror can rotate. In some instances position signals cause a change in position by a specific amount (e.g. 1 degree per voltage pulse). A position signal can specify a change in position relative to a known or unknown starting position for the remote mirror. In some instances position signals can specify a specific position (e.g. a position signals that specifies positioning a remote mirror at 12 o'clock relative to a trailer) The mirror positioner can change the location of the mirror, for example by extending axle 1570 to raise or lower the remote mirror by a specified amount or to a known height.

A position signal can cause the mirror positioner to perform a discrete position change on the remote mirror (e.g. a single position change from North to West facing). An example of a discrete position change in response to a position signals can be a one-time rotation of a stepper motor by 10 degrees, or raising a mechanical coupling by 1 cm. A position signals can be a discrete position signal if it causes the mirror positioner to perform a non-continuous change in the position of a remote mirror. The non-continuous position change can be a single position change or a non-continuous sequence (e.g. change the position of the remote mirror from North to West in 10 degree increments with a 1 second pause in between each increment). For the purpose of this disclosure a mirror positioner that causes a remote mirror to discretely change the position of a remote mirror is performing a non-continuous or discrete position change.

Alternatively, a position signal can causes the mirror positioner to continuously change the position of the mirror (e.g. a signal that causes the mirror positioner to spin the remote mirror). For example, one or more position signals from a processing subassembly 520 can cause the mirror to rotate or scan from side to side at a new speed. For the purpose of this disclosure a position signal is a continuous position signal if it causes the remote mirror to continuously change position. A mirror positioner that causes a remote mirror to continuously change position is performing a continuous position change. For example, a continuous sequence of discrete position signals, can cause a mirror positioner to perform a continuous position change on a remote mirror.

In a first simple embodiment, a remote mirror control system 1500 comprises a laser transceiver subassembly 1520, electronic circuitry (e.g. processing subassembly 520) and a means to transmit position signals to a mirror positioner 840, thereby controlling a remote mirror 620 that appears in the FOV 670 of the laser transceiver subassembly 1520. The means to transmit position signals to remote mirror position 840 can include one or more of electrical cable 1540, connector 1545a, transmitter 1530 and antenna 1550a.

In a second embodiment a laser range finder 1510 comprises laser transceiver 1520, and processing subassembly 520. Laser range finder 1510 can be operably coupled to mirror positioner 840 and operable to generate one or more position signals based on processing reflection data and thereby cause mirror positioner 840 to change the position of a remote mirror in the FOV of laser range finder 1510.

In a third embodiment a remote mirror control system 1500 can include a laser range finder 1510 and means to transmit position signals to a mirror positioner 840, thereby controlling a remote mirror 620 that appears in the FOV 670 of the laser transceiver subassembly. In another related embodiment a remote mirror control system 1500 can include a laser range finder 1510, one or more mirror positioners (e.g. 840) coupled to one or more remote mirrors (e.g. 620) and means to transmit position signals to a mirror positioner 840. In response to processing at least some of the reflection data from the detector 440 processing subassembly 520 can transmit control signals to the mirror positioner to change the position of the remote mirror. Processing subassembly 520 can receive sensor data (e.g. from steering sensor 1531 indicating the steering angle of a vehicle or camera data indicating the orientation of the vehicle or surrounding scene). The processing subassembly can generate a criterion based on the sensor data. The criterion can be a measure of performance of the remote mirror or the laser range finder system 1510, such as the ability to see a particular blind spot around a vehicle when turning. The processing subassembly can perform feedback control of the remote mirror in order to satisfy the criterion. For example, the processing subassembly can repeatedly generate and transmit signals to the mirror positioner to reposition the mirror in a process to eventually satisfy the criterion based on the laser reflections in the deflected subset. In some embodiments one or more position signals can be selected based on a known lookup table or transfer function that uses the steering angle of the vehicle as an input. For example, a steering angle of 15 degrees can cause the processing subassembly to command the remote mirror to reorient to provide coverage of a blind spot.

FIG. 16 illustrates several components of a remote mirror control system 1605 located on a tractor-trailer truck. In several embodiments illustrated in FIG. 16 a tractor portion 1620 of a tractor-trailer truck can have a laser range finder 1610 that functions to process reflection data and thereby position one or more mirrors on the truck. A tractor portion 1620 such as a big-rig tractor can be attached to several different trailers during a typical week or over the lifetime of the tractor. In one aspect each time a trailer 1630 is connected to the tractor 1620 the best position of a set of wing-mirrors 1625a and 1625b can change (e.g. can be a function of the trailer geometry). Laser range finder 1610 or a computer system in the tractor can store data indicating one or more criteria or a figure of merit for the wing-mirrors or aspects of the reflected field of view. For example, a trailer could have a different width, length, height, payload or cargo hazard requirement relative to a previous trailer. Hence wing-mirrors 1625a and 1625b can require adjustment upon attachment of a new trailer. In one embodiment a laser transceiver subassembly generates a set of outgoing laser pulses, measures a set of laser reflections from the set of outgoing laser pulses and generates reflection data indicating a reflection direction and a reflection range for each laser reflection in the set. In the embodiments of FIG. 16 some of the laser reflections (e.g. 1645) have been deflected by the remote mirror. Laser range finder 1610 can have a processing subassembly (e.g. 520 in FIG. 5A) that processes at least some of the reflection data and thereby generates position signals operable to change the position of the wing-mirrors 1625a and 1625b. The wing-mirrors can be exemplary remote mirrors. A transmitter in processing subassembly 520 in FIG. 5A can transmit the position signals to one or more mirror positioners (e.g. mirror positioner 1635) attached to the wing-mirrors. In this embodiment the subset of the set of laser reflections that have been deflected by the remote mirror (e.g. laser reflections in angular range 1640) can initially be indistinguishable from direct laser reflection that have not undergone deflection. The processing subassembly can transmit position signals instructing the mirror positioner 1535 to change the position of the wing mirrors and then process new reflection data using differential analysis to identify the deflected subset 1645 of the laser reflections or the portion of the FOV of laser range finder 1610 occupied by wing-mirrors 1625a and 1625b. The processing subassembly can process at least some of the reflection data to identify if one or more criteria or figures of merit are met by the laser reflections. For example, a processing subassembly can determine whether the deflected subset of laser reflections is operably positioned to gather reflections from a region parallel to the trailer, or if reflections include a portion of the trailer or if a remote mirror (e.g. 1625a) is positioned to further reflect laser beams from a remote mirror 1650 positioned on the trailer. In one example, a feature on the trailer can be used as a fiduciary mark and the wing-mirror can be adjusted until processing of the laser reflections indicates that the fiduciary mark is appropriately positioned. In another example, adjustment of the mirror can be guided by and continue until the processed reflection data indicates a sufficient maximum distance or quality aspect of the indirect field of view (i.e., the set of all directions or reflection locations provided by laser reflections that have undergone deflection in the remote mirror). Upon connecting a trailer 1630 processing subassembly (e.g. 520 in FIG. 15) can iteratively process laser reflection data and thereby generate position signals operable to position the wing-mirrors (e.g. 1625*a* and 1625*b*). In this way the mirrors can be tailored to satisfy one or more criteria or optimize one or more figures of merit prior to or while driving the truck. An exemplary criterion can be the ability to see a particular indirect field of view or blindspot behind the truck.

In a related embodiment a remote mirror 1650 and a corresponding mirror positioner 840 can be located on the trailer portion 1630. Upon connecting a new trailer to the tractor an operator or a robot can attach connectors 1545*a* and 1545*b*. Following attachment of the connectors, cable 1540 can supply power to mirror positioner 840 and communicatively couple laser range finder 1610 to mirror positioner 840. Remote mirror 1650 can be one of a plurality of remote mirrors on trailer 1630 that are communicatively coupled by cable 1530 and connector 1545*a*. Hence the remote mirror positioning system can be used to dynamically learn and adjust the position of remote mirrors in the FOV of laser range finder 1610. In some embodiments laser reflections can travel directly from the laser range finder 1610 to a remote mirror on the trailer. In other embodiment laser reflections (e.g. angular range 1640) are deflected by a plurality of mirrors in the path to and from a remote mirror. For example, laser reflections that undergo deflection by remote mirror 1650 also undergo deflection by wing-mirror 1625*a* in the process of reaching the detector in laser range finder 1610. For this and other reasons the transfer function between position signals and reflection data can be complex be best learned by performing a sequence of initial adjustments on the remote mirrors. Several embodiments of this disclosure provide a system and method for learning the arrangement-specific transfer function between remote mirrors and their effect on the FOV of a laser range finder (e.g. laser range finder 1610 in a tractor of an articulated vehicle). For example, upon attaching a new trailer, laser range finder 1610 can perform a series of adjustments to remote mirror 1650 to ensure that the range of possible reflection locations includes the space behind the trailer where person 160 can be standing. The series of adjustments can include first processing at least some of the reflection data form a detector in the laser range finder and thereby adjusting wing-mirror 1625*a* to position remote mirror 1650 in the FOV of wing-mirror 1625*a*. The series of adjustments can further include processing at least some of the reflection data and thereby generating position signals to cause the mirror positioner 840 to change the position of remote mirror 1650 until a criterion involving the reflection locations offered by remote mirror 1650 is satisfied.

FIG. 17 illustrates an exemplary method 1700 for adjusting a remote mirror based on processing laser reflections according to an embodiment of the present disclosure. At step 1710 a laser transceiver subassembly generates a set of outgoing laser pulses in a plurality of directions in a field of view. For example, the laser transceiver subassembly can comprise a steerable laser assembly that steers a laser beam in the field of view and thereby generates the outgoing set of laser pulses in an at least 2D range of directions.

At step 1720 one or more detectors in the laser transceiver subassembly detects a set of laser reflections corresponding to at least one of the set of outgoing laser pulses and thereby generating reflection data, wherein at least some of the laser reflections in the set of reflections have undergone deflection by a remote mirror. At step 1730 at least some of the reflection data is processed and one or more position signals are thereby generated. In one embodiment the at least some of the laser reflection data includes data from at least one laser reflection that has been deflected by the remote mirror. At step 1740 the one or more position signals are transmitted to a mirror positioner that changes the position of the remote mirror, based at least in part on the one or more position signals.

In a group of related embodiments one or more remote mirrors on an articulated vehicle can be used by a laser range finding system to provide laser ranging of indirect fields of view outside of FOV of the laser range finder that can be accessed directly. When the articulated vehicle is travelling in a straight line these remote mirrors can occupy a first position that can be optimized for driving in a straight line. The laser range finder can process at least some of the reflection data and identify objects or aspects of the region shown in the remote mirrors (e.g. a range of remote reflection locations behind the articulated vehicle). The laser range finder can identify a portion of the FOV in which laser reflections are deflected by the remote mirror. At some later time the vehicle can execute a turn and sensor data from one or more sources can indicate the turn (e.g. an angle detector on the trailer kingpin or steering angle measured by the steering wheel). In response to receiving sensor data indicating the turn, the laser range finder can calculate an updated location or orientation for one or more remote mirrors in the FOV. In another aspect a processing subassembly associated with a laser range finder can signal a mirror positioner associated with the remote mirrors to change the position of the remote mirrors to compensate for the change in shape of the articulated vehicle. For example, when executing a sharp right turn the processing subassembly can sense the turn and instruct one or more mirror positioners to turn the mirrors to compensate for a laser ranging blind-spot that would otherwise occur if the remote mirrors were not repositioned during the turn. Therefore, in one aspect a processing subassembly can dynamically track the position of the remote mirrors as the vehicle turns and in another aspect the processing subassembly associated with the laser range finder can instruct the mirror positioner to compensate for the change in position of the remote mirror.

FIG. 18A and FIG. 18B illustrates two related embodiments of a laser range finder that can utilize a controllable remote mirror. In a first embodiment illustrated in FIG. 18A a laser range finder 1810 can generate a set of outgoing laser pulses and detect a corresponding set of laser reflections with a subset of the laser reflections being deflected by remote mirrors (e.g. wing mirrors 1625*a*, 1625*b* or trailer mirror 1650). When the tractor trailer truck (e.g. tractor 1620 and trailer 1630) is driving in a straight line the tractor is approximately parallel to the trailer. For example, a line 1820*a* parallel to the tractor portion 1620 is parallel to a line 1820*b* parallel to the trailer portion 1630 when driving in a straight line. In one aspect reflection data from a detector in laser range finder 1810 can be processed to generate a position estimate for a remote mirror (e.g. 1650) on the trailer portion 1630 of the vehicle (either in 3D space or a 2D location within the FOV of the laser range finder). FIG. 18B illustrates another aspect that as the vehicle turns, data indicative of the steering angle 1830 can be used to estimate an updated location of the remote mirrors in the FOV or in 3D space and/or generate one or more position signals operable to compensate the remote mirror positions for the change in shape of the vehicle. For example, in FIG. 18A the positions of wing-mirror 1625*b* is well suited to seeing vehicle 170 in the lane next to the trailer. However in FIG. 18B the same remote mirror orientation relative to the tractor would increasingly provide laser reflections from the trailer itself as the vehicle turns to the right. Hence vehicle 170 may not be seen by laser range finder 1810 if wing-mirror 1625*b* remains in its original orientation as the tractor turns. A processing subassembly associated with the laser range finder 1810 can process reflection data to generate one or more position signals to compensate the orientation of wing-mirror 1625*b*. Alternatively processing subassembly (e.g. 520 in FIG. 15) can receive sensor data indicating the steering angle 1830 between lines 1820*a* and 1820*b* and base the position signals at least in part on the sensor data indicating the steering angle.

While the above description contains many specificities, these should not be construed as limitations on the scope of any embodiment, but as exemplifications of various embodiments thereof. Many other ramifications and variations are possible within the teachings of the various embodiments. Thus the scope should be determined by the appended claims and their legal equivalents, and not by the examples given.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A laser range finder with a field of view comprising:
   a. electronic circuitry configured to obtain a location estimate for a remote mirror located in the field of view, and to generate a set of laser steering parameters based on the location estimate; and
   b. a steerable laser assembly, coupled to at least some of the electronic circuitry and configured to:
      use the set of laser steering parameters to generate a set of laser pulses having an average spatial density in the field of view; the set of laser pulses comprising a first subset that is positioned in the field of view to overlap at least a portion of the remote mirror; and wherein the first subset of the set of laser pulses has a greater spatial density than the average spatial density of the set of laser pulses in the field of view.

2. The laser range finder of claim 1 further comprising a sensor to gather sensor data from a local environment, the local environment being beyond the laser range finder and containing the remote mirror; and
   wherein the electronic circuitry is configured to process the sensor data to obtain the location estimate for the remote mirror.

3. The laser range finder of claim 1 wherein the remote mirror is separate from the laser range finder and is operable to have transient placement in the field of view; and
   wherein the electronic circuitry is further configured to identify whether the remote mirror is present in the field of view before obtaining the location estimate for the remote mirror.

4. The laser range finder of claim 1 wherein the laser range finder is unattached to the remote mirror; and wherein the laser range finder is operable to move relative to the remote mirror.

5. The laser range finder of claim 1 wherein the remote mirror has transient presence in the field of view and wherein the electronic circuitry is configured to detect when the remote mirror is in the field of view.

6. The laser range finder of claim 1 further comprising a detector configured to detect a set of laser reflections from the set of laser pulses;
   wherein the set of laser reflections have an average spatial density of laser reflections in the field of view; and
   wherein the steerable laser assembly functions to provide that a first subset of the set of laser reflections, that have been deflected by the remote mirror, have a greater average spatial density in the field of view than the average spatial density of the set of laser reflections in field of view.

7. The laser range finder of claim 1 further comprising a detector configured to detect laser reflections corresponding to the set of laser pulses, the laser reflections having an average spatial density of laser reflections; and
   wherein the steerable laser assembly is configured to distribute the set of laser pulses in the field of view such that the detector detects a greater density of the laser reflections from the remote mirror than the average spatial density of laser reflections.

8. The laser range finder of claim 1 wherein the location estimate is a mirror region of the field of view.

9. The laser range finder of claim 1 further comprising a receiver configured to receive signals from the remote mirror; and
   wherein the electronic circuitry is configured to process the signals and thereby obtain the location estimate for the remote mirror.

10. A method comprising:
    a. obtaining at electronic circuitry a location estimate for a remote mirror, wherein the remote mirror occupies a mirror region of a field of view of a steerable laser assembly;
    b. generating with the electronic circuitry a set of laser steering parameters based at least in part on the location estimate for the remote mirror;
    c. dynamically steering with the steerable laser assembly at least one laser beam, according to the set of laser steering parameters, and thereby generating a set of laser pulses with an average spatial density in the field of view, and
       wherein a first subset of the set of laser pulses have a greater spatial density in the mirror region of the field of view than the average spatial density of the set of laser pulses in the field of view.

11. The method of claim 10 further comprising the steps of:
    sensing with a sensor one or more aspects of a local environment beyond the steerable laser assembly and thereby generating sensor data,
       wherein the remote mirror has transient placement in the field of view, and wherein the sensor date is operable to identify whether the remote mirror is presence in the field of view;

processing the sensor data with at least some of the electronic circuitry to identify whether the remote mirror is present is in the field of view; and processing at least some of the sensor data to obtain the location estimate for the remote mirror in the field of view.

12. The method of claim 10 further comprising the step of altering, based on the set of laser steering parameters, an aspect of the first subset of the set of laser pulses in the mirror region of the field of view, relative laser pulses in the set of laser pulses outside the mirror region of the field of view and wherein the aspect is from a group of aspects consisting of laser pulse intensity, laser pulse spot size and laser pulse duration.

13. The method of claim 10 further comprising the steps of:

generating a test set of laser pulses, prior to obtaining the location estimate for the remote mirror; and processing with the electronic circuitry laser reflections from the test set of laser pulses to thereby detect the remote mirror in the field of view.

14. The method of claim 10 wherein the step of dynamically steering the at least one laser beam with the steerable laser assembly functions to non-uniformly distribute the set of laser pulses in the field of view and wherein the set of laser pulses are non-uniformly distributed based at least in part on the location estimate for the remote mirror.

15. The method of claim 10 further comprising the step of receiving the location estimate in one or more electronic position signals from the remote mirror.

16. The method of claim 10 further comprising the steps of obtaining with the electronic circuitry one or more position signals operable to change a position of the remote mirror;

changing the position of the remote mirror by transmitting the one or more mirror position signals to the remote mirror; and obtaining at the electronic circuitry the location estimate for the remote mirror based at least in part on the one or more mirror position signals.

17. The method of claim 10 further comprises the step of, in response to one or more changes in a position of the remote mirror in the field of view, tracking the remote mirror in the field of view with a dense subset of the set of laser pulses.

18. The method of claim 10 further comprising the step of tracking the remote mirror in the field of view with a dense set of outgoing laser pulses, including at one or more times after generating the set of laser pulses performing the sub-steps of;

updating the location estimate for the remote mirror; and generating a new set of laser pulses based at least in part on the updated location estimate for the remote mirror.

19. The method of claim 10 wherein the dynamic steering of the at least one laser beam causes the first subset of the set of laser pulses to have a smaller angular separation in a first direction than the average angular separation in the first direction of the set of laser pulses in the field of view.

20. The method of claim 10 further comprising the step of detecting with a detector a set of laser reflections from the set of laser pulses;

wherein the set of laser reflections have an average spatial density of laser reflections in the field of view;

wherein a first subset of the set of laser reflections, have been deflected by the remote mirror; and wherein the first subset of the set of laser reflections has a greater average spatial density in the field of view than the average spatial density of the set of laser reflections in field of view.

21. The method of claim 10 further comprising, receiving sensor data from one or more sensors in a vicinity of the steerable laser assembly, processing with the electronic circuitry at least some of the sensor data and thereby obtaining the location estimate for the remote mirror.

22. The method of claim 10 further comprises the step of, detecting the remote mirror in the field of view with the electronic circuitry; and wherein the remote mirror is operable to move into and out of the field of view.

23. The method of claim 10 wherein the mirror region occupied a first variable portion of the field of view and wherein a second portion of the field of view is unoccupied by the remote mirror and is exclusive from the first variable portion.

24. The method of claim 10 further comprising the step of calculating a shape of the remote mirror; and wherein the step of generating the set of laser steering parameters uses the shape of the remote mirror at least in part to generate the set of laser steering parameters.

25. A laser range finder comprising:

a. a steerable laser assembly with a field of view; and b. electronic circuitry that identifies a first region of the field of view that includes at least some of a remote mirror; and wherein the electronic circuitry provides laser steering parameters that instruct the steerable laser assembly to dynamically steer one or more laser beams to thereby generate a set of laser pulses, with an average laser pulse density in the field of view;

wherein at least some of the laser steering parameters cause the steerable laser assembly to generate the set of laser pulses with a greater laser pulse density in the first region of the field of view than the average laser pulse density in the field of view.

26. The laser range finder of claim 25 further comprising a detector to detect a set of laser reflections from the set of laser pulses and thereby generate reflection data from indirect laser reflections that have been deflected by the remote mirror.

27. The laser range finder of claim 25 further comprising a detector to detect a set of laser reflections from the set of laser pulses, the set of laser reflections having an average spatial density in the field of view;

wherein the set of laser steering parameters function to distribute the set of laser pulses such that a first subset of the set of laser reflections have been deflected by the remote mirror; and wherein the first subset of the set of laser reflections have a higher spatial density in the field of view than the average spatial density of the set of laser reflections in the field of view.

28. The laser range finder of claim 25 wherein the remote mirror has transient placement in the field of view and occupies a variable portion of the field of view, the variable portion of the field of view being uncontrolled by the laser range finder; and wherein the electronic circuitry further comprises a sensor data processor that processes sensor data from the field of view and thereby identifies the first region of the field of view.

29. The laser range finder of claim 25 wherein the remote mirror occupies a variable portion of the field of view;
   wherein the electronic circuitry further comprises a receiver to receive electronic signals from the remote mirror; and
   wherein the electronic circuitry identifies the first region of the field of view that includes at least some of the remote mirror using the electronic signals.

30. The laser range finder of claim 25 wherein the remote mirror has transient placement in the field of view; and
   wherein at least some of the electronic circuitry detects that the remote mirror with transient placement in the field of view is present in the field of view.

* * * * *